(12) United States Patent
Kimura et al.

(10) Patent No.: US 6,324,085 B2
(45) Date of Patent: Nov. 27, 2001

(54) POWER CONVERTER APPARATUS AND RELATED METHOD

(75) Inventors: Tomonori Kimura, Kariya; Takaharu Takeshita, Aichi-ken; Nobuyuki Matsui, Kasugai, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/740,025

(22) Filed: Dec. 20, 2000

(30) Foreign Application Priority Data

Dec. 27, 1999 (JP) .................................................. 11-369662
Nov. 9, 2000 (JP) .................................................. 12-341867
Nov. 13, 2000 (JP) .................................................. 12-345394

(51) Int. Cl.[7] ........................... H02M 7/5387; H02P 5/28
(52) U.S. Cl. .............................. 363/132; 363/98; 318/811
(58) Field of Search ................................ 363/17, 97, 98, 363/131, 132; 318/799–801, 807–812, 814

(56) References Cited

U.S. PATENT DOCUMENTS

| | | | |
|---|---|---|---|
| 5,631,819 | * | 5/1997 | Masaki et al. ....................... 363/132 |
| 5,650,708 | | 7/1997 | Sawada et al. . |
| 5,729,102 | * | 3/1998 | Gotou et al. ........................ 318/254 |
| 5,729,449 | * | 3/1998 | Takada et al. ........................ 363/98 |
| 5,852,551 | * | 12/1998 | Lee ........................................ 363/39 |
| 5,909,366 | * | 6/1999 | Sanada ................................... 363/98 |

FOREIGN PATENT DOCUMENTS 59-139871   8/1984   (JP) .

* cited by examiner

Primary Examiner—Matthew Nguyen
(74) Attorney, Agent, or Firm—Law Office of David G. Posz

(57) ABSTRACT

Switching elements in an inverter main circuit are responsive to switching control signals. Phase voltages are applied to a polyphase load via the switching elements. Basic voltage command values are generated for phases of the polyphase load respectively. The basic voltage command values are converted into final voltage command values respectively. During a time interval for which at least two of the basic voltage command values are approximately equal to each other, the final voltage command values corresponding to the two of the basic voltage command values are equal to one of a maximum and a minimum. A carrier wave is subjected to pulse-width modulation responsive to the final voltage command values to produce the switching control signals. The produced switching control signals are outputted to the switching elements in the inverter main circuit.

43 Claims, 46 Drawing Sheets

POWER CONVERTER APPARATUS AND RELATED METHOD

BACKGROUND OF THE INVENTION

1. Field of the Invention

This invention relates to a power converter apparatus or an inverter apparatus for changing DC power into AC power. In addition, this invention relates to a method of controlling the drive of a polyphase AC-powered load via a power converter apparatus or an inverter apparatus.

2. Description of the Related Art

In general, an inverter apparatus or a power converter apparatus is provided between a DC power supply and an AC-powered load. The inverter apparatus receives DC power from the DC power supply. The inverter apparatus changes the DC power into AC power. The inverter apparatus feeds the AC power to the AC-powered load, and thereby drives the AC-powered load.

A typical power converter apparatus for a polyphase AC motor includes IGBT's (insulated gate bipolar transistors) as switching elements. Switching action of each of the IGBT's causes a power loss called a switching loss. As the frequency of switching rises, the switching loss increases. It is desirable to drive the polyphase AC motor while minimizing the switching losses caused by the IGBT's.

Japanese published unexamined patent application 59-139871 (application number 58-11678) discloses a pulse-width modulation system for the drive of a three-phase AC motor. In the system of Japanese application 59-139871, two-phase modulation is implemented. Specifically, the system includes three unit inverters for the three phases respectively. During every one sixth of a period (a cycle), one of the three unit inverters is controlled to fix a corresponding phase voltage while the two other unit inverters are controlled to conform the corresponding inter-phase voltages to sinusoids. Thus, a motor drive signal for one of the three phases is non-modulated while motor drive signals for the two other phases are modulated in accordance with the sinusoids. Selection of one from among the three unit inverters as corresponding to a non-modulated phase is designed to reduce the number of times of commutations per cycle, and hence to decrease commutation losses.

SUMMARY OF THE INVENTION

It is a first object of this invention to provide a power converter apparatus which can suppress the power loss caused by switching action of each switching element.

It is a second object of this invention to provide a method of controlling the drive of a polyphase AC-powered load which can suppress the power loss caused by switching action of each switching element.

A first aspect of this invention provides a power converter apparatus comprising an inverter main circuit including 1) switching elements responsive to switching control signals, and 2) means for applying phase voltages to a polyphase load via the switching elements; command value outputting means for outputting basic voltage command values for phases of the polyphase load respectively; command value converting means for converting the basic voltage command values outputted by the command value outputting means into final voltage command values respectively, wherein during a time interval for which at least two of the basic voltage command values are approximately equal to each other, the final voltage command values corresponding to said two of the basic voltage command values are equal to one of a maximum and a minimum; and control signal outputting means for subjecting a carrier wave to pulse-width modulation responsive to the final voltage command values generated by the command value converting means to produce the switching control signals, and for outputting the switching control signals to the switching elements in the inverter main circuit.

A second aspect of this invention is based on the first aspect thereof, and provides a power converter apparatus wherein the command value converting means comprises means for equalizing at least one of the final voltage command values which is of a phase different from conversion object phases to a mean of inter-line voltages with the basic voltage command values of the conversion object phases.

A third aspect of this invention is based on the first aspect thereof, and provides a power converter apparatus wherein the polyphase load comprises a polyphase AC motor.

A fourth aspect of this invention is based on the third aspect thereof, and provides a power converter apparatus wherein the polyphase AC motor comprises a three-phase AC motor.

A fifth aspect of this invention provides a power converter apparatus comprising an inverter main circuit including 1) switching elements responsive to switching control signals, and 2) means for applying phase voltages to a polyphase load via the switching elements; command value outputting means for outputting basic voltage command values for phases of the polyphase load respectively; command value converting means for converting the basic voltage command values outputted by the command value outputting means into final voltage command values respectively, wherein a time interval for which at least two of the basic voltage command values are approximately equal to each other includes an alternation of first conversion time intervals and second conversion time intervals, wherein during each of the first conversion time intervals, the final voltage command values corresponding to said two of the basic voltage command values are equal to one of a maximum and a minimum, and wherein during each of the second conversion time intervals, only one of the final voltage command values corresponding to said two of the basic voltage command values is equal to one of the maximum and the minimum; and control signal outputting means for subjecting a carrier wave to pulse-width modulation responsive to the final voltage command values generated by the command value converting means to produce the switching control signals, and for outputting the switching control signals to the switching elements in the inverter main circuit.

A sixth aspect of this invention is based on the fifth aspect thereof, and provides a power converter apparatus wherein the command value converting means comprises means for setting a period of the alternation of the first conversion time intervals and the second conversion time intervals to an integer times a period of the carrier wave.

A seventh aspect of this invention is based on the fifth aspect thereof, and provides a power converter apparatus wherein during each of the second conversion time intervals, said only one of the final voltage command values corresponds to one of the basic voltage command values which is maximum in inter-line voltage with another of the basic voltage command value.

An eighth aspect of this invention is based on the fifth aspect thereof, and provides a power converter apparatus wherein the command value converting means comprises means for setting a length of the second conversion time intervals to a positive real number "n" times a length of the first conversion time intervals; means for, during each of the first conversion time intervals, subjecting at least one of the final voltage command values which is of a phase different from conversion object phases to level shift to maintain an inter-line voltage with the basic command voltage value of a conversion object phase in each of the second conversion time intervals; and means for, during each of the second conversion time intervals, subjecting one of the final voltage command values which is of a conversion object phase only for each of the first conversion time intervals to level shift to multiply an inter-line voltage with the basic voltage command value of a conversion object phase in each of the second conversion time intervals by (1+1/n).

A ninth aspect of this invention is based on the eighth aspect thereof, and provides a power converter apparatus wherein the command value converting means comprises means for setting the positive real number "n" to 1.

A tenth aspect of this invention is based on the fifth aspect thereof, and provides a power converter apparatus wherein the command value converting means comprises means for increasing a length of the second conversion time intervals relative to the first conversion time intervals as a difference between the basic voltage command values of conversion object phases in the first conversion time intervals increases.

An eleventh aspect of this invention is based on the fifth aspect thereof, and provides a power converter apparatus wherein the polyphase load comprises a three-phase load.

A twelfth aspect of this invention provides a power converter apparatus comprising an inverter main circuit including 1) switching elements responsive to switching control signals, and 2) means for applying phase voltages to a polyphase load via the switching elements; command value outputting means for outputting basic voltage command values for phases of the polyphase load respectively; command value converting means for comparing the basic voltage command values outputted by the command value outputting means, and for converting the basic voltage command values into final voltage command values respectively in response to results of said comparing, wherein during a specified time interval containing a time point at which at least two of the basic voltage command values are equal, the final voltage command values corresponding to said two of the basic voltage command values are equal to one of a maximum and a minimum; and control signal outputting means for subjecting a carrier wave to pulse-width modulation responsive to the final voltage command values generated by the command value converting means to produce the switching control signals, and for outputting the switching control signals to the switching elements in the inverter main circuit.

A thirteenth aspect of this invention is based on the first aspect thereof, and provides a power converter apparatus wherein the basic voltage command values are based on amplitude variations of sinusoidal waves.

A fourteenth aspect of this invention provides a method of controlling drive of a polyphase load. The method comprises the steps of applying phase voltages to the polyphase load via switching elements in an inverter main circuit; generating basic voltage command values for phases of the polyphase load respectively; converting the basic voltage command values into final voltage command values respectively, wherein during a time interval for which at least two of the basic voltage command values are approximately equal to each other, the final voltage command values corresponding to said two of the basic voltage command values are equal to one of a maximum and a minimum; subjecting a carrier wave to pulse-width modulation responsive to the final voltage command values to produce switching control signals; and outputting the switching control signals to the switching elements in the inverter main circuit.

A fifteenth aspect of this invention is based on the fourteenth aspect thereof, and provides a method further comprising the step of equalizing at least one of the final voltage command values which is of a phase different from conversion object phases to a mean of inter-line voltages with the basic voltage command values of the conversion object phases.

A sixteenth aspect of this invention is based on the fourteenth aspect thereof, and provides a method wherein the polyphase load comprises a polyphase AC motor.

A seventeenth aspect of this invention is based on the sixteenth aspect thereof, and provides a method wherein the polyphase AC motor comprises a three-phase AC motor.

An eighteenth aspect of this invention provides a method of controlling drive of a polyphase load. The method comprises the steps of applying phase voltages to the polyphase load via switching elements in an inverter main circuit; generating basic voltage command values for phases of the polyphase load respectively; converting the basic voltage command values into final voltage command values respectively, wherein a time interval for which at least two of the basic voltage command values are approximately equal to each other includes an alternation of first conversion time intervals and second conversion time intervals, wherein during each of the first conversion time intervals, the final voltage command values corresponding to said two of the basic voltage command values are equal to one of a maximum and a minimum, and wherein during each of the second conversion time intervals, only one of the final voltage command values corresponding to said two of the basic voltage command values is equal to one of the maximum and the minimum; subjecting a carrier wave to pulse-width modulation responsive to the final voltage command values to produce switching control signals; and outputting the switching control signals to the switching elements in the inverter main circuit.

A nineteenth aspect of this invention is based on the eighteenth aspect thereof, and provides a method further comprising the step of setting a period of the alternation of the first conversion time intervals and the second conversion time intervals to an integer times a period of the carrier wave.

A twentieth aspect of this invention is based on the eighteenth aspect thereof, and provides a method wherein during each of the second conversion time intervals, said only one of the final voltage command values corresponds to one of the basic voltage command values which is maximum in inter-line voltage with another of the basic voltage command value.

A twenty-first aspect of this invention is based on the eighteenth aspect thereof, and provides a method further comprising the steps of setting a length of the second conversion time intervals to a positive real number "n" times a length of the first conversion time intervals; during each of the first conversion time intervals, subjecting at least one of the final voltage command values which is of a phase different from conversion object phases to level shift to maintain an inter-line voltage with the basic command voltage value of a conversion object phase in each of the second conversion time intervals; and during each of the second conversion time intervals, subjecting one of the final voltage command values which is of a conversion object phase only for each of the first conversion time intervals to level shift to multiply an inter-line voltage with the basic voltage command value of a conversion object phase in each of the second conversion time intervals by (1+1/n).

A twenty-second aspect of this invention is based on the twenty-first aspect thereof, and provides a method further comprising the step of setting the positive real number "n" to 1.

A twenty-third aspect of this invention is based on the eighteenth aspect thereof, and provides a method further comprising the step of increasing a length of the second conversion time intervals relative to the first conversion time intervals as a difference between the basic voltage command values of conversion object phases in the first conversion time intervals increases.

A twenty-fourth aspect of this invention is based on the eighteenth aspect thereof, and provides a method wherein the polyphase load comprises a three-phase load.

A twenty-fifth aspect of this invention provides a method of controlling drive of a polyphase load. The method comprises the steps of applying phase voltages to the polyphase load via switching elements in an inverter main circuit; generating basic voltage command values for phases of the polyphase load respectively; comparing the basic voltage command values; converting the basic voltage command values into final voltage command values respectively in response to results of said comparing, wherein during a specified time interval containing a time point at which at least two of the basic voltage command values are equal, the final voltage command values corresponding to said two of the basic voltage command values are equal to one of a maximum and a minimum; subjecting a carrier wave to pulse-width modulation responsive to the final voltage command values to produce switching control signals; and outputting the switching control signals to the switching elements in the inverter main circuit.

A twenty-sixth aspect of this invention is based on the fourteenth aspect thereof, and provides a method wherein the basic voltage command values are based on amplitude variations of sinusoidal waves.

A twenty-seventh aspect of this invention provides a power converter apparatus comprising an inverter main circuit including 1) switching elements responsive to switching control signals, and 2) means for applying phase voltages to a polyphase load via the switching elements; command value outputting means for outputting basic voltage command values for phases of the polyphase load respectively; command value converting means for converting the basic voltage command values outputted by the command value outputting means into final voltage command values respectively, wherein a specified time interval for which at least two of the basic voltage command values are approximately equal to each other includes an alternation of first conversion time intervals and second conversion time intervals, wherein during each of the first conversion time intervals, the final voltage command values corresponding to said two of the basic voltage command values are equal to one of a maximum and a minimum, and wherein during each of the second conversion time intervals, only one of the final voltage command values corresponding to said two of the basic voltage command values is equal to one of the maximum and the minimum; phase changing means for changing a phase of the specified time interval used by the command value converting means; and control signal outputting means for subjecting a carrier wave to pulse-width modulation responsive to the final voltage command values generated by the command value converting means to produce the switching control signals, and for outputting the switching control signals to the switching elements in the inverter main circuit.

A twenty-eighth aspect of this invention is based on the twenty-seventh aspect thereof, and provides a power converter apparatus wherein the phase changing means comprises means for detecting a phase difference between a phase of one of the basic voltage command values and a phase of a corresponding output current flowing into the polyphase load from the inverter main circuit, and means for changing the phase of the specified time interval in response to the detected phase difference.

A twenty-ninth aspect of this invention is based on the twenty-eighth aspect thereof, and provides a power converter apparatus wherein the phase changing means comprises means for changing the phase of the specified time interval so that a time position different from one of a maximum and a minimum of one of the final voltage command values coincides with a zero-cross point of a corresponding output current flowing into the polyphase load from the inverter main circuit.

A thirtieth aspect of this invention is based on the twenty-seventh aspect thereof, and provides a power converter apparatus wherein the phase changing means comprises means for detecting a phase difference between a phase of one of the basic voltage command values and a phase of a current command value fed from an external, and means for changing the phase of the specified time interval in response to the detected phase difference.

A thirty-first aspect of this invention is based on the thirtieth aspect thereof, and provides a power converter apparatus wherein the polyphase load comprises a three-phase load, and the phase changing means comprises means for changing the phase of the specified time interval so that a time position different from one of a maximum and a minimum of one of the final voltage command values coincides with a zero-cross point of a corresponding current command value.

A thirty-second aspect of this invention is based on the twenty-seventh aspect thereof, and provides a power converter apparatus wherein the polyphase load comprises a polyphase AC motor.

A thirty-third aspect of this invention is based on the twenty-seventh aspect thereof, and provides a power converter apparatus wherein the command value converting means comprises means for setting a length of the second conversion time intervals to a positive real number "n" times a length of the first conversion time intervals; means for, during each of the first conversion time intervals, subjecting at least one of the final voltage command values which is of a phase different from conversion object phases to level shift to maintain an inter-line voltage with the basic command voltage value of a conversion object phase in each of the second conversion time intervals; and means for, during each of the second conversion time intervals, subjecting one of the final voltage command values which is of a conversion object phase only for each of the first conversion time intervals to level shift to multiply an inter-line voltage with the basic voltage command value of a conversion object phase in each of the second conversion time intervals by (1+1/n).

A thirty-fourth aspect of this invention is based on the thirty-third aspect thereof, and provides a power converter apparatus wherein the phase changing means comprises means for changing the phase of the specified time interval so that the final voltage command values are limited to within a predetermined non-overmodulation range during the second conversion time intervals.

A thirty-fifth aspect of this invention provides a method of controlling drive of a polyphase load. The method comprises the steps of applying phase voltages to the polyphase load via switching elements in an inverter main circuit; generating basic voltage command values for phases of the polyphase load respectively; converting the basic voltage command values into final voltage command values respectively, wherein a time interval for which at least two of the basic voltage command values are approximately equal to each other includes an alternation of first conversion time intervals and second conversion time intervals, wherein during each of the first conversion time intervals, the final voltage command values corresponding to said two of the basic voltage command values are equal to one of a maximum and a minimum, and wherein during each of the second conversion time intervals, only one of the final voltage command values corresponding to said two of the basic voltage command values is equal to one of the maximum and the minimum; changing a phase of the specified time interval; subjecting a carrier wave to pulse-width modulation responsive to the final voltage command values to produce switching control signals; and outputting the switching control signals to the switching elements in the inverter main circuit.

A thirty-sixth aspect of this invention is based on the thirty-fifth aspect thereof, and provides a method wherein the phase changing step comprises detecting a phase difference between a phase of one of the basic voltage command values and a phase of a corresponding output current flowing into the polyphase load from the inverter main circuit, and changing the phase of the specified time interval in response to the detected phase difference.

A thirty-seventh aspect of this invention is based on the thirty-sixth aspect thereof, and provides a method wherein the phase changing step comprises changing the phase of the specified time interval so that a time position different from one of a maximum and a minimum of one of the final voltage command values coincides with a zero-cross point of a corresponding output current flowing into the polyphase load from the inverter main circuit.

A thirty-eighth aspect of this invention is based on the thirty-fifth aspect thereof, and provides a method wherein the phase changing step comprises detecting a phase difference between a phase of one of the basic voltage command values and a phase of a current command value fed from an external, and changing the phase of the specified time interval in response to the detected phase difference.

A thirty-ninth aspect of this invention is based on the thirty-eighth aspect thereof, and provides a method wherein the phase changing step comprises changing the phase of the specified time interval so that a time position different from one of a maximum and a minimum of one of the final voltage command values coincides with a zero-cross point of a corresponding current command value.

A fortieth aspect of this invention is based on the thirty-fifth aspect thereof, and provides a method wherein the polyphase load comprises a polyphase AC motor.

A forty-first aspect of this invention is based on the thirty-fifth aspect thereof, and provides a method further comprising the steps of setting a length of the second conversion time intervals to a positive real number "n" times a length of the first conversion time intervals; during each of the first conversion time intervals, subjecting at least one of the final voltage command values which is of a phase different from conversion object phases to level shift to maintain an inter-line voltage with the basic command voltage value of a conversion object phase in each of the second conversion time intervals; and during each of the second conversion time intervals, subjecting one of the final voltage command values which is of a conversion object phase only for each of the first conversion time intervals to level shift to multiply an inter-line voltage with the basic voltage command value of a conversion object phase in each of the second conversion time intervals by (1+1/n).

A forty-second aspect of this invention is based on the forty-first aspect thereof, and provides a method wherein the phase changing step comprises changing the phase of the specified time interval so that the final voltage command values are limited to within a predetermined non-overmodulation range during the second conversion time intervals.

A forty-third aspect of this invention is based on the fifth aspect thereof, and provides a power converter apparatus wherein the command value converting means comprises means for changing a length of the second conversion time intervals relative to the first conversion time intervals.

DETAILED DESCRIPTION OF THE INVENTION

A prior-art inverter apparatus (a prior-art power converter apparatus) will be explained below for a better understanding of this invention.

Figure 1:
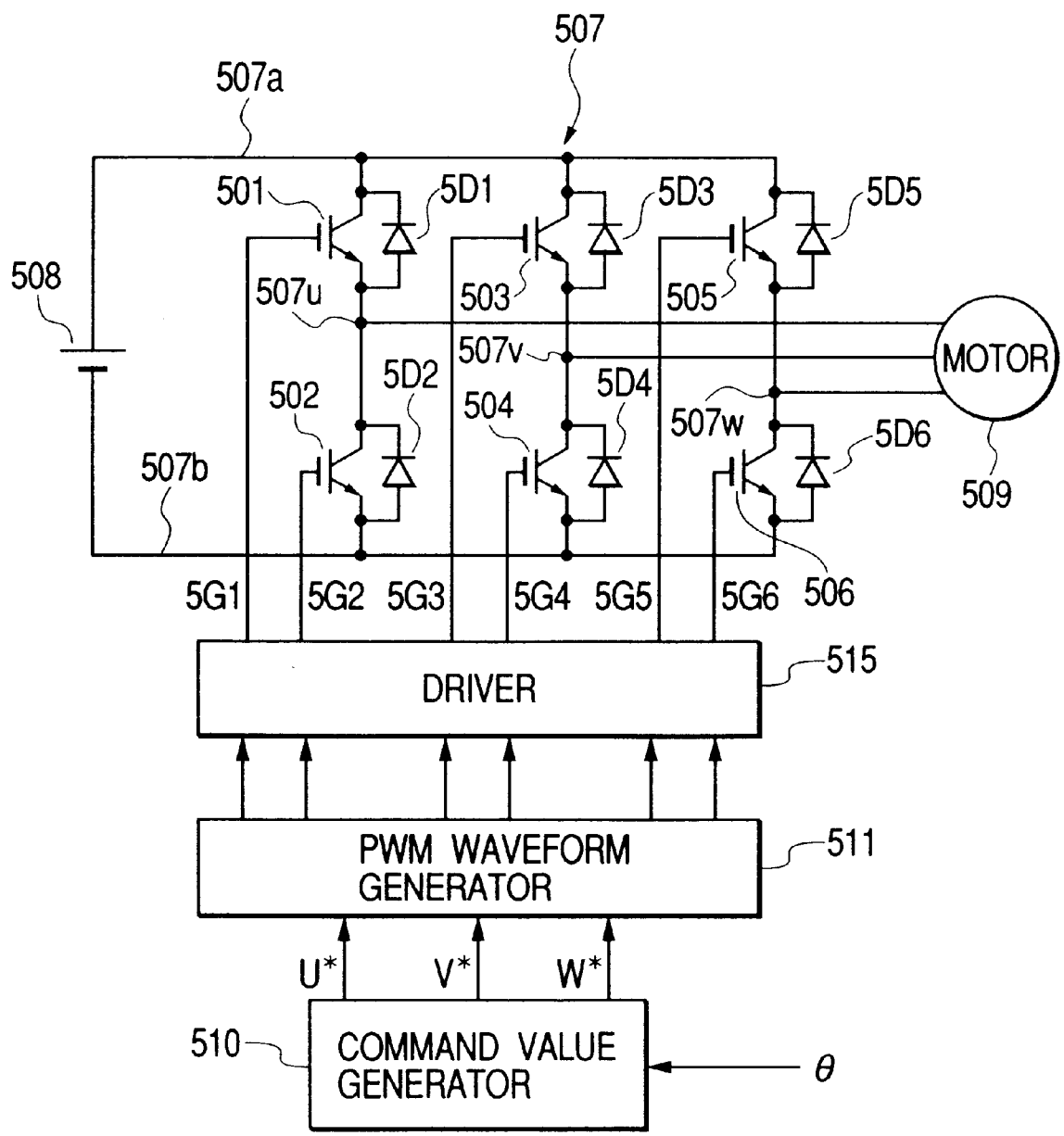
FIG. 1 is a diagram of a prior-art inverter apparatus.

FIG. 1 shows a prior-art inverter apparatus for driving a polyphase AC motor (a three-phase AC motor) 509 used to power an electric vehicle. The prior-art inverter apparatus in FIG. 1 includes an inverter main circuit 507 having IGBT's 501, 502, 503, 504, 505, and 506 connected in a three-phase bridge or a three-arm bridge. The inverter main circuit 507 has three arms each provided with a pair of a positive-side IGBT and a negative-side IGBT. The three arms correspond to three phases "U", "V", and "W" respectively. DC power busses (DC power rails) 507a and 507b extending from the inverter main circuit 507 are connected to the positive and negative terminals of a battery 508, respectively. The inverter main circuit 507 has output terminals 507u, 507v, and 507w for the three phases "U", "V", and "W" respectively. The output terminals 507u, 507v, and 507w are connected to U-phase, V-phase, and W-phase windings of the three-phase AC motor 509, respectively. Examples of the three-phase AC motor 509 are a synchronous motor, an induction motor, and a brushless motor. Free-wheeling diodes 5D1, 5D2, 5D3, 5D4, 5D5, and 5D6 are connected between the collectors and the emitters of the IGBT's 501, 502, 503, 504, 505, and 506, respectively.

The prior-art inverter apparatus in FIG. 1 includes a command value generator 510. The command value generator 510 has a ROM storing data representing voltage command values U* for the U phase, voltage command values V* for the V phase, and voltage command values W* for the W phase. The voltage command values U*, V*, and W* are based on, for example, amplitudes of sinusoidal waves. The voltage command values U*, V*, and W* are plotted as a function of a rotor phase (a rotational angle of a rotor). The command value generator 510 receives a signal representative of the detected phase (the detected rotational angle) θ of a rotor in the three-phase AC motor 509 from a rotor phase detector (not shown). The ROM is accessed in response to the rotor phase signal. Data pieces representing a set of a voltage command value U*, a voltage command value V*, and a voltage command value W* which correspond to the detected rotor phase θ are read out from the ROM. The command value generator 510 outputs the read-out data pieces (the read-out voltage command values U*, V*, and W*) to a PWM waveform generator 511.

A first example of the rotor phase detector includes current sensors (not shown) associated with the connections between the output terminals 507u, 507v, and 507w of the inverter main circuit 507 and the U-phase, V-phase, and W-phase windings of the three-phase AC motor 509. The first example further includes a circuit for sensing zero-cross points in the output signals of the current sensors, and a circuit for detecting the phase (the rotational angle) θ of the rotor in the three-phase AC motor 509 in response to the sensed zero-cross points.

A second example of the rotor phase detector includes a rotary encoder or a resolver associated with the rotor in the three-phase AC motor 509. The second example further includes a circuit for detecting the phase (the rotational angle) θ of the rotor in response to the output signal of the rotary encoder or the resolver.

Figure 2:
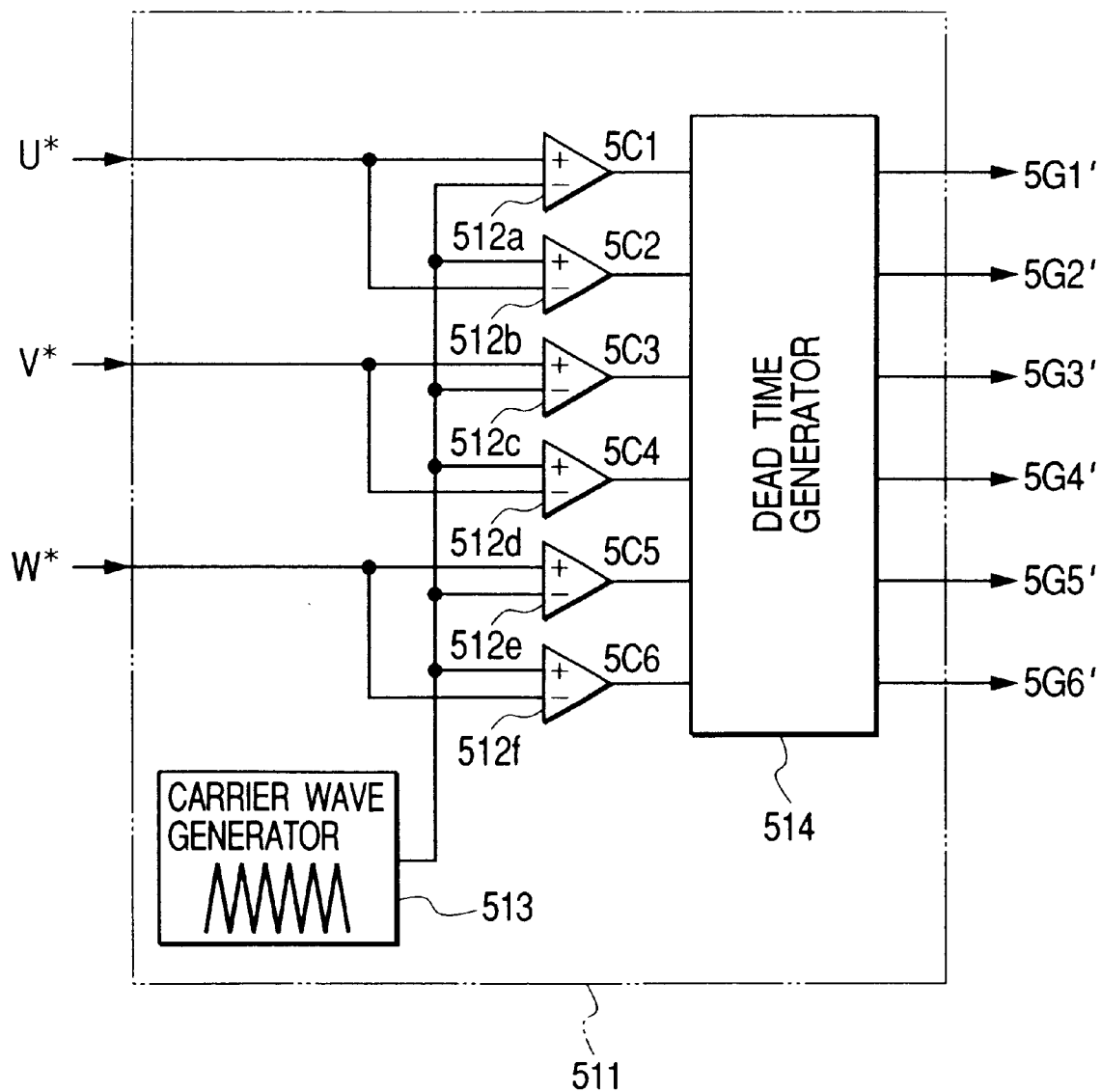
FIG. 2 is a block diagram of a PWM waveform generator in FIG. 1.

FIG. 2 shows the details of the PWM waveform generator 511. As shown in FIG. 2, the PWM waveform generator 511 includes comparators 512a, 512b, 512c, 512d, 512e, and 512f. The voltage command value U* is fed to the non-inverting input terminal of the comparator 512a and the inverting input terminal of the comparator 512b. The voltage command value V* is fed to the non-inverting input terminal of the comparator 512c and the inverting input terminal of the comparator 512d. The voltage command value W* is fed to the non-inverting input terminal of the comparator 512e and the inverting input terminal of the comparator 512f. A carrier wave generator 513 outputs a triangular carrier wave for PWM modulation to the inverting input terminals of the comparators 512a, 512c, and 512e, and the non-inverting input terminals of the comparators 512b, 512d, and 512f.

In the case where the voltage command values U*, V*, and W*, and the carrier wave fed to the comparators 512a–512f are represented by digital data, magnitude comparators are used as the comparators 512a–512f. In the case where the voltage command values U*, V*, and W*, and the carrier wave fed to the comparators 512a–512f are of analog forms, analog comparators are used as the comparators 512a–512f.

The comparators 512a, 512b, 512c, 512d, 512e, and 512f output signals 5C1, 5C2, 5C3, 5C4, 5C5, and 5C6 to a dead time generator 514, respectively. When the voltage command value U* is higher than the level of the carrier wave, the comparator signal 5C1 is in its high level state. Otherwise, the comparator signal 5C1 is in its low level state. The comparator signal 5C2 is an inversion of the comparator signal 5C1. When the voltage command value V* is higher than the level of the carrier wave, the comparator signal 5C3 is in its high level state. Otherwise, the comparator signal 5C3 is in its low level state. The comparator signal 5C4 is an inversion of the comparator signal 5C3. When the voltage command value W* is higher than the level of the carrier wave, the comparator signal 5C5 is in its high level state. Otherwise, the comparator signal 5C5 is in its low level state. The comparator signal 5C6 is an inversion of the comparator signal 5C5.

The dead time generator 514 acts to prevent the positive-side IGBT and the negative-side IGBT in each of the arms of the inverter main circuit 507 from being simultaneously in their on states. Specifically, the dead time generator 514 corrects the on-off timing relation between a group of the comparator signals 5C1, 5C3, and 5C5 and a group of the comparator signals 5C2, 5C4, and 5C6 to provide dead times for the respective arms of the inverter main circuit 507. During a dead time for one of the arms, both the positive-side IGBT and the negative-side IGBT in the present arm are in their off states. The dead time generator 514 produces basic gate signals 5G1', 5G2', 5G3', 5G4', 5G5', and 5G6' in response to the comparator signals 5C1, 5C2, 5C3, 5C4, 5C5, and 5C6. In other words, the dead time generator 514 corrects the comparator signals 5C1, 5C2, 5C3, 5C4, 5C5, and 5C6 into the basic gate signals 5G1', 5G2', 5G3', 5G4', 5G5', and 5G6' respectively. The dead time generator 514 outputs the basic gate signals 5G1'–5G6' to a driver 515 (see FIG. 1).

With reference back to FIG. 1, the driver 515 includes photocouplers for generating final gate signals 5G1, 5G2, 5G3, 5G4, 5G5, and 5G6 in response to the basic gate signals 5G1', 5G2', 5G3', 5G4', 5G5', and 5G6'. The driver 515 feeds the final gate signals 5G1, 5G2, 5G3, 5G4, 5G5, and 5G6 to the gates of the IGBT's 501, 502, 503, 504, 505, and 506, respectively.

In the inverter main circuit 507, the U-phase arm has the IGBT's 501 and 502. When the voltage command value U* is higher than the level of the carrier wave, the IGBT 501 is in its on state and the IGBT 502 is in its off state so that the positive-side voltage of the battery 508 is transmitted to the U-phase winding of the three-phase AC motor 509. On the other hand, when the voltage command value U* is lower than the level of the carrier wave, the IGBT 501 is in its off state and the IGBT 502 is in its on state so that the negative-side voltage of the battery 508 is transmitted to the U-phase winding of the three-phase AC motor 509. Accordingly, during every period of the carrier wave, the positive-side voltage of the battery 508 continues to be transmitted to the U-phase winding of the three-phase AC motor 509 only for a time interval proportional to the voltage command value U*. Similarly, the positive-side voltage of the battery 508 and the negative-side voltage thereof are selectively transmitted to the V-phase and W-phase windings of the three-phase AC motor 509 in response to the voltage command values V* and W*.

Figure 3:
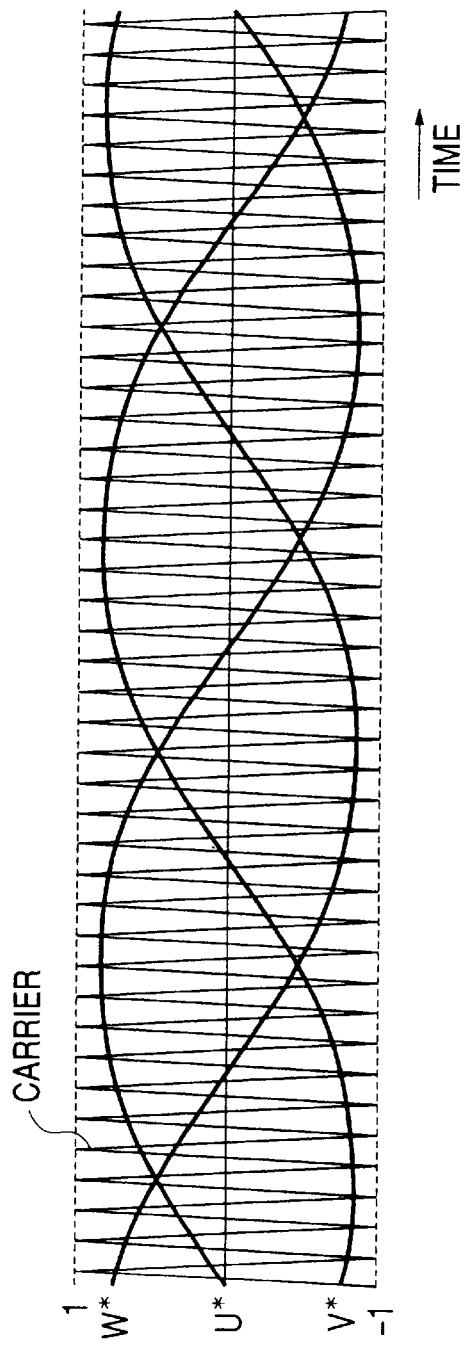
FIG. 3 is a time-domain diagram of voltage command values and a carrier wave.
Figure 4:
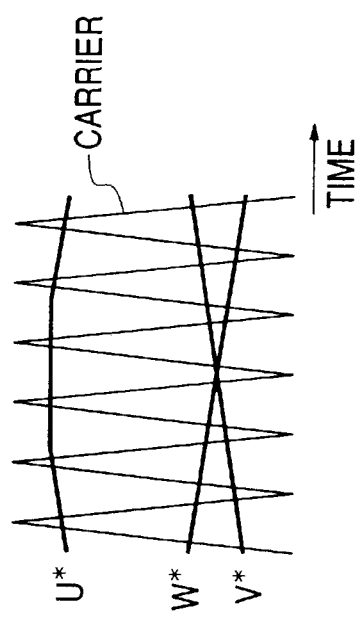
FIG. 4 is a time-domain diagram of a portion in FIG. 3.

With reference to FIGS. 3 and 4, the voltage command values U*, V*, and W* vary as sinusoidal waves. The currents outputted from the inverter main circuit 507 to the windings of the three-phase AC motor 509 have pulses, the widths of which are modulated in accordance with the sinusoidal waves (the voltage command values U*, V*, and W*). As the frequency of the carrier wave rises, variations in the pulse widths of the output currents from the inverter main circuit 507 more conform to ideal sinusoids. When the frequency of the carrier wave is equal to 15 kHz or higher, the noise generated by the three-phase AC motor 509 can be remarkably suppressed. Thus, the IGBT's 501–506 use ones which can implement switching at such a high frequency. Accordingly, the IGBT's 501–506 are of a fast switching type.

In the case where the inverter main circuit 507 handles great power, the inverter main circuit 507 is considerably heated by a power conversion loss. Therefore, in this case, it is necessary to provide the inverter main circuit 507 with a cooling device such as a water cooler. The cooling device causes increases in size and cost of the prior-art inverter apparatus. The switching losses by the IGBT's 501–506 occupy a great portion of the power conversion loss.

As the frequency of switching rises, the switches losses increase. Accordingly, in the prior-art inverter apparatus, use of the IGBT's 501–506 in low-frequency switching conditions is recommended.

First Embodiment

Figure 5:
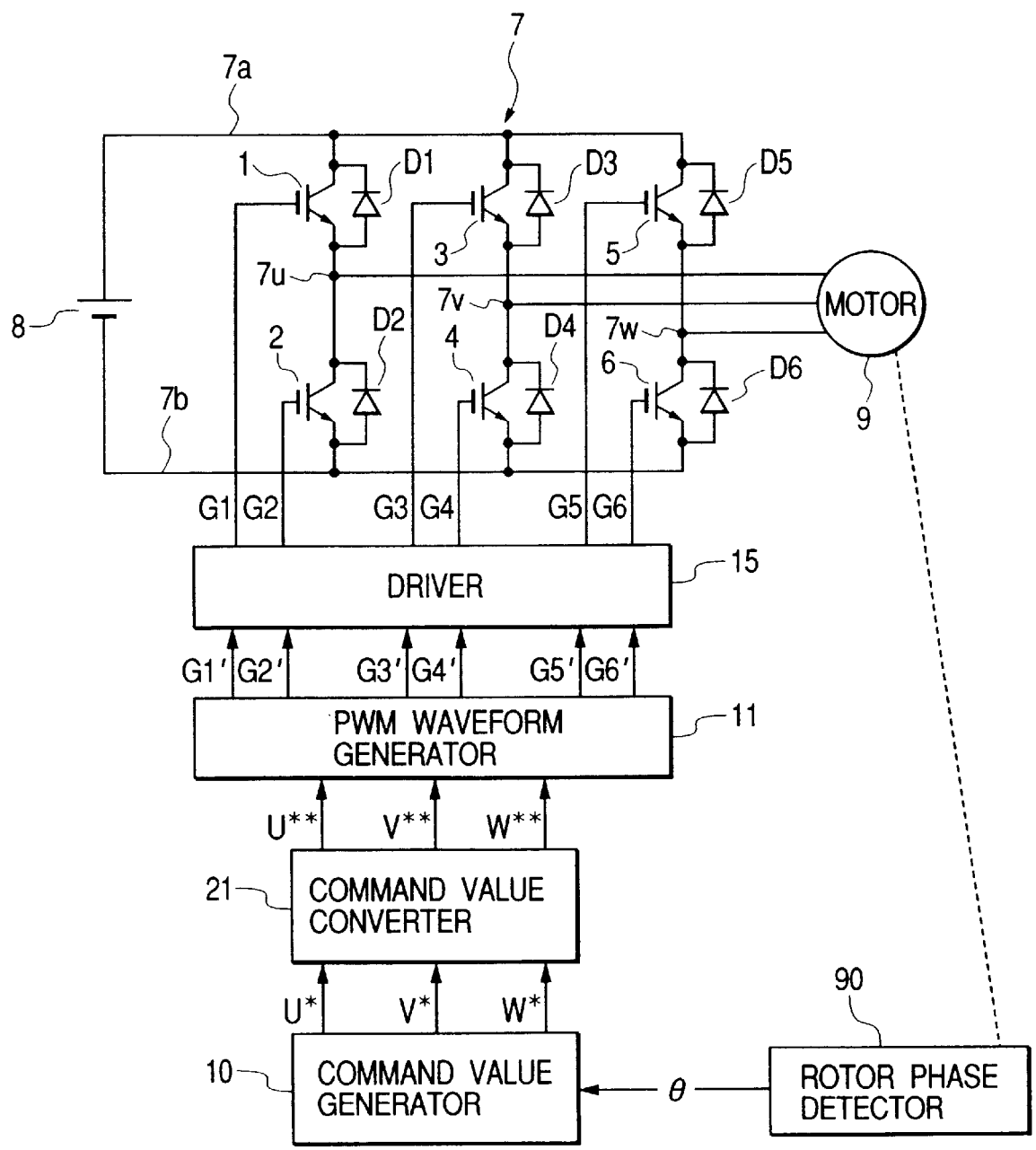
FIG. 5 is a diagram of a power converter apparatus according to a first embodiment of this invention.

FIG. 5 shows a power converter apparatus (an inverter apparatus) according to a first embodiment of this invention. The power converter apparatus of FIG. 5 drives a polyphase AC motor (a three-phase AC motor) 9 used to power, for example, an electric vehicle.

The power converter apparatus of FIG. 5 includes an inverter main circuit 7 having IGBT's (insulated gate bipolar transistors) 1, 2, 3, 4, 5, and 6 connected in a three-phase bridge or a three-arm bridge. The inverter main circuit 7 has first, second, and third arms connected between a positive DC power bus (a positive DC power rail) 7a and a negative DC power bus (a negative DC power rail) 7b. The first arm is provided with a series combination of a positive-side IGBT and a negative-side IGBT formed by the IGBT's 1 and 2 respectively. The second arm is provided with a series combination of a positive-side IGBT and a negative-side IGBT formed by the IGBT's 3 and 4 respectively. The third arm is provided with a series combination of a positive-side IGBT and a negative-side IGBT formed by the IGBT's 5 and 6 respectively. The first, second, and third arms correspond to three phases "U", "V", and "W" of the polyphase motor 9, respectively.

The positive and negative DC power busses 7a and 7b are connected to the positive and negative terminals of a battery 8, respectively. The battery 8 constitutes a DC power supply. The inverter main circuit 7 has output terminals 7u, 7v, and 7w for the three phases "U", "V", and "W" respectively. The output terminals 7u, 7v, and 7w are connected to U-phase, V-phase, and W-phase windings of the three-phase AC motor 9, respectively. Examples of the three-phase AC motor 9 are a synchronous motor, an induction motor, and a brushless motor. Free-wheeling diodes D1, D2, D3, D3, D5, and D6 are connected between the collectors and the emitters of the IGBT's 1, 2, 3, 4, 5, and 6 on an antiparallel basis, respectively.

The power converter apparatus of FIG. 5 includes a command value generator 10. The command value generator 10 is formed by, for example, a DSP (digital signal processor) or a similar device which operates in accordance with a program stored in its internal ROM. The program is designed to enable the command value generator 10 to implement processes mentioned later. The command value generator 10 receives a signal representative of the detected phase (the detected rotational angle) θ of a rotor in the three-phase AC motor 9 from a rotor phase detector 90. The command value generator 10 determines a basic voltage command value U* for the U phase, a basic voltage command value V* for the V phase, and a basic voltage command value W* for the W phase in response to the detected rotor phase θ. The command value generator 10 informs a command value converter 21 of the basic voltage command values U*, V*, and W*.

A first example of the rotor phase detector 90 includes current sensors (not shown) associated with the connections between the output terminals 7u, 7v, and 7w of the inverter main circuit 7 and the U-phase, V-phase, and W-phase windings of the three-phase AC motor 9. The first example further includes a circuit for sensing zero-cross points in the output signals of the current sensors, and a circuit for detecting the phase (the rotational angle) θ of the rotor in the three-phase AC motor 9 in response to the sensed zero-cross points.

A second example of the rotor phase detector 90 includes a rotary encoder or a resolver associated with the rotor in the three-phase AC motor 9. The second example further includes a circuit for detecting the phase (the rotational angle) θ of the rotor in response to the output signal of the rotary encoder or the resolver.

The command value converter 21 is formed by, for example, a DSP or a similar device which operates in accordance with a program stored in its internal ROM. The program is designed to enable the command value converter 21 to implement processes mentioned later. The command value converter 21 generates a final voltage command value U for the U phase, a final voltage command value V for the V phase, and a final voltage command value W** for the W phase in response to the basic voltage command values U*, V*, and W*. The command value converter 21 informs a PWM waveform generator 11 of the final voltage command values U, V, and W**.

Figure 6:
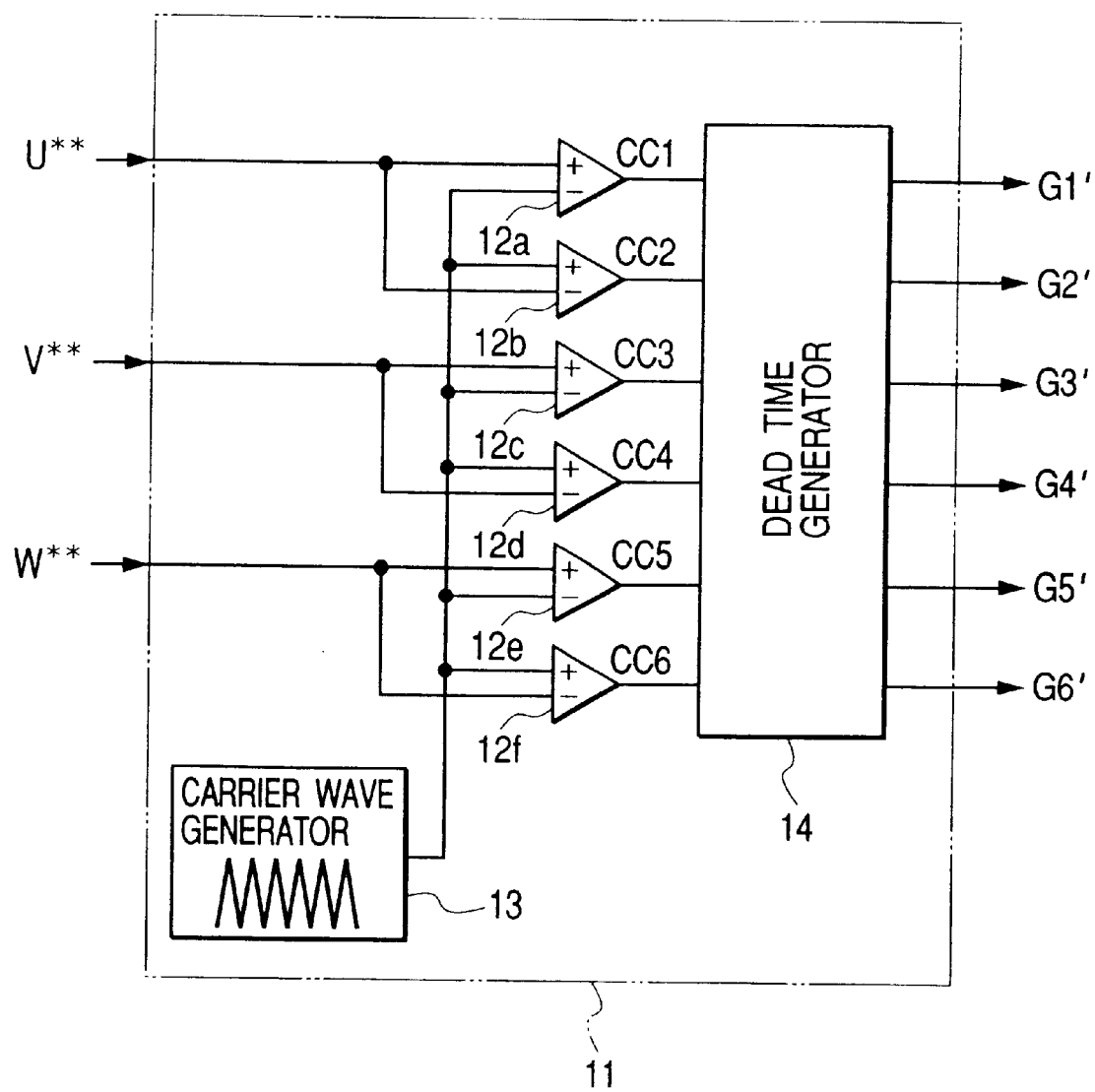
FIG. 6 is a block diagram of a PWM waveform generator in FIG. 5.

FIG. 6 shows the details of the PWM waveform generator 11. As shown in FIG. 6, the PWM waveform generator 11 includes comparators 12a, 12b, 12c, 12d, 12e, and 12f. The final voltage command value U is fed to the non-inverting input terminal of the comparator 12a and the inverting input terminal of the comparator 12b. The final voltage command value V is fed to the non-inverting input terminal of the comparator 12c and the inverting input terminal of the comparator 12d. The final voltage command value W** is fed to the non-inverting input terminal of the comparator 12e and the inverting input terminal of the comparator 12f. A carrier wave generator 13 outputs a triangular carrier wave for PWM modulation to the inverting input terminals of the comparators 12a, 12c, and 12e, and the non-inverting input terminals of the comparators 12b, 12d, and 12f.

In the case where the final voltage command values U, V, and W, and the carrier wave fed to the comparators 12a–12f are represented by digital data, magnitude comparators are used as the comparators 12a–12f. In the case where the final voltage command values U, V, and W, and the carrier wave fed to the comparators 12a–12f are of analog forms, analog comparators are used as the comparators 12a–12f.

The comparators 12a, 12b, 12c, 12d, 12e, and 12f output signals CC1, CC2, CC3, CC4, CC5, and CC6 to a dead time generator 14, respectively. When the final voltage command value U is higher than the level of the carrier wave, the comparator signal CC1 is in its high level state. Otherwise, the comparator signal CC1 is in its low level state. The comparator signal CC2 is an inversion of the comparator signal CC1. When the final voltage command value V is higher than the level of the carrier wave, the comparator signal CC3 is in its high level state. Otherwise, the comparator signal CC3 is in its low level state. The comparator signal CC4 is an inversion of the comparator signal CC3. When the final voltage command value W** is higher than the level of the carrier wave, the comparator signal CC5 is in its high level state. Otherwise, the comparator signal CC5 is in its low level state. The comparator signal CC6 is an inversion of the comparator signal CC5.

The dead time generator 14 acts to prevent the positive-side IGBT and the negative-side IGBT in each of the arms of the inverter main circuit 7 from being simultaneously in their on states. Specifically, the dead time generator 14 corrects the on-off timing relation between a group of the comparator signals CC1, CC3, and CC5 and a group of the comparator signals CC2, CC4, and CC6 to provide dead times for the respective arms of the inverter main circuit 7. During a dead time for one of the arms, both the positive-side IGBT and the negative-side IGBT in the present arm are in their off states. The dead time generator 14 produces basic gate signals G1', G2', G3', G4', G5', and G6' in response to the comparator signals CC1, CC2, CC3, CC4, CC5, and CC6. In other words, the dead time generator 14 corrects the comparator signals CC1, CC2, CC3, CC4, CC5, and CC6 into the basic gate signals G1', G2', G3', G4', G5', and G6' respectively. The dead time generator 14 outputs the basic gate signals G1'–G6' to a driver 15 (see FIG. 5).

With reference back to FIG. 5, the driver 15 includes photocouplers for generating final gate signals G1, G2, G3, G4, G5, and G6 in response to the basic gate signals G1', G2', G3', G4', G5', and G6'. The driver 15 feeds the final gate signals G1, G2, G3, G4, G5, and G6 to the gates of the IGBT's 1, 2, 3, 4, 5, and 6, respectively.

The basic relation among the final voltage command value U, the states of the IGBT's 1 and 2, and the related voltage fed to the three-phase AC motor 9 is as follows. The U-phase arm in the inverter main circuit 7 has the IGBT's 1 and 2. When the final voltage command value U is higher than the level of the carrier wave, the IGBT 1 is in its on state and the IGBT 2 is in its off state so that the positive-side voltage of the battery 8 is transmitted to the U-phase winding of the three-phase AC motor 9. On the other hand, when the final voltage command value U is lower than the level of the carrier wave, the IGBT 1 is in its off state and the IGBT 2 is in its on state so that the negative-side voltage of the battery 8 is transmitted to the U-phase winding of the three-phase AC motor 9. Accordingly, during every period of the carrier wave, the positive-side voltage of the battery 8 continues to be transmitted to the U-phase winding of the three-phase AC motor 9 only for a time interval proportional to the final voltage command value U.

The basic relation among the final voltage command value V, the states of the IGBT's 3 and 4, and the related voltage fed to the three-phase AC motor 9 is similar to the above-indicated basic relation for the U phase. In addition, the basic relation among the final voltage command value W, the states of the IGBT's 5 and 6, and the related voltage fed to the three-phase AC motor 9 is similar to the above-indicated basic relation for the U phase. Therefore, the positive-side voltage of the battery 8 and the negative-side voltage thereof are selectively transmitted to the V-phase and W-phase windings of the three-phase AC motor 9 in response to the final voltage command values V and W.

Each of the basic voltage command values U*, V*, and W* and the final voltage command values U, V, and W** is a variable between −1 and +1. In the case where each of the voltage command values U*, V*, W*, U, V, and W** is represented by an 8-bit data piece, 256 equally-spaced voltage values are set in the range between −1 and +1. The 256 different states of the 8-bit data piece, that is, the 256 different numbers (0–255) which can be represented by the 8-bit data piece, are assigned to the respective 256 voltage values in a regular order. The 8-bit number "0" corresponds to the voltage value "−1". The 8-bit number "255" corresponds to the voltage value "+1". The 8-bit number "127" corresponds to the voltage value "0".

When the final voltage command value U is equal to −1, the modulation percentage of the U-phase PWM signal is 0% and also the duty cycle thereof is 0%. Thus, in this case, the IGBT's 1 and 2 for the U phase do not implement switching. When the final voltage command value U is equal to +1, the modulation percentage of the U-phase PWM signal is 100% and also the duty cycle thereof is 100%. Thus, in this case, the IGBT's 1 and 2 for the U phase do not implement switching.

When the final voltage command value V is equal to −1, the modulation percentage of the V-phase PWM signal is 0% and also the duty cycle thereof is 0%. Thus, in this case, the IGBT's 3 and 4 for the V phase do not implement switching. When the final voltage command value V is equal to +1, the modulation percentage of the V-phase PWM signal is 100% and also the duty cycle thereof is 100%. Thus, in this case, the IGBT's 3 and 4 for the V phase do not implement switching.

When the final voltage command value W is equal to −1, the modulation percentage of the W-phase PWM signal is 0% and also the duty cycle thereof is 0%. Thus, in this case, the IGBT's 5 and 6 for the W phase do not implement switching. When the final voltage command value W is equal to +1, the modulation percentage of the W-phase PWM signal is 100% and also the duty cycle thereof is 100%. Thus, in this case, the IGBT's 5 and 6 for the W phase do not implement switching.

Figure 7:
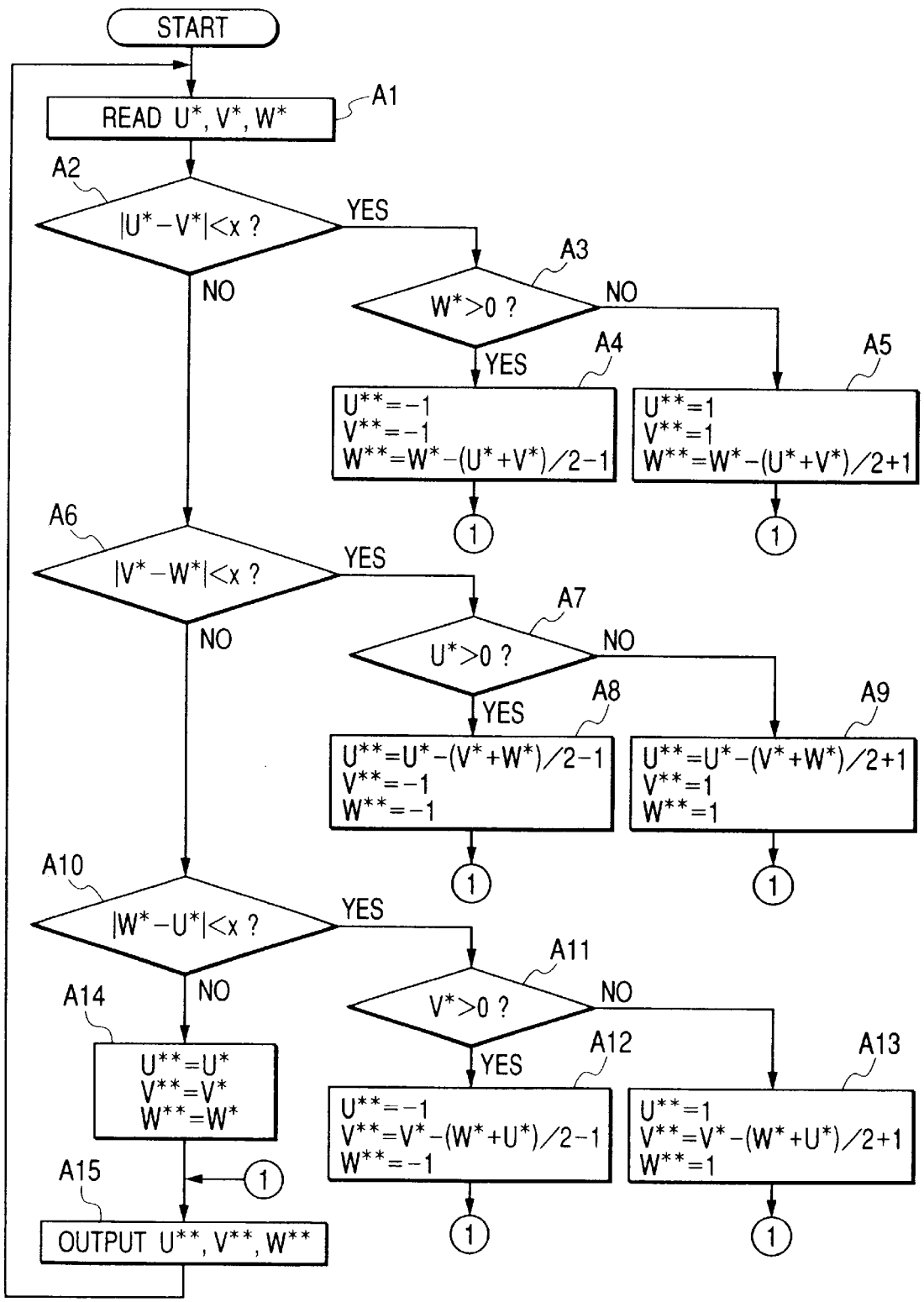
FIG. 7 is a flowchart of a program for a command value converter in FIG. 5.

FIG. 7 is a flowchart of a program for the command value converter 21. With reference to FIG. 7, a first step A1 of the program gets or reads the basic voltage command values U*, V*, and W*.

A step A2 following the step A1 subtracts the basic voltage command value V* from the basic voltage command value U*. The step A2 calculates the absolute value of the subtraction result. Thus, the step A2 calculates "|U*−V*|". The step A2 compares the calculated absolute value "|U*−V*|" with a predetermined reference value "x". When the absolute value "|U*−V*|" is smaller than the predetermined reference value "x", the program advances from the step A2 to a step A3. Otherwise, the program advances from the step A2 to a step A6.

The step A3 determines whether or not the basic voltage command value W* is positive, that is, whether or not the basic voltage command value W* is greater than the voltage value "0" (corresponding to the 8-bit number "127"). When the basic voltage command value W* is positive, the program advances from the step A3 to a step A4. Otherwise, the program advances from the step A3 to a step A5.

The step A4 sets the final voltage command values U and V to −1 (corresponding to the 8-bit number "0"). As a result, the modulation percentage of the U-phase and V-phase PWM signals is equalized to 0% and also the duty cycle thereof is equalized to 0%. Thus, the IGBT's 1, 2, 3, and 4 for the U phase and the V phase do not implement switching. The step A4 calculates the final voltage command value W** from the basic voltage command values U*, V*, and W* according to the following equation.

$$W^{**}=W^{*}-(U^{*}+V^{*})/2-1$$

This equation is designed to minimize the inter-line voltage differences of the W phase from the U phase and the V phase. Specifically, this equation sets the final voltage command value W** to a mean between the inter-line voltage differences of the W phase from the U phase and the V phase. After the step A4, the program advances to a step A15.

The step A5 sets the final voltage command values U and V to +1 (corresponding to the 8-bit number "255"). As a result, the modulation percentage of the U-phase and V-phase PWM signals is equalized to 100% and also the duty cycle thereof is equalized to 100%. Thus, the IGBT's 1, 2, 3, and 4 for the U phase and the V phase do not implement switching. The step A5 calculates the final voltage command value W** from the basic voltage command values U*, V*, and W* according to the following equation.

$$W^{**}=W-(U+V^{*})/2+1$$

This equation is designed to minimize the inter-line voltage differences of the W phase from the U phase and the V phase. Specifically, this equation sets the final voltage command value W** to a mean between the inter-line voltage differences of the W phase from the U phase and the V phase. After the step A5, the program advances to the step A15.

The step A6 subtracts the basic voltage command value W* from the basic voltage command value V*. The step A6 calculates the absolute value of the subtraction result. Thus, the step A6 calculates "|V*−W*|". The step A6 compares the calculated absolute value "|V*−W*|" with the predetermined reference value "x". When the absolute value "|V*−W*|" is smaller than the predetermined reference value "x", the program advances from the step A6 to a step A7. Otherwise, the program advances from the step A6 to a step A10.

The step A7 determines whether or not the basic voltage command value U* is positive, that is, whether or not the basic voltage command value U* is greater than the voltage value "0" (corresponding to the 8-bit number "127"). When the basic voltage command value U* is positive, the program advances from the step A7 to a step A8. Otherwise, the program advances from the step A7 to a step A9.

The step A8 sets the final voltage command values V and W to −1 (corresponding to the 8-bit number "0"). As a result, the modulation percentage of the V-phase and W-phase PWM signals is equalized to 0% and also the duty cycle thereof is equalized to 0%. Thus, the IGBT's 3, 4, 5, and 6 for the V phase and the W phase do not implement switching. The step A8 calculates the final voltage command value U** from the basic voltage command values U*, V*, and W* according to the following equation.

$$U^{**}=U^*-(V^*+W^*)/2-1$$

This equation is designed to minimize the inter-line voltage differences of the U phase from the V phase and the W phase. Specifically, this equation sets the final voltage command value U** to a mean between the inter-line voltage differences of the U phase from the V phase and the W phase. After the step A8, the program advances to the step A15.

The step A9 sets the final voltage command values V and W to +1 (corresponding to the 8-bit number "255"). As a result, the modulation percentage of the V-phase and W-phase PWM signals is equalized to 100% and also the duty cycle thereof is equalized to 100%. Thus, the IGBT's 3, 4, 5, and 6 for the V phase and the W phase do not implement switching. The step A9 calculates the final voltage command value U** from the basic voltage command values U*, V*, and W* according to the following equation.

$$U^{**}=U^*-(V^*+W^*)/2+1$$

This equation is designed to minimize the inter-line voltage differences of the U phase from the V phase and the W phase. Specifically, this equation sets the final voltage command value U** to a mean between the inter-line voltage differences of the U phase from the V phase and the W phase. After the step A9, the program advances to the step A15.

The step A10 subtracts the basic voltage command value U* from the basic voltage command value W*. The step A10 calculates the absolute value of the subtraction result. Thus, the step A10 calculates "|W*−U*|". The step A10 compares the calculated absolute value "|W*−U*|" with the predetermined reference value "x". When the absolute value "|W*−U*|" is smaller than the predetermined reference value "x", the program advances from the step A10 to a step A11. Otherwise, the program advances from the step A10 to a step A14.

The step A11 determines whether or not the basic voltage command value V* is positive, that is, whether or not the basic voltage command value V* is greater than the voltage value "0" (corresponding to the 8-bit number "127"). When the basic voltage command value V* is positive, the program advances from the step A11 to a step A12. Otherwise, the program advances from the step A11 to a step A13.

The step A12 sets the final voltage command values U and W to −1 (corresponding to the 8-bit number "0"). As a result, the modulation percentage of the U-phase and W-phase PWM signals is equalized to 0% and also the duty cycle thereof is equalized to 0%. Thus, the IGBT's 1, 2, 5, and 6 for the U phase and the W phase do not implement switching. The step A12 calculates the final voltage com mand value V** from the basic voltage command values U*, V*, and W* according to the following equation.

$$V^{**}=V^*-(W^*+U^*)/2-1$$

This equation is designed to minimize the inter-line voltage differences of the V phase from the U phase and the W phase. Specifically, this equation sets the final voltage command value V** to a mean between the inter-line voltage differences of the V phase from the U phase and the W phase. After the step A12, the program advances to the step A15.

The step A13 sets the final voltage command values U and W to +1 (corresponding to the 8-bit number "255"). As a result, the modulation percentage of the U-phase and W-phase PWM signals is equalized to 100% and also the duty cycle thereof is equalized to 100%. Thus, the IGBT's 1, 2, 5, and 6 for the U phase and the W phase do not implement switching. The step A13 calculates the final voltage command value V** from the basic voltage command values U*, V*, and W* according to the following equation.

$$V^{**}=V^*-(W^*+U^*)/2+1$$

This equation is designed to minimize the inter-line voltage differences of the V phase from the U phase and the W phase. Specifically, this equation sets the final voltage command value V** to a mean between the inter-line voltage differences of the V phase from the U phase and the W phase. After the step A13, the program advances to the step A15.

The step A14 sets the final voltage command values U, V, and W** equal to the basic voltage command values U*, V*, and W*, respectively. After the step A14, the program advances to the step A15.

The step A15 outputs the final voltage command values U, V, and W** to the PWM waveform generator 11. After the step A15, the program returns to the step A1.

Figure 8:
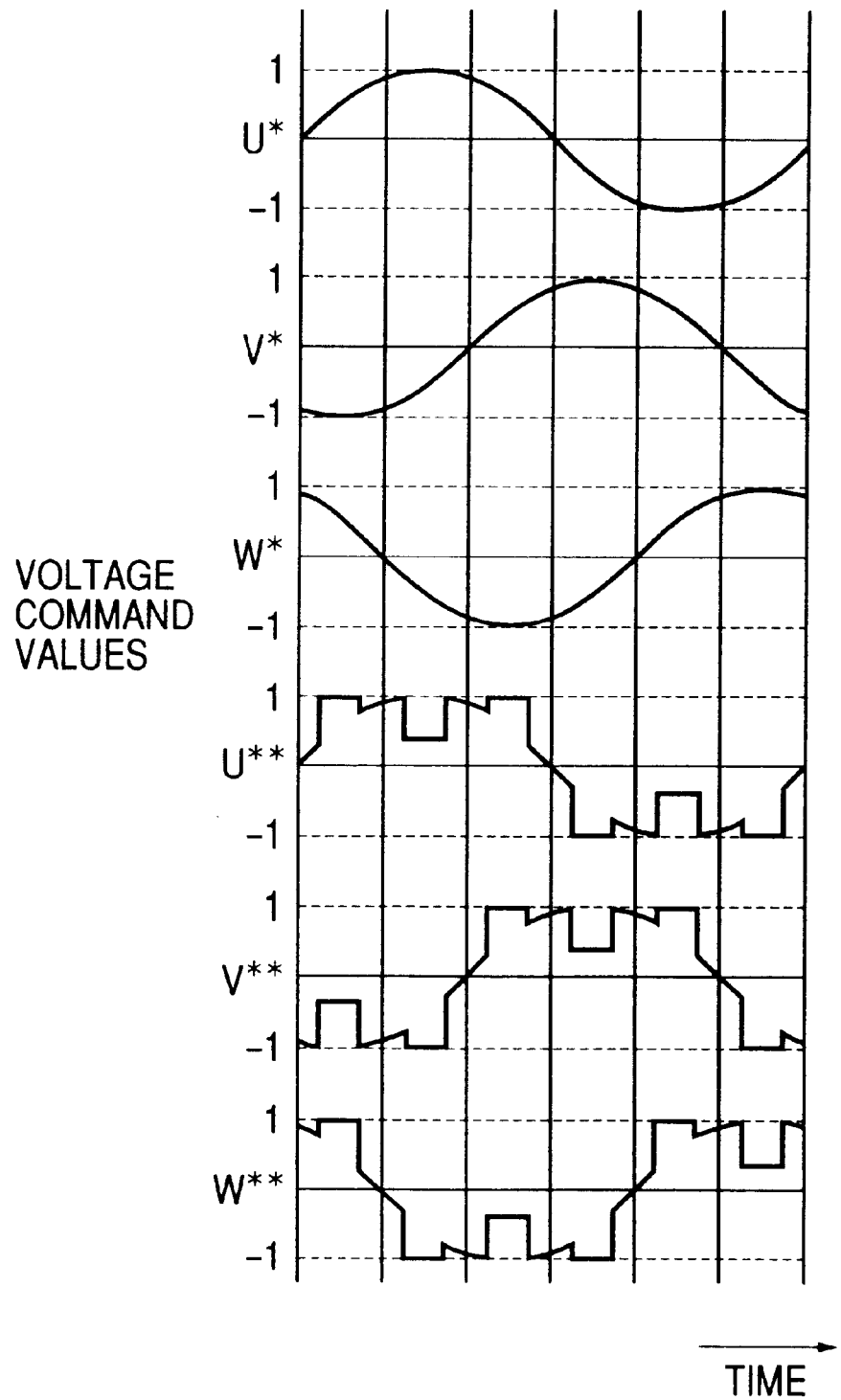
FIG. 8 is a time-domain diagram of basic voltage command values and final voltage command values.

FIG. 8 shows an example of time-domain conditions of the voltage command values U*, V*, W*, U, V, and W**. With reference to FIG. 8, the basic voltage command values U*, V*, and W* vary in smooth sinusoids while the final voltage command values U, V, and W** vary along jagged waveforms whose base lines reflect the sinusoids of the basic voltage command values U*, V*, and W*.

Figure 9:
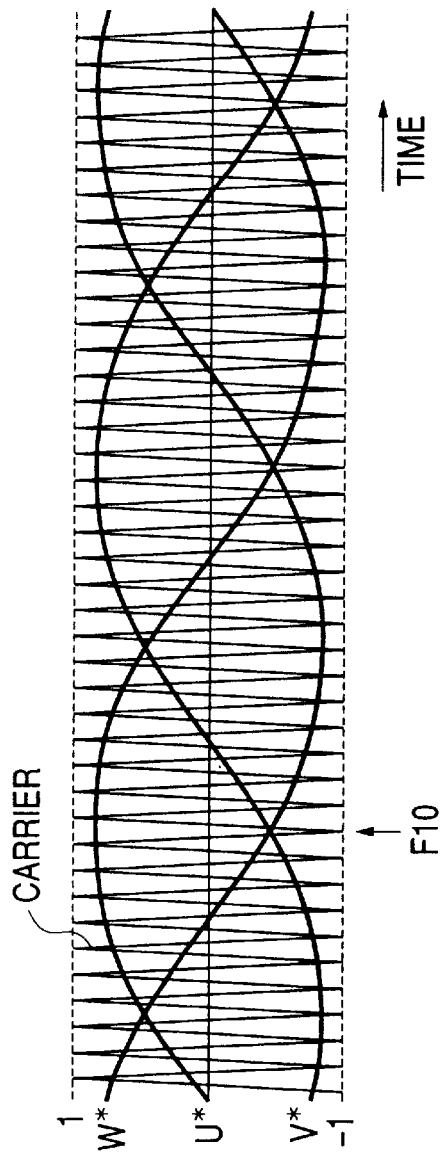
FIG. 9 is a time-domain diagram of basic voltage command values and a carrier wave.
Figure 11:
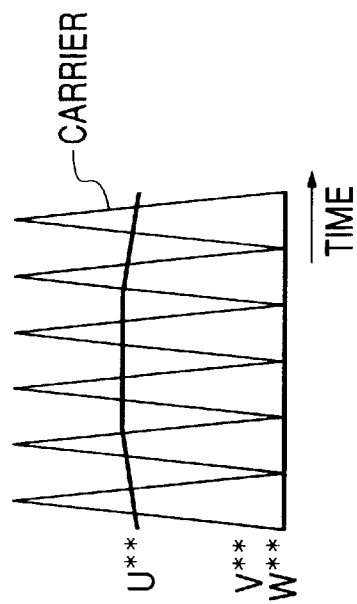
FIG. 11 is a time-domain diagram of final voltage command values and a carrier wave in a time region corresponding to that in FIG. 10.
Figure 10:
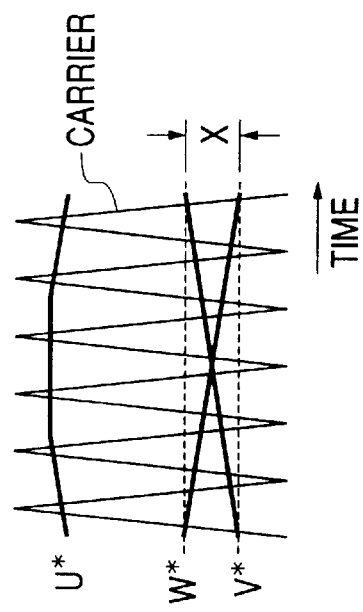
FIG. 10 is a time-domain diagram of a portion in FIG. 9.

FIG. 9 shows an example of time-domain conditions of the carrier wave and the basic voltage command values U*, V*, and W*. FIG. 10 shows a portion of FIG. 9 which is denoted by the arrow F10. FIG. 11 shows time-domain conditions of the carrier wave and the final command values U, V, and W** generated from the basic voltage command values U*, V*, and W* in FIG. 10. For an easy understanding, the period of the illustrated carrier wave in each of FIGS. 9–11 is longer than actual one.

With reference to FIGS. 9–11, in a time region at and near the intersection of the basic voltage command values V* and W*, the basic voltage command values V* and W* are close to each other. During a time interval for which the absolute value of the difference between the basic voltage command values V* and W* is smaller than the predetermined reference value "x" (that is, |V*−W*|<x), the program (see FIG. 7) for the command value converter 21 advances from the step A6 to the step A7. When the step A7 decides that the basic voltage command value U* is positive, the command value converter 21 sets the final voltage command values V and W as follows (the step A8).

$$V^{}=W^{}=-1 \text{ (corresponding to the 8-bit number "0")} \quad (1)$$

As a result, the modulation percentage of the V-phase and W-phase PWM signals is equalized to 0% and also the duty cycle thereof is equalized to 0%. Thus, the IGBT's 3, 4, 5, and 6 for the V phase and the W phase do not implement switching. In addition, the command value converter 21 calculates the final voltage command value U** from the basic voltage command values U*, V*, and W* according to the following equation.

$$U^{**}=U^{*}-(V^{*}+W^{*})/2-1 \tag{2}$$

The equation (2) is designed to minimize the inter-line voltage differences of the U phase from the V phase and the W phase. Specifically, the equation (2) sets the final voltage command value U to a mean between the inter-line voltage differences of the U phase from the V phase and the W phase. The command value converter 21 outputs the final voltage command values U, V, and W to the PWM waveform generator 11 (the step A15).

On the other hand, when the step A7 decides that the basic voltage command value U* is not positive, the command value converter 21 sets the final voltage command values V and W as follows (the step A9).

$$V^{}=W^{}=+1 \text{ (corresponding to the 8-bit number ``255'')} \tag{3}$$

As a result, the modulation percentage of the V-phase and W-phase PWM signals is equalized to 100% and also the duty cycle thereof is equalized to 100%. Thus, the IGBT's 3, 4, 5, and 6 for the V phase and the W phase do not implement switching. In addition, the command value converter 21 calculates the final voltage command value U** from the basic voltage command values U*, V*, and W* according to the following equation.

$$U^{**}=U^{*}-(V^{*}+W^{*})/2+1 \tag{4}$$

Thereafter, the command value converter 21 outputs the final voltage command values U, V, and W to the PWM waveform generator 11 (the step A15**).

During a time interval for which the absolute value of the difference between the basic voltage command values U* and V* is smaller than the predetermined reference value "x" (that is, |U*−V*|<x), the program (see FIG. 7) for the command value converter 21 advances from the step A2 to the step A3. When the step A3 decides that the basic voltage command value W* is positive, the command value converter 21 sets the final voltage command values U and V as follows (the step A4).

$$|U^{}=V^{}=-1 \text{ (corresponding to the 8-bit number ``0'')} \tag{5}$$

In addition, the command value converter 21 calculates the final voltage command value W** from the basic voltage command values U*, V*, and W* according to the following equation.

$$W^{**}=W^{*}-(U+V^{*})/2-1 \tag{6}$$

Thereafter, the command value converter 21 outputs the final voltage command values U, V, and W to the PWM waveform generator 11 (the step A15**).

On the other hand, when the step A3 decides that the basic voltage command value W* is not positive, the command value converter 21 sets the final voltage command values U and V as follows (the step A5).

$$U^{}=V^{}=+1 \text{ (corresponding to the 8-bit number ``255'')} \tag{7}$$

In addition, the command value converter 21 calculates the final voltage command value W** from the basic voltage command values U*, V*, and W* according to the following equation.

$$W^{**}=W^{*}-(U+V^{*})/2 +1 \tag{8}$$

Thereafter, the command value converter 21 outputs the final voltage command values U, V, and W to the PWM waveform generator 11 (the step A15**).

During a time interval for which the absolute value of the difference between the basic voltage command values W* and U* is smaller than the predetermined reference value "x" (that is, |W*−U*|<x), the program (see FIG. 7) for the command value converter 21 advances from the step A10 to the step A11. When the step A11 decides that the basic voltage command value V* is positive, the command value converter 21 sets the final voltage command values U and W as follows (the step A12).

$$U^{} W^{}=-1 \text{ (corresponding to the 8-bit number ``0'')} \tag{9}$$

In addition, the command value converter 21 calculates the final voltage command value V** from the basic voltage command values U*, V*, and W* according to the following equation.

$$V^{**}=V^{*}-(W^{*}+U^{*})/2-1 \tag{10}$$

Thereafter, the command value converter 21 outputs the final voltage command values U, V, and W to the PWM waveform generator 11 (the step A15**).

On the other hand, when the step A11 decides that the basic voltage command value V* is not positive, the command value converter 21 sets the final voltage command values U and W as follows (the step A13).

$$U^{}=W^{}=+1 \text{ (corresponding to the 8-bit number ``255'')} \tag{1}$$

In addition, the command value converter 21 calculates the final voltage command value V** from the basic voltage command values U*, V*, and W* according to the following equation.

$$V^{**}=V^{*}-(W^{*}+U^{*})/2+1 \tag{12}$$

Thereafter, the command value converter 21 outputs the final voltage command values U, V, and W to the PWM waveform generator 11 (the step A15**).

During a time interval for which none of the conditions "|U*−V*|<x", "|V*−W*|<x", and "|W*−U*|<x" is satisfied, the program (see FIG. 7) for the command value converter 21 advances to the step A14. In this case, the command value converter 21 sets the final voltage command values U, V, and W** equal to the basic voltage command values U*, V*, and W*, respectively (the step A14). Thereafter, the command value converter 21 outputs the final voltage command values U, V, and W to the PWM waveform generator 11 (the step A15**).

According to the first embodiment of this invention, when the absolute value of the difference between two of the basic voltage command values U*, V*, and W* is smaller than the predetermined reference value "x", the corresponding two final voltage command values are set to the maximum (+1) or the minimum (−1) so that the corresponding two phases are not subjected to switching. Therefore, it is possible to reduce the frequency of the switching of the IGBT's 1–6 without decreasing the frequency of the carrier wave. The reduction in the switching frequency causes a decrease in the switching losses by the IGBT's 1–6. Thus, a cooling device can be miniaturized and simplified. Accordingly, the power converter apparatus can be reduced in size and cost. Furthermore, the switching frequency can be set to a higher value.

According to the first embodiment of this invention, when the absolute value of the difference between two of the basic voltage command values U*, V*, and W* is smaller than the predetermined reference value "x", the final voltage command value other than the corresponding two final voltage command values is set to a mean between the inter-line voltage differences of the related phase from the two other phases. Therefore, it is possible to suppress distortions of the waveforms of phase currents in the three-phase AC motor 9. Furthermore, the driving power fed to the three-phase AC motor 9 can be substantially equal to that available in the absence of the conversion of the basic voltage command values U*, V*, and W* into the final voltage command values U, V, and W**.

In the first embodiment of this invention, the basic voltage command values U*, V*, and W* are based on amplitude variations in sinusoidal waves. Thus, the waveforms of the phase currents in the three-phase AC motor 9 are similar to sinusoids so that the three-phase AC motor 9 can be driven at a low vibration level and a low noise level.

Second Embodiment

Figure 12:
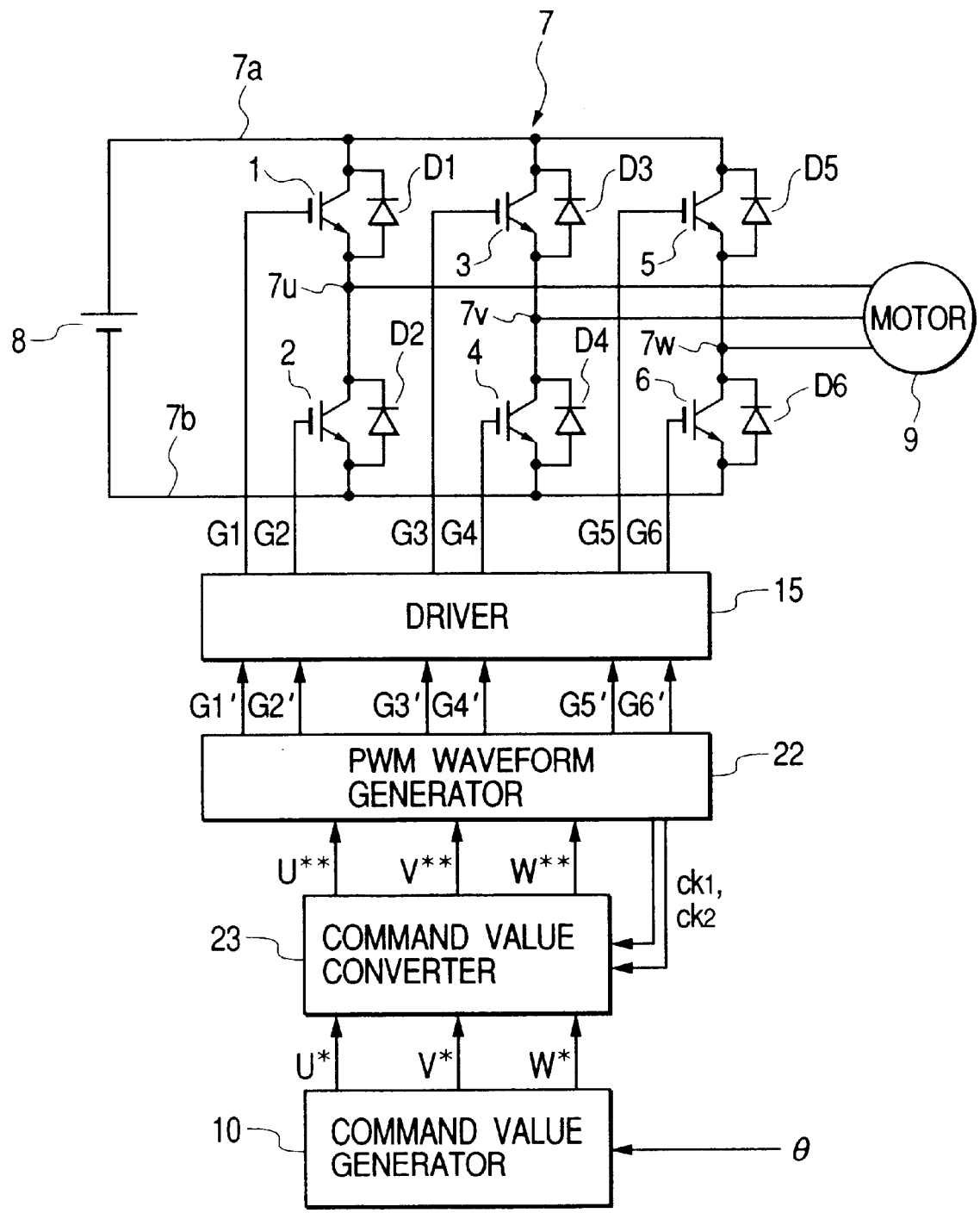
FIG. 12 is a diagram of a power converter apparatus according to a second embodiment of this invention.

FIG. 12 shows a power converter apparatus (an inverter apparatus) according to a second embodiment of this invention.

The power converter apparatus of FIG. 12 is similar to the power converter apparatus of FIG. 5 except for design changes mentioned later.

The power converter apparatus of FIG. 12 includes a PWM waveform generator 22 and a command value converter 23 instead of the PWM waveform generator 11 and the command value converter 21 (see FIG. 5).

Figure 13:
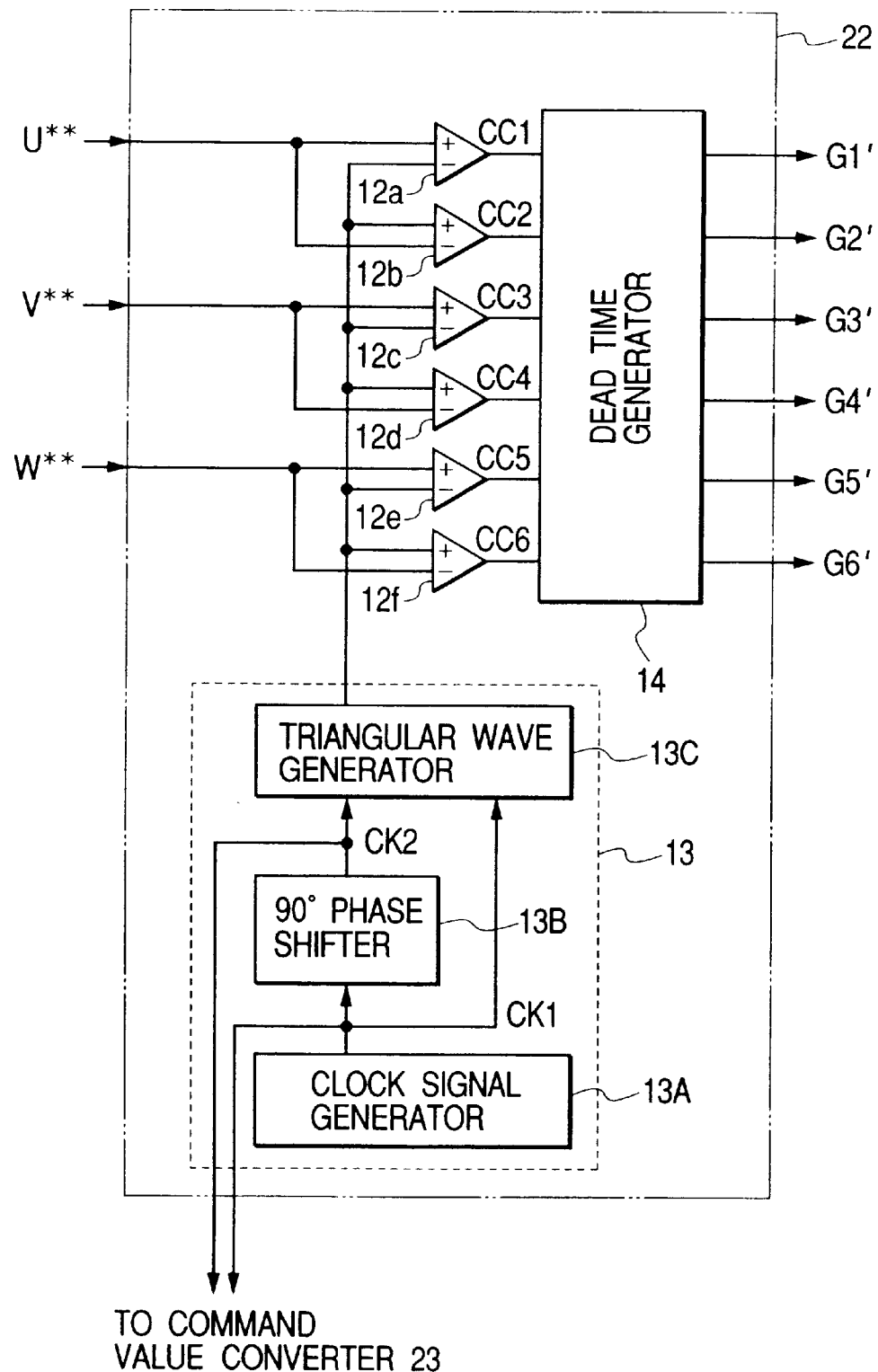
FIG. 13 is a block diagram of a PWM waveform generator in FIG. 12.

As shown in FIG. 13, a carrier wave generator 13 in the PWM waveform generator 22 includes a clock signal generator 13A, a phase shifter 13B, and a triangular wave generator 13C. The clock signal generator 13A outputs a first clock signal ck1 to the triangular wave generator 13C and the phase shifter 13B. The device 13B shifts the phase of the first clock signal ck1 by 90°, thereby changing the first clock signal ck1 into a second clock signal ck2. The phase shifter 13B outputs the second clock signal ck2 to the triangular wave generator 13C. The triangular wave generator 13C produces a triangular carrier wave in response to the first and second clock signals ck1 and ck2. The triangular wave generator 13C outputs the triangular carrier wave to comparators 12a–12f. The first clock signal ck1 is fed from the clock signal generator 13A to the command value converter 23 (see FIG. 12). The second clock signal ck2 is fed from the phase shifter 13B to the command value converter 23 (see FIG. 12).

Figure 14:
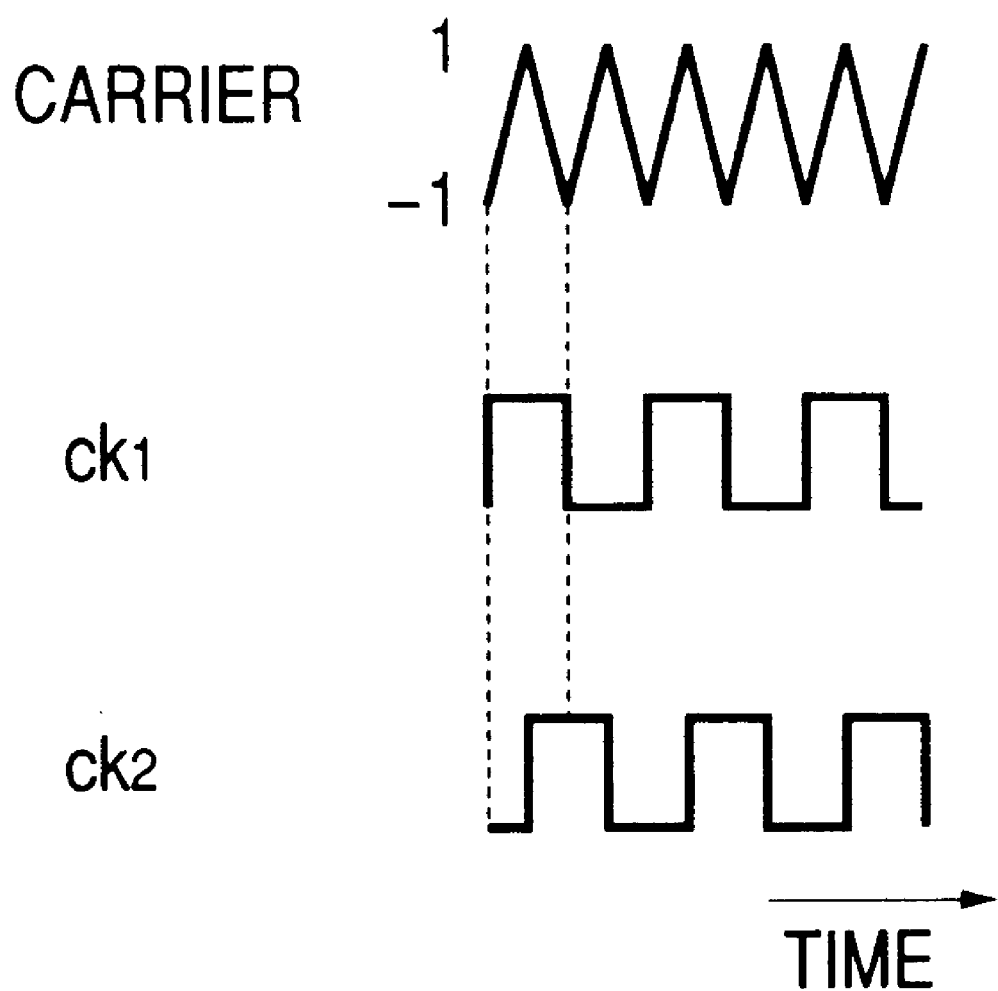
FIG. 14 is a time-domain diagram of a carrier wave, a first clock signal, and a second clock signal.

As shown in FIG. 14, the period of the first clock signal ck1 is equal to twice the period of the carrier wave. The logic state of the first clock signal ck1 changes every time the carrier wave bottoms to −1 (the minimum). The second clock signal ck2 has a 90° phase delay from the first clock signal ck1.

The command value converter 23 is formed by, for example, a DSP or a similar device which operates in accordance with a program stored in its internal ROM. The program is designed to enable the command value converter 23 to implement processes mentioned later. The command value converter 23 receives the basic voltage command values U*, V*, and W* from the command value generator 10. The command value converter 23 generates a final voltage command value U for the U phase, a final voltage command value V for the V phase, and a final voltage command value W** for the W phase in response to the basic voltage command values U*, V*, and W* and the first and second clock signals ck1 and ck2. The command value converter 23 informs the PWM waveform generator 22 of the final voltage command values U, V, and W**. Operation of the PWM waveform generator 22 is basically similar to that of the PWM waveform generator 11 (see FIG. 5).

Figure 15:
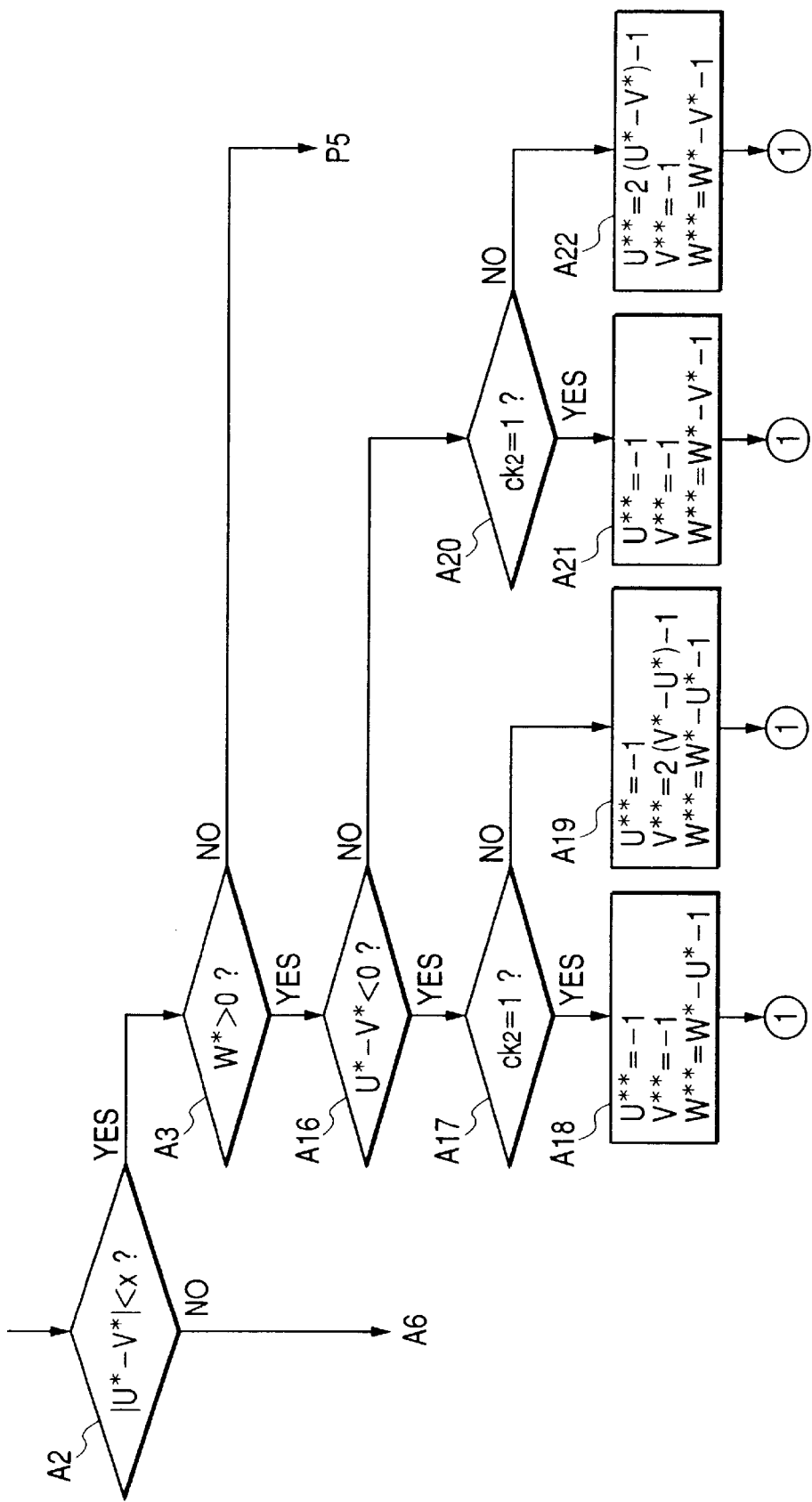
FIGS. 15, 16, and 17 are flowcharts of portions of a program for a command value converter in FIG. 12.
Figure 16:
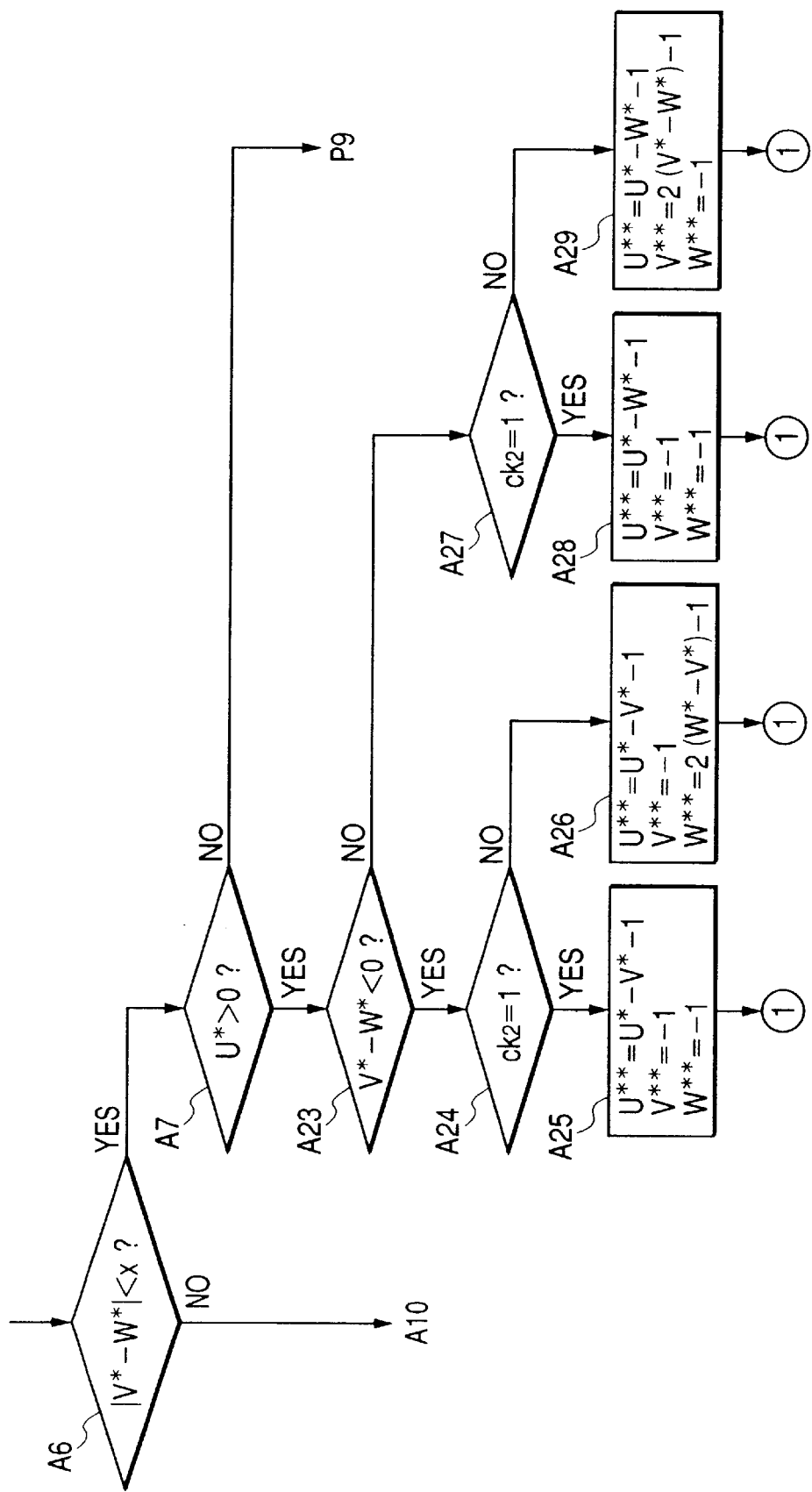
Figure 17:
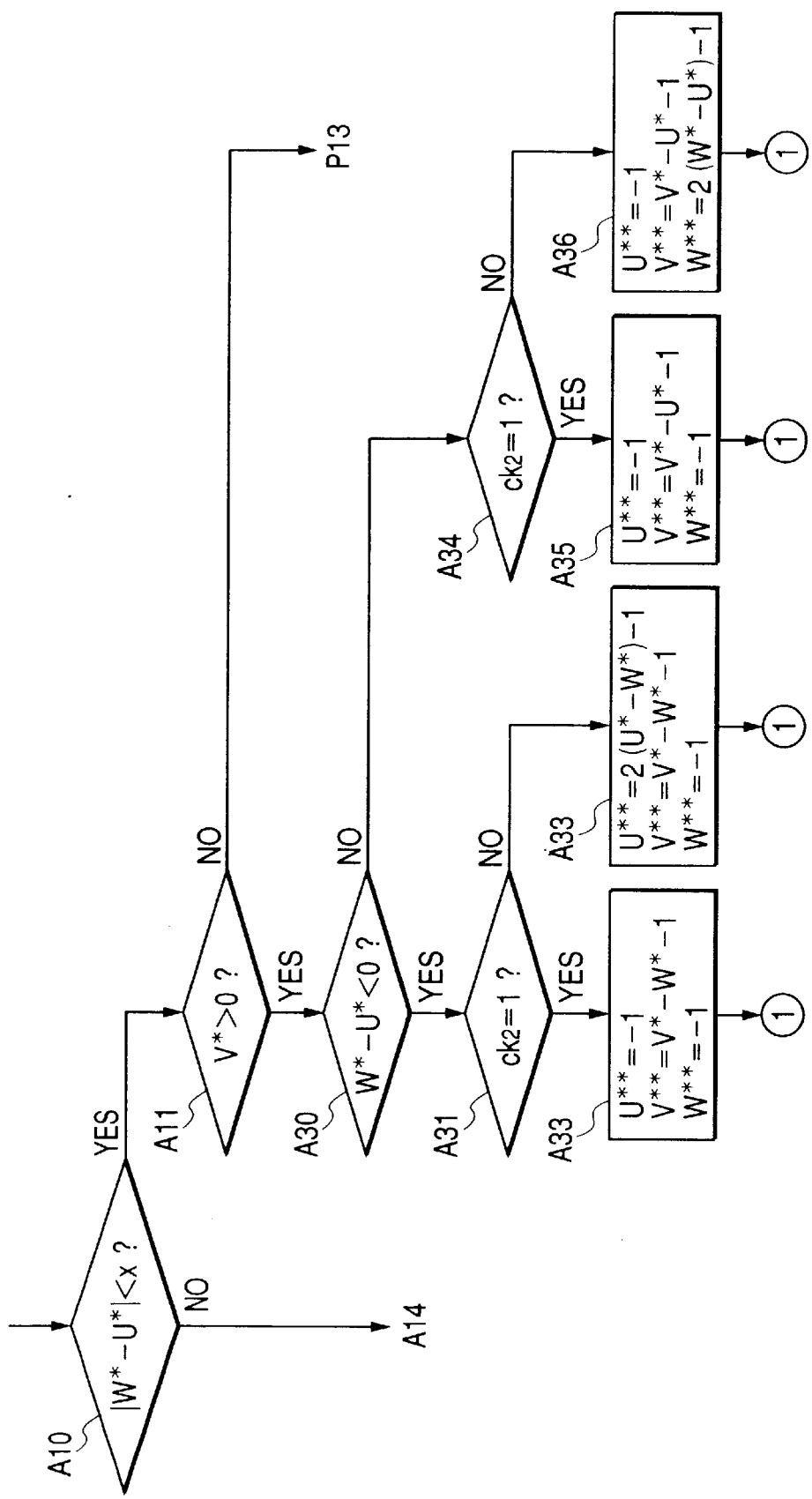

A program for the command value converter 23 is similar to that for the command value converter 21 (see FIG. 5) except for design changes mentioned later. FIGS. 15, 16, and 17 are flowcharts of portions of the program for the command value converter 23.

With reference to FIG. 16, when the step A7 decides that the basic voltage command value U* is positive, the program advances from the step A7 to a step A23. Otherwise, the program advances from the step A7 to a block P9.

The step A23 subtracts the basic voltage command value W* from the basic voltage command value V*. The step A23 determines whether or not the subtraction result is negative, that is, whether or not V*−W*<0. When the subtraction result is negative, the program advances from the step A23 to a step A24. Otherwise, the program advances from the step A23 to a step A27.

The step A24 determines whether or not the second clock signal ck2 is "1" (a high-level state). When the second clock signal ck2 is "1", the program advances from the step A24 to a step A25. Otherwise, the program advances from the step A24 to a step A26.

The step A25 calculates the final voltage command value U** from the basic voltage command values U* and V* according to the following equation.

$$U^{**}=U^*-V^*-1 \tag{13}$$

The equation (13) enables the final voltage command value U to maintain the inter-line voltage difference between the U phase and the V phase. The step A25 sets the final voltage command values V and W** as follows.

$$V^{}=W^{}-1 \tag{14}$$

After the step A25, the program advances to the step A15 (see FIG. 7).

The step A26 calculates the final voltage command value U** from the basic voltage command values U* and V* according to the following equation.

$$U^{**}=U^*-V^*-1 \tag{15}$$

The step A26 sets the final voltage command value V** as follows.

$$V^{**}=-1 \tag{16}$$

The step A26 calculates the final voltage command value W** from the basic voltage command values W* and V* according to the following equation.

$$W^{**}=2(W^*-V^*)-1 \tag{17}$$

The equation (17) equalizes the final voltage command value W to twice the inter-line voltage difference between the W phase and the V phase. This setting of the final voltage command value W is to compensate for fixing the value W** to −1 during the immediately-preceding period with respect to the carrier wave. After the step A26, the program advances to the step A15 (see FIG. 7).

The step A27 determines whether or not the second clock signal ck2 is "1" (the high-level state). When the second clock signal ck2 is "1", the program advances from the step A27 to a step A28. Otherwise, the program advances from the step A27 to a step A29.

The step A28 calculates the final voltage command value U** from the basic voltage command values U* and W* according to the following equation.

$$U^{**}=U^*-W^*-1 \tag{18}$$

The step A28 sets the final voltage command values V and W to −1. After the step A28, the program advances to the step A15 (see FIG. 7).

The step A29 calculates the final voltage command value U** from the basic voltage command values U* and W* according to the following equation.

$$U^{**}=U^*-W^*-1 \tag{19}$$

The step A29 calculates the final voltage command value V** from the basic voltage command values V* and W* according to the following equation.

$$V^{**}=2(V^*-W^*)-1 \tag{20}$$

The step A29 sets the final voltage command value W** as follows.

$$W^{**}=-1 \tag{21}$$

After the step A29, the program advances to the step A15 (see FIG. 7).

Figure 18:
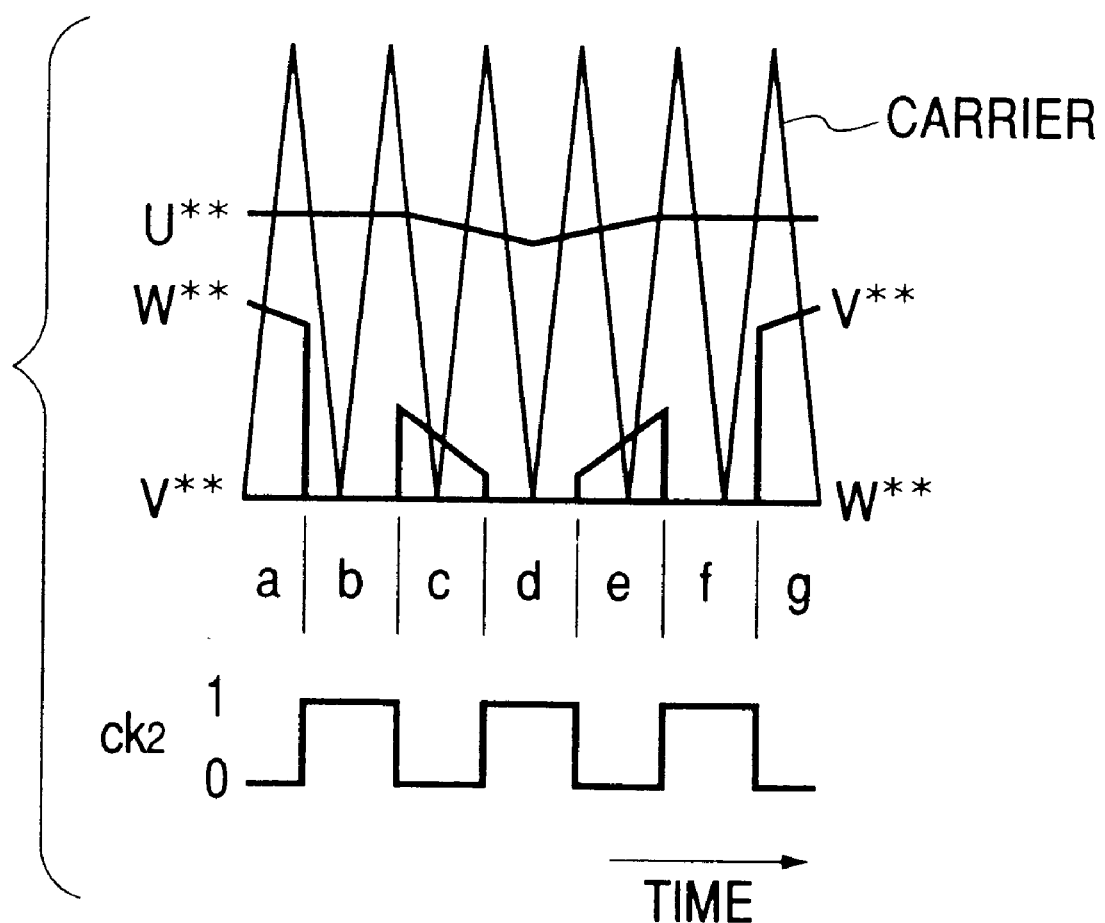
FIG. 18 is a time-domain diagram of final voltage command values, a carrier wave, and a second clock signal.

FIG. 18 shows an example of time-domain conditions of the final voltage command values U, V, and W**, the carrier wave, and the second clock signal ck2. In FIG. 18, there is a sequence of time intervals "a", "b", "c", "d", "e", "f", and "g". During the time intervals "a", "c", and "e", the second clock signal ck2 is "0" (a low level state). During the time intervals "b", "d", and "f", the second clock signal ck2 is "1" (a high level state). In the time interval "d", the basic voltage command values V* and W* intersect with each other. Thus, during the time intervals "a"–"c" and the former portion of the time interval "d", there occurs a condition as V*<W*. During the latter portion of the time interval "d" and the time intervals "e"–"g", there occurs a condition as V*>W*.

With reference to FIG. 18, during the time intervals "b", "d", and "f" for which the second clock signal ck2 is "1", the final voltage command values V and W are fixed to −1 (the minimum) so that one-phase modulation is implemented in response to the final voltage command value U (first conversion time intervals). During the time intervals "a" and "c" for which the second clock signal ck2 is "0", only the final voltage command value V is fixed to −1 (the minimum) so that two-phase modulation is implemented in response to the final voltage command values U and W (second conversion time intervals). During the time intervals "e" and "g" for which the second clock signal ck2 is "0", only the final voltage command value W is fixed to −1 (the minimum) so that two-phase modulation is implemented in response to the final voltage command values U and V** (the second conversion time intervals). Thus, one-phase modulation and two-phase modulation alternate at twice the period of the carrier wave (that is, n=1).

The block P9 (see FIG. 16) in the program has steps corresponding to the steps A23–A29. The block P9 implements "V=+1" and "W=+1" instead of "V=−1" and "W=−1", respectively. The block P9 implements "U**=U*−V*+1" and "U**=U*−W*+1" instead of "U**=U*−V*−1" and "U**=U*−W*−1", respectively. The block P9 executes a decision as to "W*−V*<0" instead of "V*−W*<0" (see step A23). The block P9 implements "W**=2(W*−V*)+1" and "V**=2(V*−W*)+1" instead of "W**=2(W*−V*)−1" and "V**=2(V*−W*)−1", respectively. The block P9 refers to the first clock signal ck1 rather than the second clock signal ck2.

With reference to FIG. 15, when the step A3 decides that the basic voltage command value W* is positive, the program advances from the step A3 to a step A16. Otherwise, the program advances from the step A3 to a block P5.

The step A16 subtracts the basic voltage command value V* from the basic voltage command value U*. The step A16 determines whether or not the subtraction result is negative, that is, whether or not U*−V*<0. When the subtraction result is negative, the program advances from the step A16 to a step A17. Otherwise, the program advances from the step A16 to a step A20.

The step A17 determines whether or not the second clock signal ck2 is "1" (the high-level state). When the second clock signal ck2 is "1", the program advances from the step A17 to a step A18. Otherwise, the program advances from the step A17 to a step A19.

The step A18 sets the final voltage command values U and V as follows.

$$U^{}=V^{}=-1 \tag{22}$$

The step A18 calculates the final voltage command value W** from the basic voltage command values W* and U* according to the following equation.

$$W^{**}=W^*-U^*-1 \tag{23}$$

After the step A18, the program advances to the step A15 (see FIG. 7).

The step A19 sets the final voltage command value U** as follows.

$$U^{**}=-1 \tag{24}$$

The step A19 calculates the final voltage command value V** from the basic voltage command values U* and V* according to the following equation.

$$V^{**}=2(V^*-U^*)-1 \tag{25}$$

The step A19 calculates the final voltage command value W** from the basic voltage command values U* and W* according to the following equation.

$$W^{**}=W^*-U-1 \tag{26}$$

After the step A19, the program advances to the step A15 (see FIG. 7).

The step A20 determines whether or not the second clock signal ck2 is "1" (the high-level state). When the second clock signal ck2 is "1", the program advances from the step A20 to a step A21. Otherwise, the program advances from the step A20 to a step A22.

The step A21 sets the final voltage command values U and V to −1. The step A21 calculates the final voltage command value W** from the basic voltage command values W* and V* according to the following equation.

$$W^{**}=W^*-V^*-1 \quad (27)$$

After the step A21, the program advances to the step A15 (see FIG. 7).

The step A22 calculates the final voltage command value U** from the basic voltage command values U* and V* according to the following equation.

$$U^{**}=2(U^*-V^*)-1 \quad (28)$$

The step A22 sets the final voltage command value V** as follows.

$$V^{**}=-1 \quad (29)$$

The step A22 calculates the final voltage command value W** from the basic voltage command values V* and W* according to the following equation.

$$W^{**}=W^*-V^*-1 \quad (30)$$

After the step A22, the program advances to the step A15 (see FIG. 7).

The block P5 (see FIG. 15) in the program has steps corresponding to the steps A16–A22. The block P5 implements "U=+1" and "V=+1" instead of "U=−1" and "V=−1", respectively. The block P5 implements "W**=W*−U*+1" and "W**=W*−V*+1" instead of "W**=W*−U*−1" and "W**=W*−V*−1", respectively. The block P5 executes a decision as to "V*−U*<0" instead of "U*−V*<0" (see step A16). The block P5 implements "V**=2(V*−U*)+1" and "U**=2(U*−V*)+1" instead of "V**=2(V*−U*)−1" and "U**=2(U*−V*)−1", respectively. The block P5 refers to the first clock signal ck1 rather than the second clock signal ck2.

With reference to FIG. 17, when the step A11 decides that the basic voltage command value V* is positive, the program advances from the step A11 to a step A30. Otherwise, the program advances from the step A11 to a block P13.

The step A30 subtracts the basic voltage command value U* from the basic voltage command value W*. The step A30 determines whether or not the subtraction result is negative, that is, whether or not W*−U*<0. When the subtraction result is negative, the program advances from the step A30 to a step A31. Otherwise, the program advances from the step A30 to a step A34.

The step A31 determines whether or not the second clock signal ck2 is "1" (the high-level state). When the second clock signal ck2 is "1", the program advances from the step A31 to a step A32. Otherwise, the program advances from the step A31 to a step A33.

The step A32 sets the final voltage command values U and W as follows.

$$U^{}=W^{}=-1 \quad (31)$$

The step A32 calculates the final voltage command value V** from the basic voltage command values V* and W* according to the following equation.

$$V^{**}=V^*-W^*-1 \quad (32)$$

After the step A32, the program advances to the step A15 (see FIG. 7).

The step A33 calculates the final voltage command value U** from the basic voltage command values U* and W* according to the following equation.

$$U^{**}=2(U^*-W^*)-1 \quad (33)$$

The step A33 calculates the final voltage command value V** from the basic voltage command values V* and W* according to the following equation.

$$V^{**}=V^*-W^*-1 \quad (34)$$

The step A33 sets the final voltage command value W** as follows.

$$W^{**}=-1 \quad (35)$$

After the step A33, the program advances to the step A15 (see FIG. 7).

The step A34 determines whether or not the second clock signal ck2 is "1" (the high-level state). When the second clock signal ck2 is "1", the program advances from the step A34 to a step A35. Otherwise, the program advances from the step A34 to a step A36.

The step A35 sets the final voltage command values U and W to −1. The step A35 calculates the final voltage command value V** from the basic voltage command values U* and V* according to the following equation.

$$V^{**}=V^*-U^*-1 \quad (36)$$

After the step A35, the program advances to the step A15 (see FIG. 7).

The step A36 sets the final voltage command value U** as follows.

$$U^{**}=-1 \quad (37)$$

The step A36 calculates the final voltage command value V** from the basic voltage command values U* and V* according to the following equation.

$$V^{**}=V^*-U^*-1 \quad (38)$$

The step A36 calculates the final voltage command value W** from the basic voltage command values U* and W* according to the following equation.

$$W^{**}=2(W^*-U^*)-1 \quad (39)$$

After the step A36, the program advances to the step A15 (see FIG. 7).

The block P13 (see FIG. 17) in the program has steps corresponding to the steps A30–A36. The block P13 implements "U=+1" and "W=+1" instead of "U=−1" and "W=−1", respectively. The block P13 executes a decision as to "U*−W*<0"instead of "W*−U*<0" (see step A30). The block P13 implements "V**=V*−W*+1" and "V**=V*−U*+1" instead of "V**=V*−W*−1" and "V**=V*−U*−1", respectively. The block P13 implements "U**=2(U*−W*)+1" and "W**=2(W*−U*)+1" instead of "U**=2(U*−W*)−1" and "W**=2(W*−U*)−1", respectively. The block P13 refers to the first clock signal ck1 rather than the second clock signal ck2.

Figure 19:
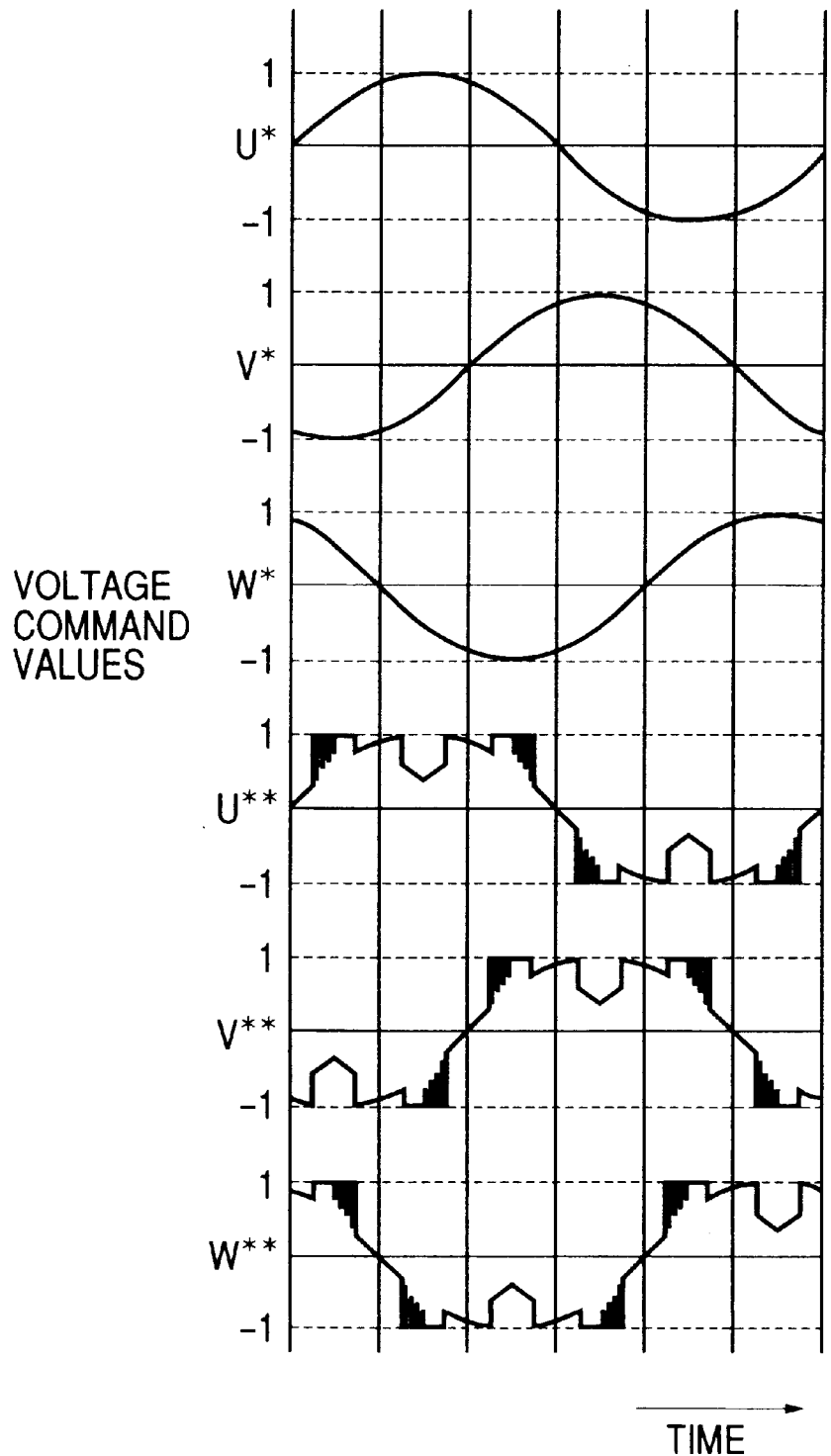
FIG. 19 is a time-domain diagram of basic voltage command values and final voltage command values.

FIG. 19 shows an example of 1-period time-domain conditions of the voltage command values U*, V*, W*, U, V, and W**. With reference to FIG. 19, the basic voltage command values U*, V*, and W* vary in smooth sinusoids while the final voltage command values U, V, and W** vary along jagged waveforms whose base lines reflect the sinusoids of the basic voltage command values U*, V*, and W*.

Figure 20:
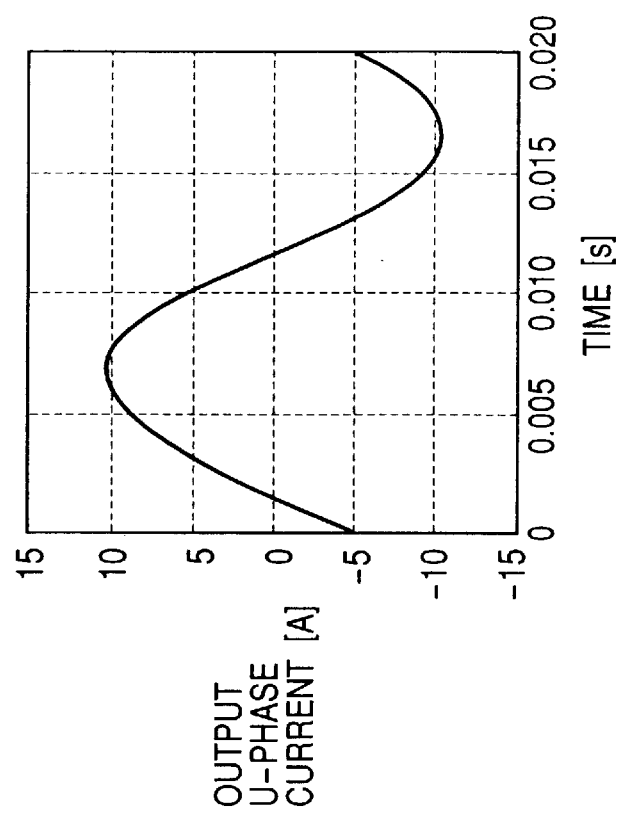
FIG. 20 is a time-domain diagram of an output U-phase current obtained by computer simulation according to the first embodiment of this invention.
Figure 21:
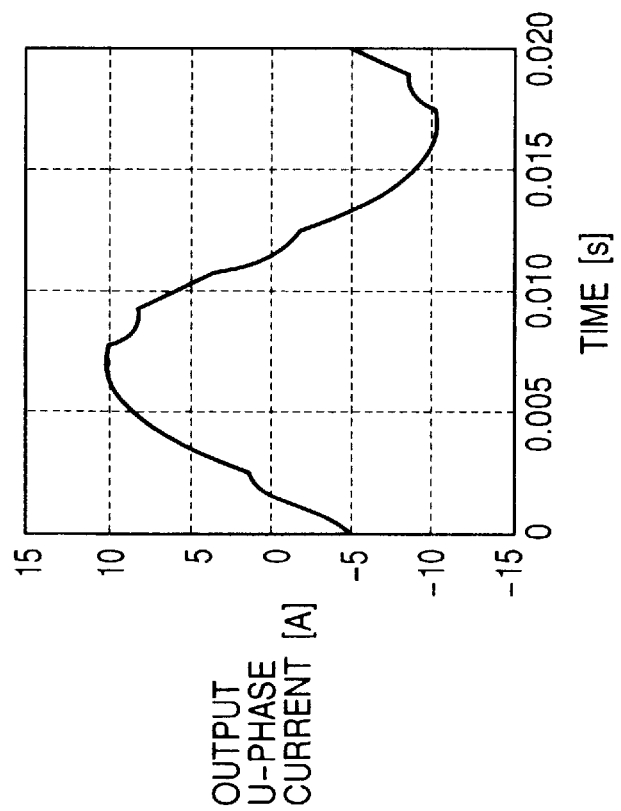
FIG. 21 is a time-domain diagram of an output U-phase current obtained by computer simulation according to the second embodiment of this invention.

FIG. 20 shows computer simulation results indicating an example of time-domain conditions of the output U-phase current which is generated in response to the final voltage command values U, V, and W according to the first embodiment of this invention. FIG. 21 shows computer simulation results indicating an example of time-domain conditions of the output U-phase current which is generated in response to the final voltage command values U, V, and W according to the second embodiment of this invention. FIGS. 20 and 21 reveal that the waveform of the output U-phase current in the second embodiment of this invention is distorted less than that in the first embodiment of this invention.

According to the second embodiment of this invention, when the absolute value of the difference between two of the basic voltage command values U*, V*, and W* is smaller than the predetermined reference value "x", one-phase modulation and two-phase modulation alternate. The one-phase modulation is assigned to the first conversion time intervals while the two-phase modulation is assigned to the second conversion time intervals. The one-phase modulation is implemented by fixing two of the final voltage command values U, V, and W to +1 (the maximum) or −1 (the minimum). The two-phase modulation is implemented by fixing one of the final voltage command values U, V, and W to +1 (the maximum) or −1 (the minimum). The first conversion time intervals and the second conversion time intervals are equal in length. Thus, the time occupancy ratio or the time length ratio between the first conversion time intervals and the second conversion time intervals is equal to "1:1".

An example of processes in the first conversion time intervals and the second conversion time intervals is as follows. During every first conversion time interval, the final voltage command values V and W are fixed to the maximum or the minimum while the final voltage command value U is set to maintain the inter-line voltage difference between the U phase and the V phase. During every second conversion time interval, the final voltage command value V is fixed to the maximum or the minimum while the final voltage command value U is set to maintain the inter-line voltage difference between the U phase and the V phase. In addition, the final voltage command value W is set to twice the inter-line voltage difference between the W phase and the V phase.

Accordingly, the second embodiment of this invention can reduce the frequency of the switching of the IGBT's 1–6 as compared with a prior-art design. In each of the second conversion time intervals, one of the final voltage command values U, V, and W** is set to compensate for a waveform distortion (a shortage of an inter-line voltage difference) which would be caused by fixing at least one of the other final voltage command values. Thus, the waveforms of phase currents fed to the three-phase AC motor 9 have smaller distortions. Therefore, the three-phase AC motor 9 can be driven at a lower vibration level and a lower noise level. Since the command value converter 23 sets the conversion period to twice the carrier wave period, the conversion processing can easily be executed at a timing synchronized with the carrier wave.

Third Embodiment

Figure 22:
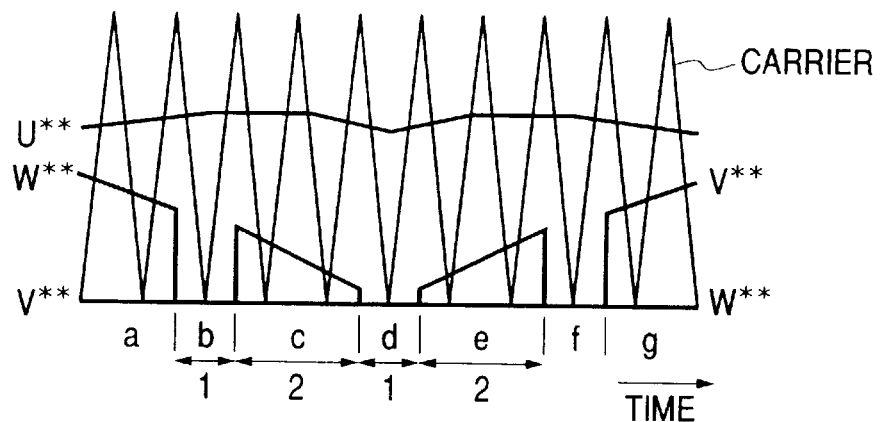
FIG. 22 is a time-domain diagram of final voltage command values and a carrier wave in a third embodiment of this invention.

A third embodiment of this invention is similar to the second embodiment thereof except for design changes mentioned later. As previously mentioned, the one-phase modulation is implemented during every first conversion time interval while the two-phase modulation is implemented during every second conversion time interval. In the third embodiment of this invention, as shown in FIG. 22, the time length ratio between the first conversion time intervals and the second conversion time intervals is set to "1:2".

In the third embodiment of this invention, the step A26 calculates the final voltage command value W** from the basic voltage command values W* and V* according to the following equation.

$$W^{**}=1.5(W^*-V^*)-1 \qquad (40)$$

The equation (40) replaces the equation (17). In addition, the step A29 calculates the final voltage command value V** from the basic voltage command values V* and W* according to the following equation.

$$V^{**}=1.5(V^*-W^*)-1 \qquad (41)$$

The equation (41) replaces the equation (20).

The coefficients "1.5" in the equations (40) and (41) are chosen in consideration of the fact that the length of the second conversion time intervals is equal to twice the length of the first conversion time intervals, and hence the corrective quantity of the inter-line voltage between the W phase and the V phase in the original command value is reduced accordingly.

In the case where the time length ratio between the first conversion time intervals and the second conversion time intervals is set to "1:n", the equation (40) is replaced by the following equation.

$$W^{**}=(1+1/n)\cdot(W^*-V^*)-1 \qquad (40a)$$

where "n" denotes a positive real number.

In the case where the time length ratio between the first conversion time intervals and the second conversion time intervals is set to "m:1", the equation (40) is replaced by the following equation.

$$W^{**}=(1+m)\cdot(W^*-V^*)-1 \qquad (40b)$$

where "m" denotes a positive real number.

Preferably, the third embodiment of this invention includes a frequency multiplier which doubles the frequency of the second clock signal ck2 to generate a third clock signal equal in period to the carrier wave. Also, the third embodiment of this invention includes a state counter which counts every rising edge in the third clock signal. The count number provided by the state counter cyclically changes among "1", "2", and "3". The count number being "1" is assigned to the first conversion time interval. The count number being "2" or "3" is assigned to the second conversion time interval.

In the third embodiment of this invention, the length of the second conversion time intervals is equal to twice the length of the first conversion time intervals, and hence the corrective quantity of the inter-line voltage is reduced accordingly. Therefore, it is possible to prevent the waveforms of the phase currents in the three-phase AC motor 9 from being distorted by overmodulation.

Fourth Embodiment

A fourth embodiment of this invention is similar to the second embodiment thereof except for design changes mentioned later. In the fourth embodiment of this invention, the time length ratio between the first conversion time intervals and the second conversion time intervals is dynamically changed.

Figure 23:
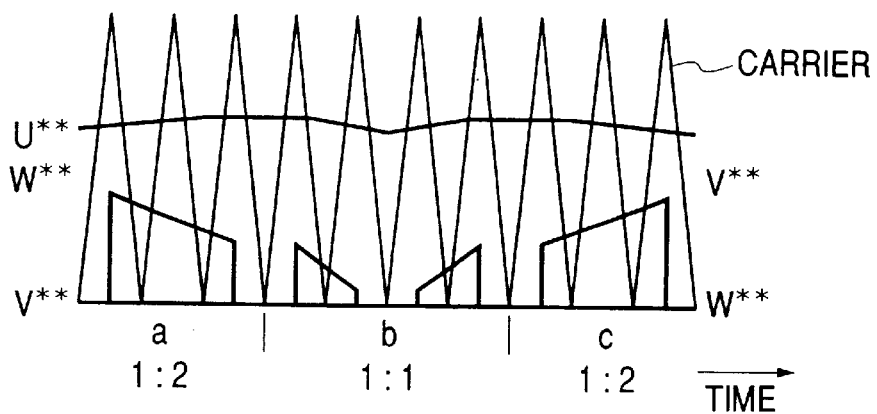
FIG. 23 is a time-domain diagram of final voltage command values and a carrier wave in a fourth embodiment of this invention.

With reference to FIG. 23, there is a sequence of time regions "a", "b", and "c". During the time regions "a" and "c", the time length ratio between the first conversion time intervals and the second conversion time intervals is set to "1:2". During the time region "b", the time length ratio between the first conversion time intervals and the second conversion time intervals is set to "1:1". As the difference between the basic voltage command values V* and W* increases, the length of the second conversion time intervals is increased relative to that of the first conversion time intervals. This designing can effectively prevent the occurrence of overmodulation since an increase in the length of the second conversion time intervals reduces the corrective quantity of the inter-line voltage.

In the fourth embodiment of this invention, the dynamic change in the time length ratio between the first conversion time intervals and the second conversion time intervals causes a dynamic change in the periods of the voltage signals. The dynamic period change can avoid the frequency spectrums of the voltage signals from concentrating on specific points. Thus, it is easy to take a countermeasure against undesired radiation.

Fifth Embodiment

Figure 24:
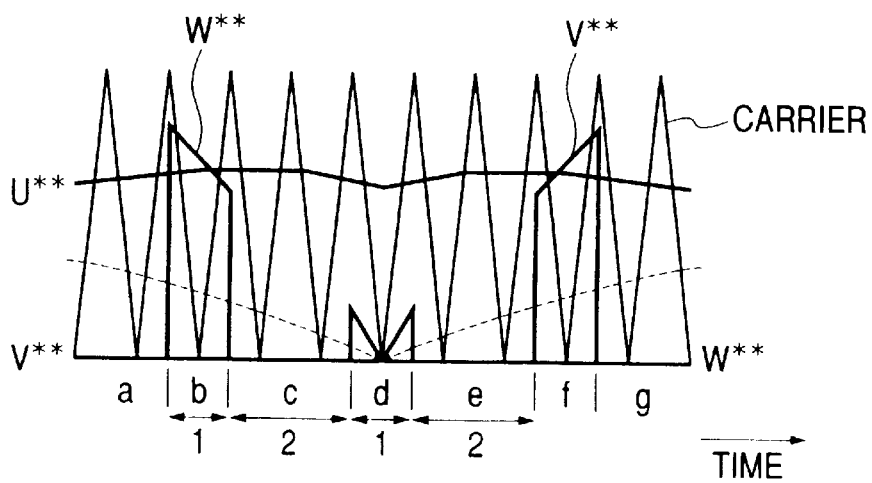
FIG. 24 is a time-domain diagram of final voltage command values and a carrier wave in a fifth embodiment of this invention.

A fifth embodiment of this invention is similar to the third embodiment thereof except for design changes mentioned later. In the fifth embodiment of this invention, as shown in FIG. 24, the time length ratio between the first conversion time intervals and the second conversion time intervals is set to "2:1".

In the fifth embodiment of this invention, the equation (40) is replaced by the following equation.

$$W^{**}=3(W^*-V^*)-1 \quad (42)$$

In addition, the equation (41) is replaced by the following equation.

$$V^{**}=3(V^*-W^*)-1 \quad (43)$$

Sixth Embodiment

Figure 25:
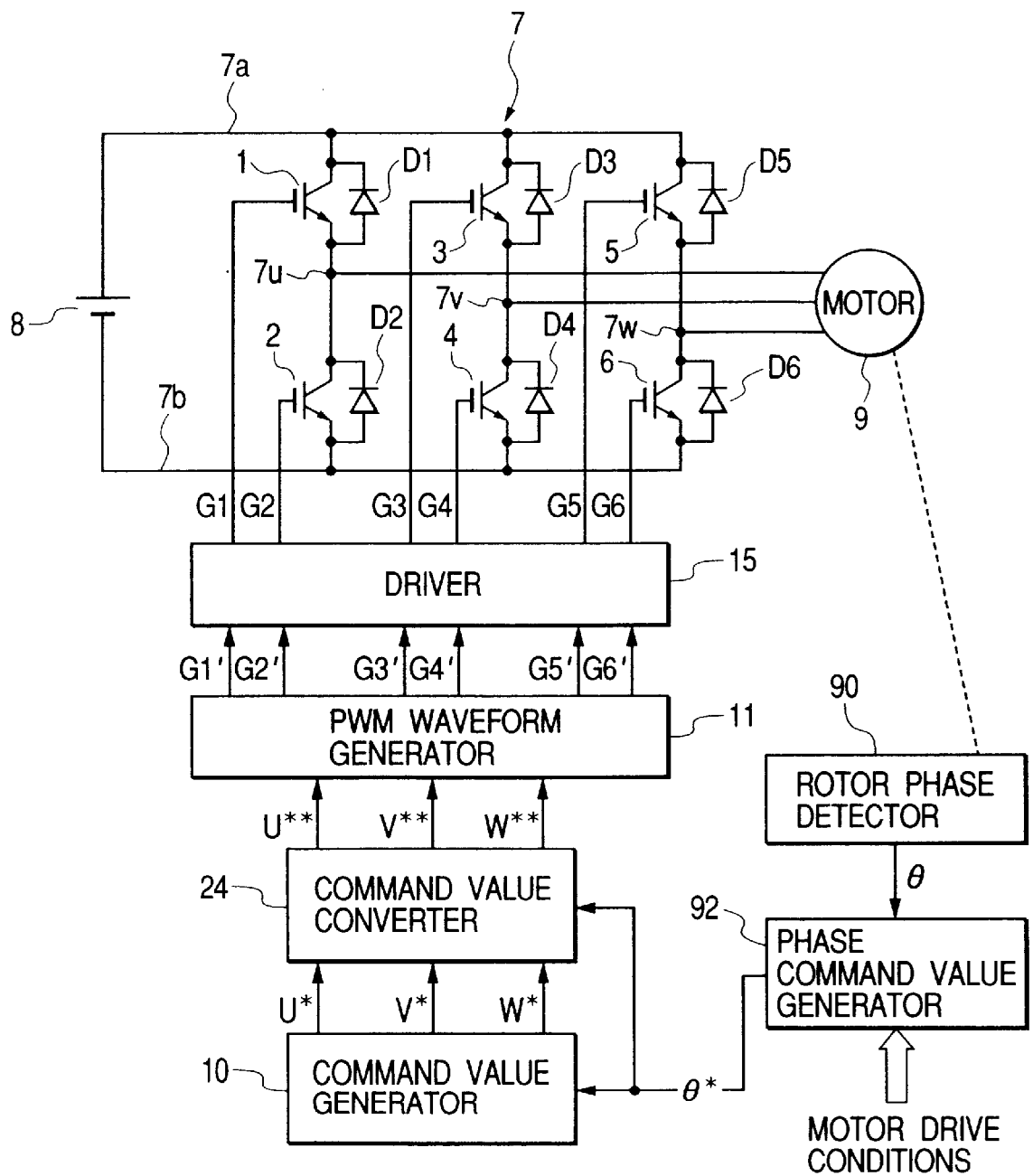
FIG. 25 is a diagram of a power converter apparatus according to a sixth embodiment of this invention.

FIG. 25 shows a power converter apparatus (an inverter apparatus) according to a sixth embodiment of this invention. The power converter apparatus of FIG. 25 is similar to the power converter apparatus of FIG. 5 except for design changes mentioned later.

The power converter apparatus of FIG. 25 includes a command value converter 24 instead of the command value converter 21 (see FIG. 5). The power converter of FIG. 25 includes a phase command value generator 92.

In the power converter apparatus of FIG. 25, the rotor phase detector 90 informs the phase command value generator 92 of the detected phase (the detected rotational angle) θ of the rotor in the three-phase AC motor 9. The phase command value generator 92 receives information representing drive conditions of the three 1 phase AC motor 9. The phase command value generator 92 adds an advance quantity or a retard quantity to the detected rotor phase θ in response to the motor drive conditions, thereby changing the detected rotor phase θ into a phase command value θ*. The phase command value generator 92 informs the command value generator 10 and the command value converter 24 of the phase command value θ*.

It should be noted that the phase command value θ* notified to the command value generator 10 and the command value converter 24 may be replaced by the detected rotor phase θ.

The command value generator 10 equalizes the phase of the basic voltage command value U* to the phase of the phase command value θ*. The command value generator 10 retards the phase of the basic voltage command value V* from the phase of the basic voltage command value U* by 2π/3. The command value generator 10 advances the phase of the basic voltage command value W* from the phase of the basic voltage command value U* by 2π/3. The command value generator 10 informs the command value converter 24 of the basic voltage command values U*, V*, and W*.

Preferably, the basic voltage command values U*, V*, and W* have the following relations with the phase command value θ*.

$$U^* = V_a \cdot \sin(\theta^*)$$

$$V^* = V_a \cdot \sin(\theta^* - 2\pi/3)$$

$$W^* = V_a \cdot \sin(\theta^* + 2\pi/3)$$

where Va denotes a parameter for varying the amplitude levels of the basic voltage command values U*, V*, and W*.

The command value converter 24 is formed by, for example, a DSP or a similar device which operates in accordance with a program stored in its internal ROM. The program is designed to enable the command value converter 24 to implement processes mentioned later. The command value converter 24 generates a final voltage command value U for the U phase, a final voltage command value V for the V phase, and a final voltage command value W** for the W phase in response to the basic voltage command values U*, V*, and W* and the phase command value θ*. The command value converter 24 informs the PWM waveform generator 11 of the final voltage command values U, V, and W**.

Figure 26:
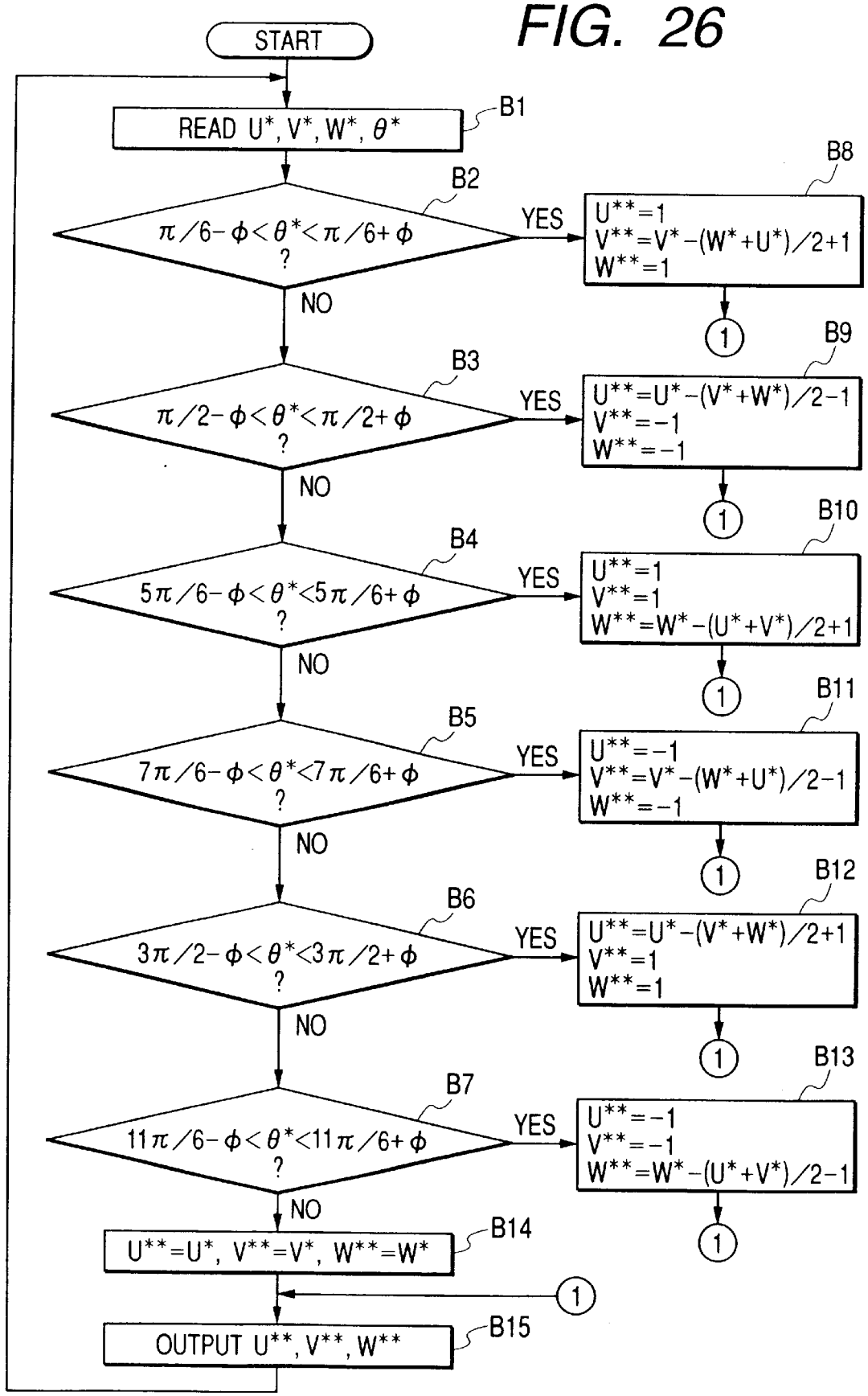
FIG. 26 is a flowchart of a program for a command value converter in FIG. 25.

FIG. 26 is a flowchart of a program for the command value converter 24. With reference to FIG. 26, a first step B1 of the program gets or reads the basic voltage command values U*, V*, and W*, and the phase command value θ*.

A step B2 following the step B1 determines whether or not the phase command value θ* is between an electric angle "π/6−φ" and electrical angle "π/6+φ". In other words, the step B2 determines whether or not the phase command value θ* is in a predetermined electrical angle range ±φ centered at π/6. Here, "φ" denotes a predetermined reference value corresponding to the predetermined reference value "x". When the phase command value θ* is between the electric angle "π/6−φ" and the electrical angle "π/6+φ", the program advances from the step B2 to a step B8. Otherwise, the program advances from the step B2 to a step B3.

The step B8 corresponds to the step A13 in FIG. 7. The step B8 sets the final voltage command values U and W to +1. The step B8 calculates the final voltage command value V** from the basic voltage command values U*, V*, and W* according to the following equation.

$$V^{**}=V^*-(W^*+U^*)/2+1$$

After the step B8, the program advances to a step B15.

The step B3 determines whether or not the phase command value θ* is between an electric angle "π/2−φ" and an electrical angle "π/2+φ". In other words, the step B3 determines whether or not the phase command value θ* is in a predetermined electrical angle range ±φ centered at π/2

(3π/6). When the phase command value θ* is between the electric angle "π/2−φ" and the electrical angle "π/2+φ", the program advances from the step B3 to a step B9. Otherwise, the program advances from the step B3 to a step B4.

The step B9 corresponds to the step A8 in FIG. 7. The step B9 sets the final voltage command values V and W to −1. The step B9 calculates the final voltage command value U** from the basic voltage command values U*, V*, and W* according to the following equation.

$$U^{**}=U^*-(V^*+W^*)/2-1$$

After the step B9, the program advances to the step B15.

The step B4 determines whether or not the phase command value θ* is between an electric angle "5π/6−φ" and an electrical angle "5π/6+φ". In other words, the step B4 determines whether or not the phase command value θ* is in a predetermined electrical angle range ±φ centered at 5π/6. When the phase command value θ* is between the electric angle "5π/6−φ" and the electrical angle "5π/6+φ", the program advances from the step B4 to a step B10. Otherwise, the program advances from the step B4 to a step B5.

The step B10 corresponds to the step A5 in FIG. 7. The step B10 sets the final voltage command values U and V to +1. The step B10 calculates the final voltage command value W** from the basic voltage command values U*, V*, and W* according to the following equation.

$$W^{**}=W^*-(U+V^*)/2+1$$

After the step B10, the program advances to the step B15.

The step B5 determines whether or not the phase command value θ* is between an electric angle "7π/6−φ" and an electrical angle "7π/6+φ". In other words, the step B5 determines whether or not the phase command value θ* is in a predetermined electrical angle range ±φ centered at 7π/6. When the phase command value θ* is between the electric angle "7π/6−φ" and the electrical angle "7π/6+φ", the program advances from the step B5 to a step B11. Otherwise, the program advances from the step B5 to a step B6.

The step B1 corresponds to the step A12. The step B11 sets the final voltage command values U and W to −1. The step B11 calculates the final voltage command value V** from the basic voltage command values U*, V*, and W* according to the following equation.

$$V^{**}=V^*-(W^*+U^*)/2-1$$

After the step B11, the program advances to the step B15.

The step B6 determines whether or not the phase command value θ* is between an electric angle "3π/2−φ" and an electrical angle "3π/2+φ". In other words, the step B6 determines whether or not the phase command value θ* is in a predetermined electrical angle range ±φ centered at 3π/2 (9π/6). When the phase command value θ* is between the electric angle "3π/2−φ" and the electrical angle "3π/2+φ", the program advances from the step B6 to a step B12. Otherwise, the program advances from the step B6 to a step B7.

The step B12 corresponds to the step A9 in FIG. 7. The step B12 sets the final voltage command values V and W to +1. The step B12 calculates the final voltage command value U** from the basic voltage command values U*, V*, and W* according to the following equation.

$$U^{**}=U^*-(V^*+W^*)/2+1$$

After the step B12, the program advances to the step B15.

The step B7 determines whether or not the phase command value θ* is between an electric angle "11π/6−φ" and an electrical angle "11π/6+φ". In other words, the step B7 determines whether or not the phase command value θ* is in a predetermined electrical angle range +φ centered at 11π/6. When the phase command value θ* is between the electric angle "11π/6−φ" and the electrical angle "11π/6+φ", the program advances from the step B7 to a step B13. Otherwise, the program advances from the step B7 to a step B14.

The step B13 corresponds to the step A4 in FIG. 7. The step B13 sets the final voltage command values U and V to −1. The step B13 calculates the final voltage command value W** from the basic voltage command values U*, V*, and W* according to the following equation.

$$W^{**}=W^*-(U+V^*)/2-1$$

After the step B13, the program advances to the step B15.

The step B14 sets the final voltage command values U, V, and W** equal to the basic voltage command values U*, V*, and W*, respectively. After the step B14, the program advances to the step B15.

The step B15 outputs the final voltage command values U, V, and W** to the PWM waveform generator 11. After the step B15, the program returns to the step B1.

Figure 27:
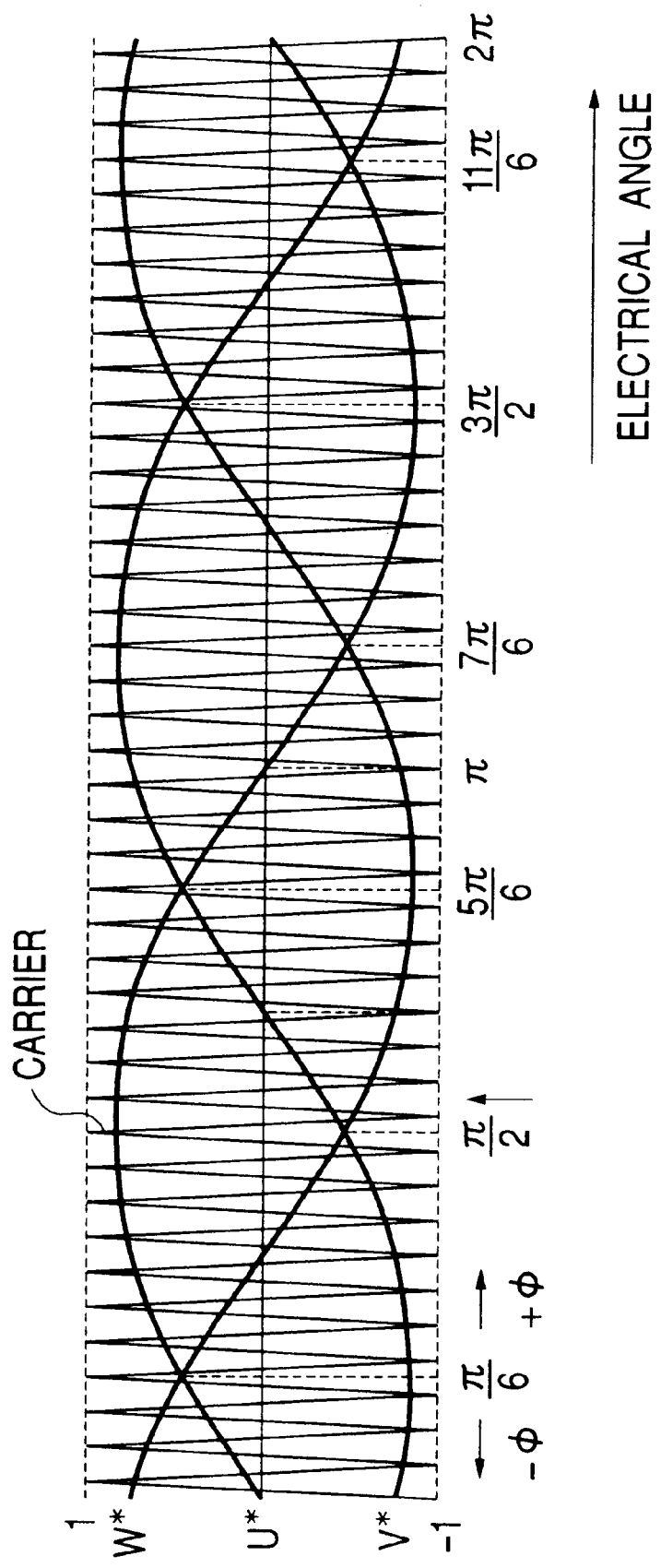
FIG. 27 is a time-domain diagram of basic voltage command values.

The predetermined electrical angle ranges used by the steps B2, B3, B4, B5, B6, and B7 are centered at π/6, π/2 (3π/6), 5π/6, 7π/6, 3π/2 (9π/6), and 11π/6, respectively. As shown in FIG. 27, in these predetermined electrical angle ranges, two of the basic voltage command values U*, V*, and W* are approximately or substantially equal to each other.

Seventh Embodiment

Figure 28:
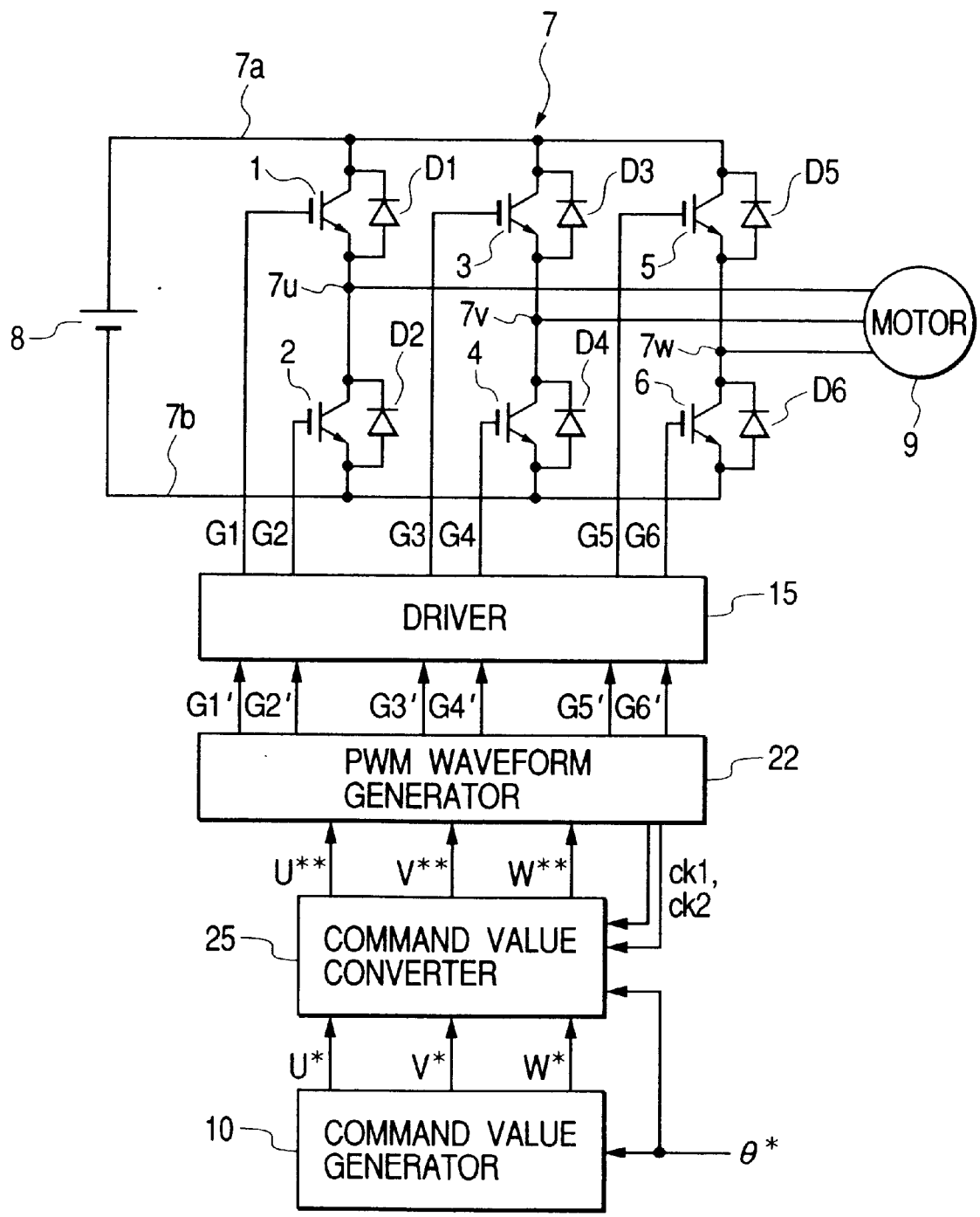
FIG. 28 is a diagram of a power converter apparatus according to a seventh embodiment of this invention.

FIG. 28 shows a power converter apparatus (an inverter apparatus) according to a seventh embodiment of this invention. The power converter apparatus of FIG. 28 is similar to the power converter apparatus of FIG. 12 except for design changes mentioned later.

The power converter apparatus of FIG. 28 includes a command value converter 25 instead of the command value converter 23 (see FIG. 12). In the power converter apparatus of FIG. 28, the command value generator 10 and the command value converter 25 are informed of the phase command value θ* as in the sixth embodiment of this invention (see FIG. 25). The operation of the command value generator 10 is similar to that in the sixth embodiment of this invention (see FIG. 25).

It should be noted that the phase command value θ* notified to the command value generator 10 and the command value converter 25 may be replaced by the detected rotor phase θ.

The command value converter 25 is formed by, for example, a DSP or a similar device which operates in accordance with a program stored in its internal ROM. The program is designed to enable the command value converter 25 to implement processes mentioned later. The command value converter 25 generates a final voltage command value U for the U phase, a final voltage command value V for the V phase, and a final voltage command value W** for the W phase in response to the basic voltage command values U*, V*, and W*, the phase command value θ*, and the first and second clock signals ck1 and ck2. The command value converter 25 informs the PWM waveform generator 22 of the final voltage command values U, V, and W**.

Figure 29:
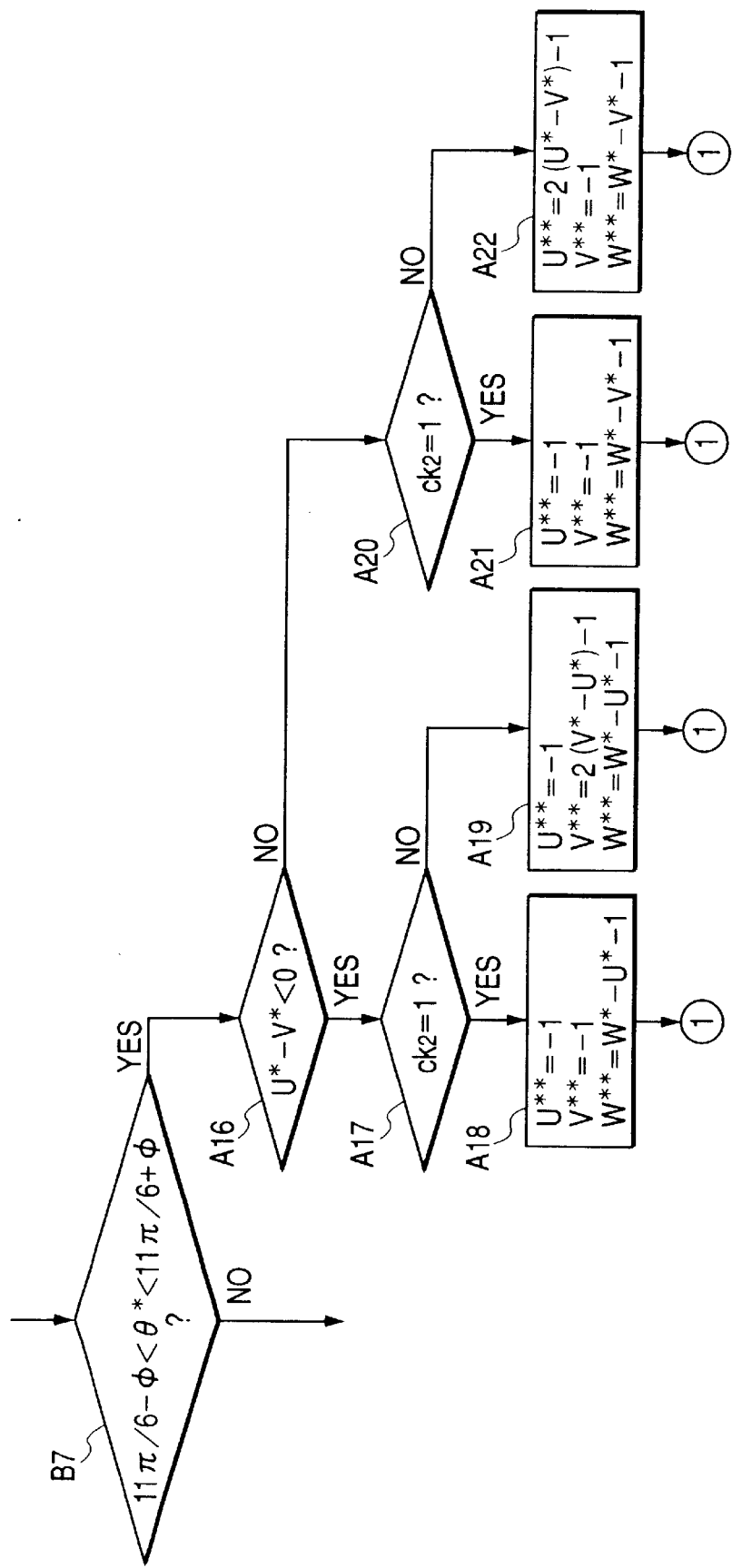
FIG. 29 is a flowchart of a portion of a program for a command value converter in FIG. 28.

FIG. 29 is a flowchart of a portion of a program for the command value converter 25 which corresponds to the program portion in FIG. 15. With reference to FIG. 29, a step B7 which replaces the steps A2 and A3 (see FIG. 15) determines whether or not the phase command value θ* is between an electric angle "11π/6−φ" and an electrical angle "11π/6+φ". When the phase command value θ* is between the electric angle "11π/6−φ" and the electrical angle "11π/6+φ", the program advances from the step B7 to a step A16. Otherwise, the program advances from the step B7 to a next stage.

The program portion in FIG. 29 has steps A17–A22 in addition to the step A16. The steps A16–A22 in FIG. 29 are the same as those in FIG. 15.

The program for the command value converter 25 includes steps B2–B6 in addition to the step B7. The steps B2–B7 in the program for the command value converter 25 are similar to those in FIG. 26.

In the program for the command value converter 25, the step B3 which replaces the steps A6 and A7 (see FIG. 16) determines whether or not the phase command value θ* is between an electric angle "π/2−φ" and an electrical angle "π/2+φ". when the phase command value θ* is between the electric angle "π/2−φ" and the electrical angle "π/2+φ", the program advances from the step B3 to a stage composed of A23–A29 which are the same as those in FIG. 16. Otherwise, the program advances from the step B3 to a next stage.

The step B5 which replaces the steps A10 and A11 (see FIG. 17) determines whether or not the phase command value θ* is between an electric angle "7π/6−φ" and an electrical angle "7π/6+φ". When the phase command value θ* is between the electric angle "7π/6−φ" and the electrical angle "7π/6+φ", the program advances from the step B5 to a stage composed of steps A30–A36 which are the same as those in FIG. 17. Otherwise, the program advances from the step B5 to a next stage.

According to the seventh embodiment of this invention, the command value converter 25 detects, in response to the phase command value θ*, every time region where two of the basic voltage command values U*, V*, and W* are relatively close to each other. During the detected time region, the command value converter 25 operates to alternately execute one-phase modulation and two-phase modulation. The one-phase modulation is designed so that two of the final voltage command values U, V, and W are fixed to the maximum or the minimum. The two-phase modulation is designed so that only one of the final voltage command values U, V, and W is fixed to the maximum or the minimum. The one-phase modulation is assigned to the first conversion time intervals while the two-phase modulation is assigned to the second conversion time intervals. Preferably, the first conversion time intervals and the second conversion time intervals are equal in time length.

Eighth Embodiment

Figure 30:
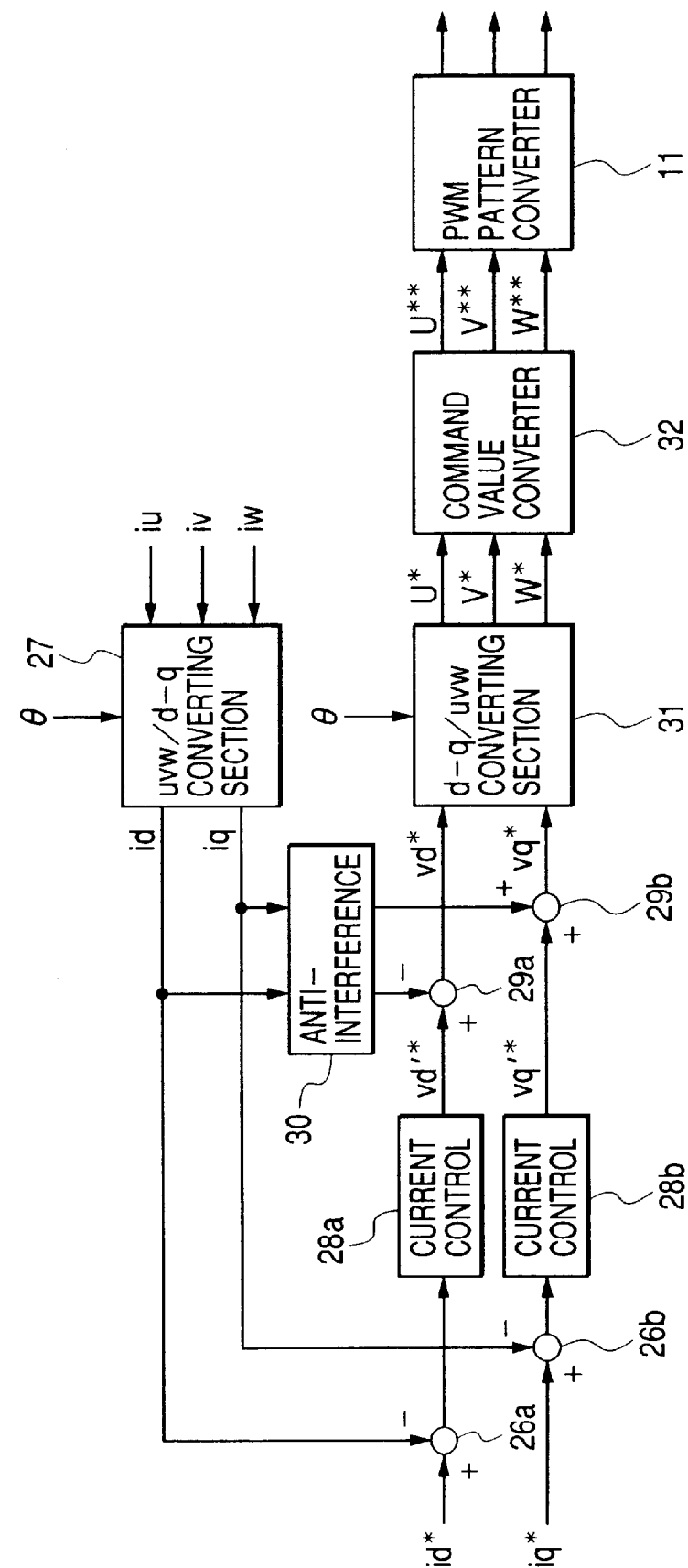
FIG. 30 is a block diagram of an apparatus according to an eighth embodiment of this invention.

FIG. 30 shows an apparatus according to an eighth embodiment of this invention. The apparatus of FIG. 30 is designed to control the drive of a brushless motor (a polyphase AC motor) for powering, for example, an electric vehicle.

With reference to FIG. 30, a current command value iq* means a torque command value which is fed from an ECU (electronic control unit) in response to a throttle opening degree signal or a motor rotational speed signal. A current command value id* means a magnetic flux command value which is read out from a table in response to the current command value iq*.

The current command values id* and iq* are fed to subtracters 26a and 26b as minuends, respectively. Current detection values "iu", "iv", and "iw" are provided by current sensors for detecting output currents from an inverter main circuit. The current detection values "iu", "iv", and "iw" are fed to a uvw/d-q converting section 27. The uvw/d-q converting section 27 converts the current detection values "iu", "iv", and "iw" into vector components in a d-q plane (a rotational coordinate system), that is, actual two-phase current values "id" and "iq", in response to a phase detection value (a detected rotor phase) θ. Thus, the uvw/d-q converting section 27 implements 3-phase/2-phase conversion. The uvw/d-q converting section 27 outputs the actual two-phase current values "id" and "iq" to the subtracters 26a and 26b as subtrahends, respectively.

The device 26a subtracts the actual current value "id" from the current command value id*. The subtracter 26a outputs the subtraction result to a current controlling section 28a. The current controlling section 28a converts the subtraction result into a voltage command value vd'*. The current controlling section 28a is designed to implement, for example, PI control. The current controlling section 28a feeds the voltage command value vd'* to a subtracter 29a as a minuend.

The device 26b subtracts the actual current value "iq" from the current command value iq*. The subtracter 26b outputs the subtraction result to a current controlling section 28b. The current controlling section 28b converts the subtraction result into a voltage command value vq'*. The current controlling section 28b is designed to implement, for example, PI control. The current controlling section 28b feeds the voltage command value vq'* to an adder 29b as a summand.

An anti-interference section 30 receives the actual two-phase current values "id" and "iq" from the uvw/d-q converting section 27. The anti-interference section 30 detects counterelectromotive forces in the brushless motor on the basis of the actual two-phase current values "id" and "iq". The anti-interference section 30 outputs values of the detected counterelectromotive forces to the subtracter 29a and the adder 29b as a sutrahend and an addend, respectively.

The device 29a subtracts the counterelectromotive force value from the voltage command value vd'*. The subtracter 29a outputs the subtraction result to a d-q/uvw converting section 31 as a voltage command value vd*.

The device 29b adds the counterelectromotive force value and the voltage command value vq'*. The adder 29b outputs the addition result to the d-q/uvw converting section 31 as a voltage command value vq*.

The d-q/uvw converting section 31 converts the voltage command values vd* and vq* into three-phase basic voltage command values U*, V*, and W* in response to the phase detection value (the detected rotor phase) θ. Thus, the d-q/uvw converting section 31 implements 2-phase/3-phase conversion. The d-q/uvw converting section 31 outputs the basic voltage command values U*, V*, and W* to a command value converter 32. The device 32 converts the basic voltage command values U*, V*, and W* into final voltage command values U, V, and W. The command value converter 32 outputs the final voltage command values U, V, and W to a PWM waveform generator (a PWM pattern converter) 11.

The command value converter 32 is the same as that in one of the first to seventh embodiments of this invention. The PWM waveform generator 11 and a following stage are similar to those in the first embodiment of this invention. The apparatus of FIG. 30 can be formed by a full hardware circuit or a hardware-plus-software circuit.

Ninth Embodiment

A ninth embodiment of this invention is similar to the first embodiment thereof (see FIG. 5) except for design changes mentioned later. As previously mentioned, one-phase modulation is assigned to first conversion time intervals. In the ninth embodiment of this invention, the command value converter 21 determines the first conversion time intervals by referring to the basic voltage command values U*, V*, and W*.

Figure 31:
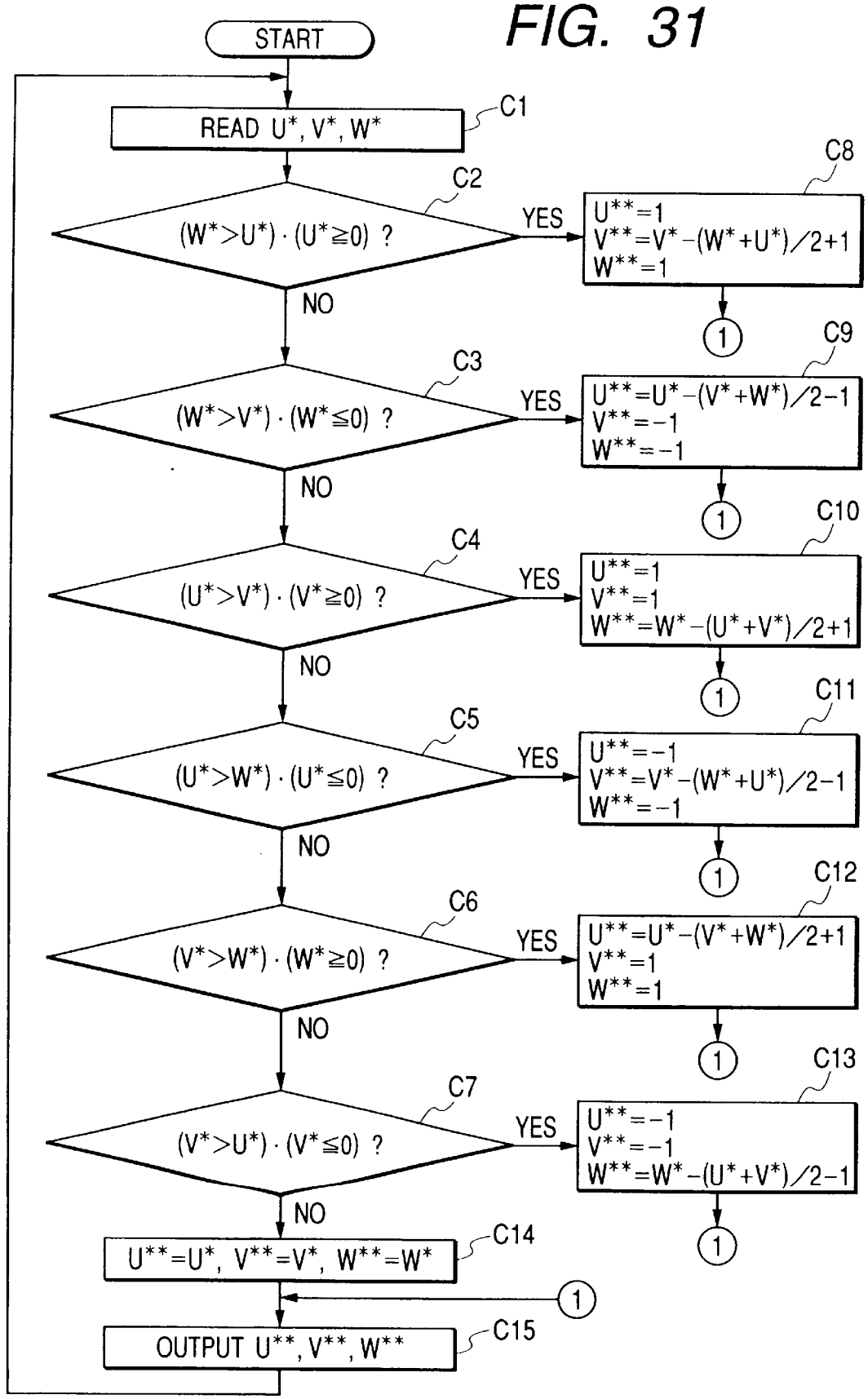
FIG. 31 is a flowchart of a program for a command value converter in a ninth embodiment of this invention.

FIG. 31 is a flowchart of a program for the command value converter 21 (see FIG. 5) in the ninth embodiment of this invention. The program in FIG. 31 is similar in structure to the program in FIG. 26.

With reference to FIG. 31, a first step C1 of the program gets or reads the basic voltage command values U*, V*, and W*.

A step C2 following the step C1 determines whether or not the basic voltage command value W* is greater than the basic voltage command value U* (W*>U*). In addition, the step C2 compares the basic voltage command value U* with "0". When W*>U* and U*≧0, the program advances from the step C2 to a step C8. Otherwise, the program advances from the step C2 to a step C3.

The step C8 is equal in contents to the step B8 in FIG. 26. After the step C8, the program advances to a step C15. The step C3 determines whether or not the basic voltage command value W* is greater than the basic voltage command value V* (W*>V*). In addition, the step C3 compares the basic voltage command value W* with "0". When W*>V* and W*≦0, the program advances from the step C3 to a step C9. Otherwise, the program advances from the step C3 to a step C4.

The step C9 is equal in contents to the step B9 in FIG. 26. After the step C9, the program advances to the step C15.

The step C4 determines whether or not the basic voltage command value U* is greater than the basic voltage command value V* (U*>V*). In addition, the step C4 compares the basic voltage command value V* with "0". When U*>V* and V*≧0, the program advances from the step C4 to a step C10. Otherwise, the program advances from the step C4 to a step C5.

The step C10 is equal in contents to the step B10 in FIG. 26. After the step C10, the program advances to the step Cl5.

The step C5 determines whether or not the basic voltage command value U* is greater than the basic voltage command value W* (U*>W*). In addition, the step C4 compares the basic voltage command value U* with "0". When U*>W* and U*≦0, the program advances from the step C5 to a step C11. Otherwise, the program advances from the step C5 to a step C6.

The step C11 is equal in contents to the step B11 in FIG. 26. After the step C11, the program advances to the step C15.

The step C6 determines whether or not the basic voltage command value V* is greater than the basic voltage command value W* (V*>W*). In addition, the step C4 compares the basic voltage command value W* with "0". When V*>W* and W*≧0, the program advances from the step C6 to a step C12. Otherwise, the program advances from the step C6 to a step C7.

The step C12 is equal in contents to the step B12 in FIG. 26. After the step C12, the program advances to the step C15.

The step C7 determines whether or not the basic voltage command value V* is greater than the basic voltage command value U* (V*>U*). In addition, the step C4 compares the basic voltage command value V* with "0". When V*>U* and V*≦0, the program advances from the step C7 to a step C13. Otherwise, the program advances from the step C7 to a step C14.

The step C13 is equal in contents to the step B13 in FIG. 26. After the step C13, the program advances to the step C15.

The step C14 sets the final voltage command values U, V, and W** equal to the basic voltage command values U*, V*, and W*, respectively. After the step C14, the program advances to the step C15.

The step C outputs the final voltage command values U, V, and W** to the PWM waveform generator 11. After the step C15, the program returns to the step C1.

Figure 32:
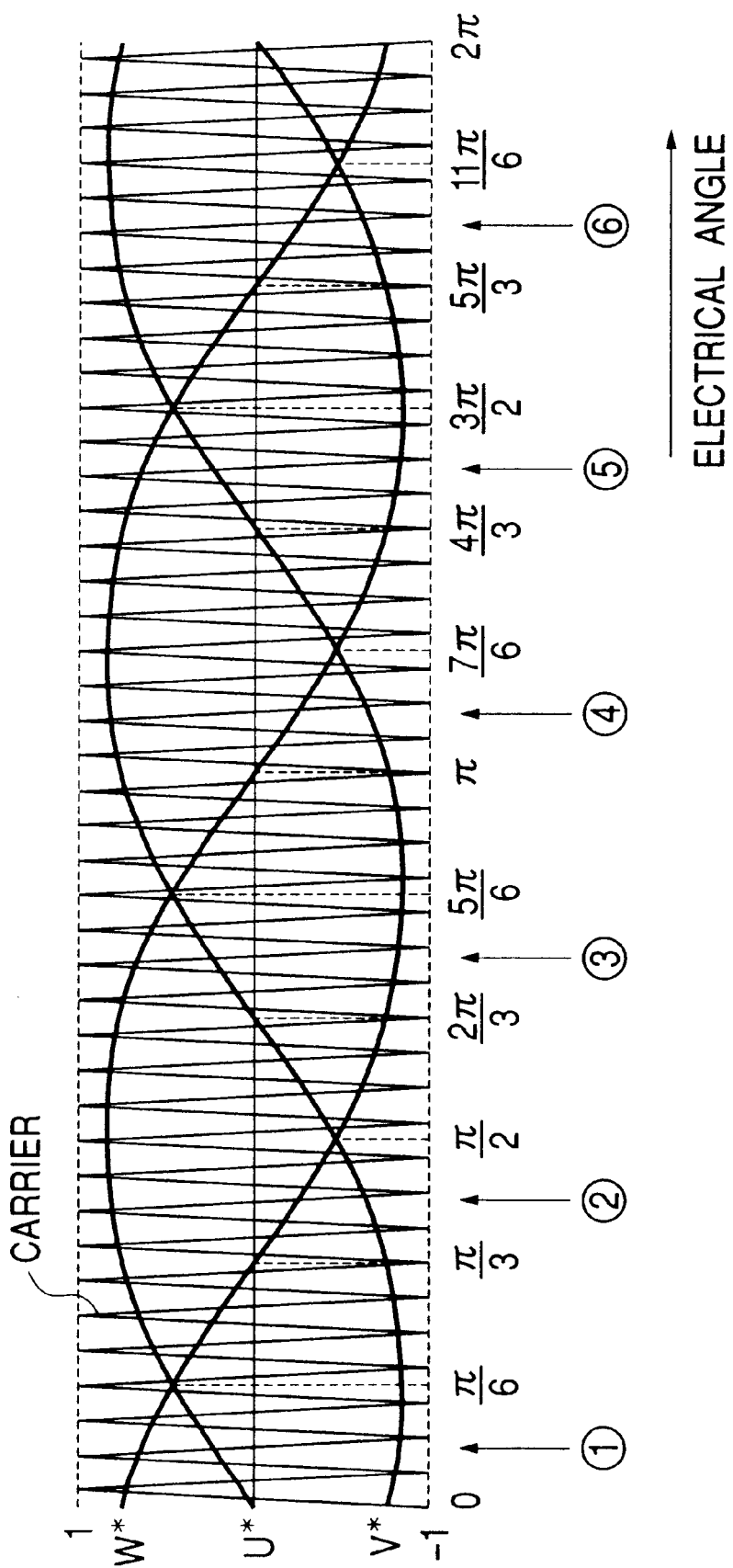
FIG. 32 is a time-domain diagram of basic voltage command values.

The positive results of the determinations by the steps C2, C3, C4, C5, C6, and C7 correspond to conditions where the phase ϕu of the basic voltage command value U* is in ranges ①, ②, ③, ④, ⑤, and ⑥ in FIG. 32, respectively. Specifically, the phase ranges ①–⑥ are expressed as follows.

①: 0<θu<π/6
②: π/3<θu<π/2
③: 2π/3<θu<5π/6
④: π<θu<7π/6
⑤: 4π/3<θu<3π/2
⑥: 5π/3<θu<11π/6

The one-phase modulation is implemented during the first conversion time intervals. The one-phase modulation is designed so that two of the final voltage command values U, V, and W** are fixed to the maximum or the minimum while the remaining one is subjected to effective PWM modulation. The first conversion time intervals available in the ninth embodiment of this invention is advanced from those in the first embodiment of this invention by π/12 (15°). According to the ninth embodiment of this invention, the first conversion time intervals for the one-phase modulation can be determined in a short time in response only to the basic voltage command values U*, V*, and W*. This is advantageous in driving the three-phase AC motor 9 at a high frequency.

Tenth Embodiment

A tenth embodiment of this invention is a combination of the seventh and ninth embodiments thereof.

Figure 33:
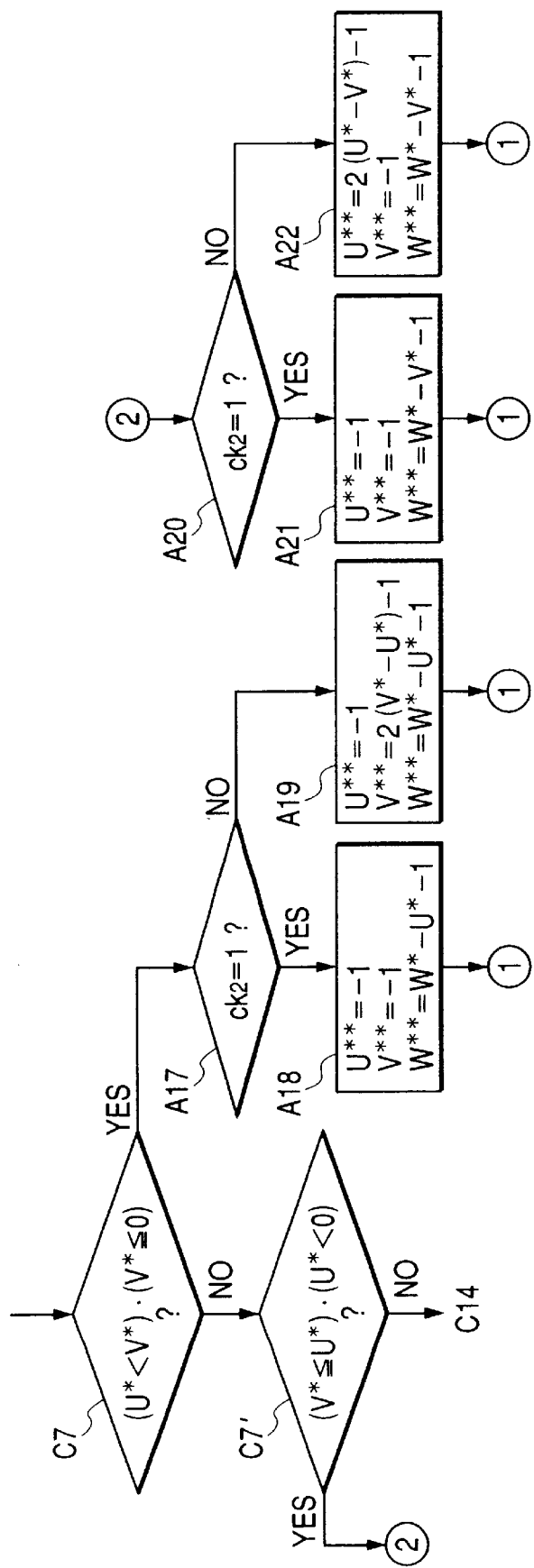
FIG. 33 is a flowchart of a portion of a program for a command value converter in a tenth embodiment of this invention.

FIG. 33 is a flowchart of a portion of a program for the command value converter 21 (see FIG. 5) in the tenth embodiment of this invention. The program portion in FIG. 33 corresponds to the program portion in FIG. 29. The program portion in FIG. 33 has steps C7 and C7' instead of the steps B7 and A16 (see FIG. 29).

With reference to FIG. 33, the step C7 determines whether or not the basic voltage command value V* is greater than the basic voltage command value U* (U*<V*). In addition, the step C7 compares the basic voltage command value V* with "0". When U*<V* and V*≦0, the program advances from the step C7 to a step A17. Otherwise, the program advances from the step C7 to the step C7'.

The step C7' compares the basic voltage command values V* and U*. In addition, the step C7' compares the basic voltage command value U* with "0". When V*≦U* and U*<0, the program advances from the step C7' to a step A20. Otherwise, the program advances from the step C7' to a step B14 (C14).

Other portions of the program for the command value converter 21 are similarly designed.

Eleventh Embodiment

An eleventh embodiment of this invention is similar to the sixth embodiment thereof except that the command value generator 10 and the command value converter 24 are formed in a single body.

Twelfth Embodiment

A twelfth embodiment of this invention is similar to the eighth embodiment thereof except that the anti-interference section 30 is omitted.

Thirteenth Embodiment

A thirteenth embodiment of this invention is modified from the eighth embodiment thereof so as to be applied to speed control, position control, or other control in which final voltage command values are outputted.

Fourteenth Embodiment

A fourteenth embodiment of this invention is similar to the ninth embodiment thereof except that the phase ranges ①–⑥ are shifted in the retard direction by $\pi/6$.

Fifteenth Embodiment

A fifteenth embodiment of this invention is similar to the ninth embodiment thereof except that the phase command value $\theta^*$ or the detected rotor phase $\theta$ is read in, and a determination as to each of phase ranges is executed in response to the read-in value $\theta^*$ or $\theta$.

Sixteenth Embodiment

A sixteenth embodiment of this invention is similar to one of the first to fifteenth embodiments thereof except that the basic voltage command values are based on voltage waveforms different from sinusoidal waveforms.

Seventeenth Embodiment

A seventeenth embodiment of this invention is similar to one of the first to sixteenth embodiments thereof except that the triangular-wave-based PWM modulation is replaced by other modulation which changes a pulse width through switching for power conversion.

Eighteenth Embodiment

An eighteenth embodiment of this invention is similar to one of the first to seventeenth embodiments thereof except for design changes mentioned later. The eighteenth embodiment of this invention uses digital control. In the eighteenth embodiment of this invention, a memory is loaded with data representing a shortage of the inter-line voltage which is caused by fixing two of the final voltage command values U, V, and W to the maximum or the minimum. During a second conversion time interval for which only one of the final voltage command values U, V, and W is fixed, the shortage-representing data are read out from the memory and the shortage is superimposed upon the related final voltage command values on a real-time basis.

Nineteenth Embodiment

A nineteenth embodiment of this invention is similar to one of the first to eighteenth embodiments thereof except that the IGBT's 1–6 are replaced by power transistors or power MOSFET's.

Twentieth Embodiment

A twentieth embodiment of this invention is similar to one of the first to nineteenth embodiments thereof except that the rotor phase detector 90 is of a sensor-less type. Specifically, the rotor phase detector 90 includes shunt resistors or comparators which detect induced voltages in the three-phase AC motor 9. The rotor phase detector 90 derives information of the position of the rotor in the three-phase AC motor 9 from the detected induced voltages.

Twenty-first Embodiment

A twenty-first embodiment of this invention is similar to one of the first to twentieth embodiments thereof except that the value "in" is set to a positive real number different from "1" and "2". Similarly, the value "m" may be set to a positive real number different from "1" and "2". Preferably, the values "m" and "n" are chosen in view of losses, distortions, and other factors.

Twenty-second Embodiment

A twenty-second embodiment of this invention is similar to one of the first to twenty-first embodiments thereof except that the command value converter includes a CPU rather than the DSP.

Twenty-third Embodiment

A twenty-third embodiment of this invention is changed from one of the first to twenty-second embodiments thereof so as to be applied to the drive of a three-phase AC motor continuously subjected to two-phase modulation in which only one of control parameters for three phases is fixed, and the two other control parameters are used in the modulation. The twenty-third embodiment of this invention implements one-phase modulation by fixing one of the two other control parameters. According to the twenty-third embodiment of this invention, it is possible to further reduce the number of times of switching.

Twenty-fourth Embodiment

A twenty-fourth embodiment of this invention is modified from one of the first to twenty-third embodiments thereof so as to be applied to the drive of a four-phase AC motor or a more-phase AC motor.

Twenty-fifth Embodiment

A twenty-fifth embodiment of this invention is modified from one of the first to twenty-fourth embodiments thereof so as to be applied to a UPS (a uninterruptible power supply) or other equipments in which polyphase inter-line voltages are outputted.

Twenty-sixth Embodiment

Figure 34:
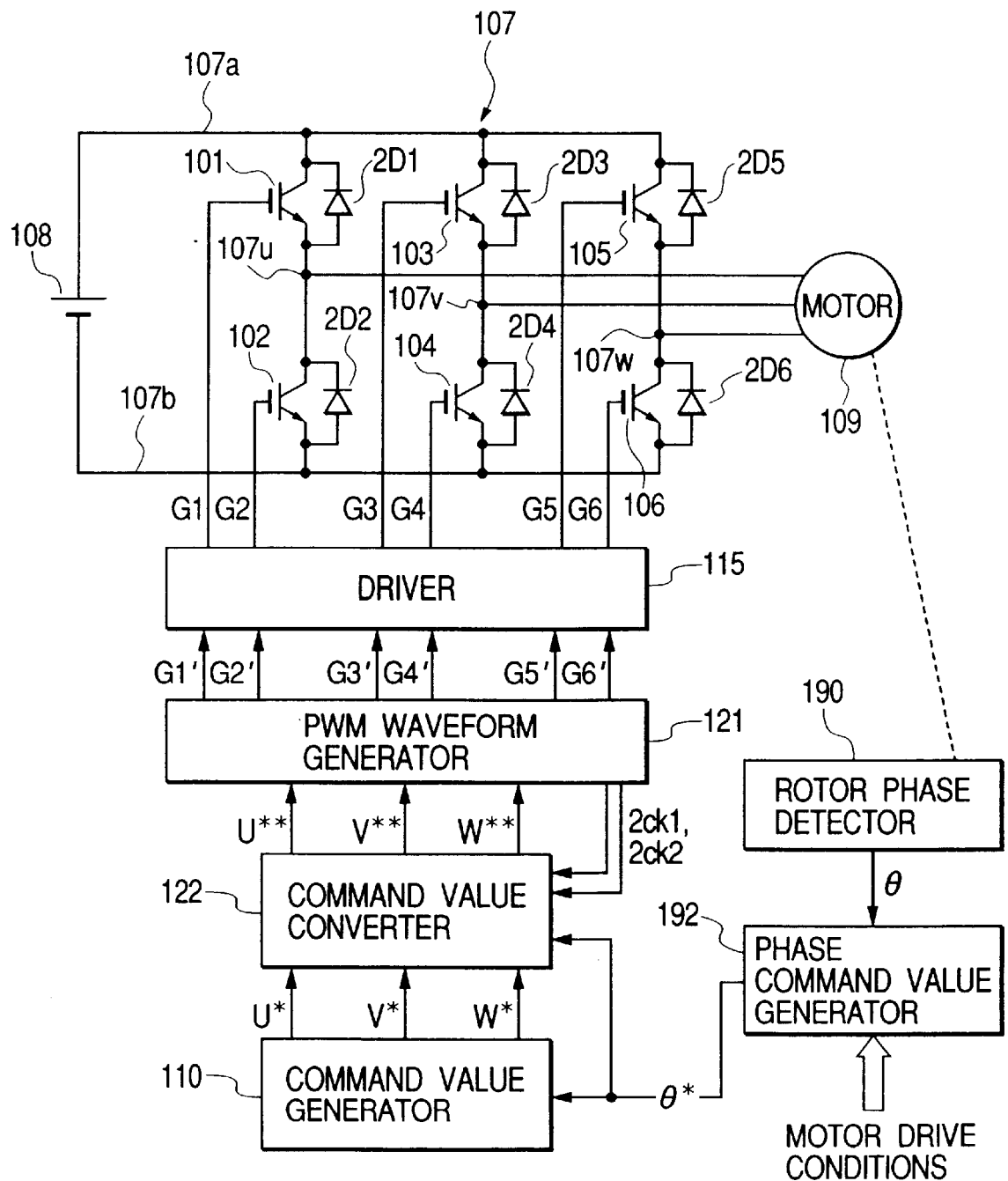
FIG. 34 is a diagram of a power converter apparatus according to a twenty-sixth embodiment of this invention.

FIG. 34 shows a power converter apparatus (an inverter apparatus) according to a twenty-sixth embodiment of this invention. The power converter apparatus of FIG. 34 drives a polyphase AC motor (a three-phase AC motor) 109 used to power, for example, an electric vehicle.

The power converter apparatus of FIG. 34 includes an inverter main circuit 107 having IGBT's (insulated gate bipolar transistors) 101, 102, 103, 104, 105, and 106 connected in a three-phase bridge or a three-arm bridge. The inverter main circuit 107 has first, second, and third arms connected between a positive DC power bus (a positive DC power rail) 107a and a negative DC power bus (a negative DC power rail) 107b. The first arm is provided with a series combination of a positive-side IGBT and a negative-side IGBT formed by the IGBT's 101 and 102 respectively. The second arm is provided with a series combination of a positive-side IGBT and a negative-side IGBT formed by the IGBT's 103 and 104 respectively. The third arm is provided with a series combination of a positive-side IGBT and a negative-side IGBT formed by the IGBT's 105 and 106 respectively. The first, second, and third arms correspond to three phases "U", "V", and "W" of the polyphase AC motor 109, respectively.

The positive and negative DC power busses 107a and 107b are connected to the positive and negative terminals of a battery 108, respectively. The battery 108 constitutes a DC power supply. The inverter main circuit 107 has output terminals 107u, 107v, and 107w for the three phases "U", "V", and "W" respectively. The output terminals 107u, 107v, and 107w are connected to U-phase, V-phase, and W-phase windings of the three-phase AC motor 109, respectively. Examples of the three-phase AC motor 109 are a synchronous motor, an induction motor, and a brushless motor. Free-wheeling diodes 2D1, 2D2, 2D3, 2D3, 2D5, and 2D6 are connected between the collectors and the emitters of the IGBT's 101, 102, 103, 104, 105, and 106 on an antiparallel basis, respectively.

The power converter apparatus of FIG. 34 includes a command signal generator 110, a driver 115, a PWM waveform generator 121, a command value converter 122, a rotor phase detector 190, and a phase command value generator 192.

The device 190 detects the phase (the rotational angle) θ of a rotor in the three-phase AC motor 109. A first example of the rotor phase detector 190 includes current sensors (not shown) associated with the connections between the output terminals 107u, 107v, and 107w of the inverter main circuit 107 and the U-phase, V-phase, and W-phase windings of the three-phase AC motor 109. The first example further includes a circuit for sensing zero-cross points in the output signals of the current sensors, and a circuit for detecting the phase (the rotational angle) θ of the rotor in the three-phase AC motor 109 in response to the sensed zero-cross points. A second example of the rotor phase detector 190 includes a rotary encoder or a resolver associated with the rotor in the three-phase AC motor 109. The second example further includes a circuit for detecting the phase (the rotational angle) θ of the rotor in response to the output signal of the rotary encoder or the resolver. The rotor phase detector 190 informs the phase command value generator 192 of the detected rotor phase θ.

The phase command value generator 192 receives information representing drive conditions of the three-phase AC motor 109. The phase command value generator 192 adds an advance quantity or a retard quantity to the detected rotor phase θ in response to the motor drive conditions, thereby changing the detected rotor phase θ into a phase command value θ. The phase command value generator 192 informs the command value generator 110 and the command value converter 122 of the phase command value θ*.

It should be noted that the phase command value θ* notified to the command value generator 110 and the command value converter 122 may be replaced by the detected rotor phase θ.

The command value generator 110 is formed by, for example, a DSP (digital signal processor) or a similar device which operates in accordance with a program stored in its internal ROM. The program is designed to enable the command value generator 110 to implement processes mentioned later. The command value generator 110 determines a basic voltage command value U* for the U phase, a basic voltage command value V* for the V phase, and a basic voltage command value W* for the W phase in response to the phase command value θ*. The command value generator 110 informs the command value converter 122 of the basic voltage command values U*, V*, and W*.

Specifically, the command value generator 110 equalizes the phase of the basic voltage command value U* to the phase of the phase command value θ*. The command value generator 110 retards the phase of the basic voltage command value V* from the phase of the basic voltage command value U* by $2\pi/3$. The command value generator 110 advances the phase of the basic voltage command value W* from the phase of the basic voltage command value U* by $2\pi/3$.

Preferably, the basic voltage command values U*, V*, and W* have the following relations with the phase command value θ*.

$$U^*=Va\cdot\sin(\theta^*)$$

$$V^*=Va\cdot\sin(\theta^*-2\pi/3)$$

$$W^*=Va\cdot\sin(\theta^*+2\pi/3)$$

where Va denotes a parameter for varying the amplitude levels of the basic voltage command values U*, V*, and W*.

Figure 35:
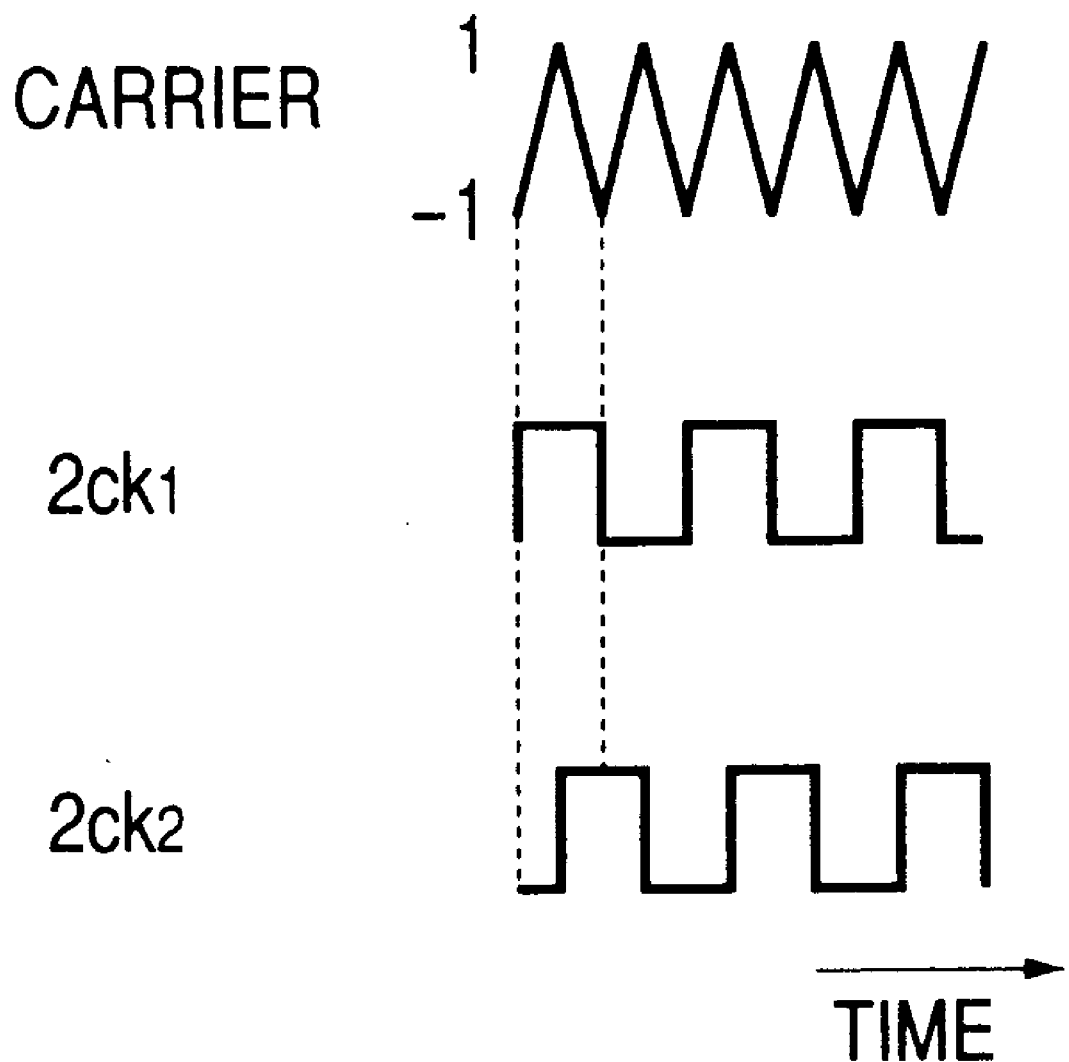
FIG. 35 is a time-domain diagram of a carrier wave, a first clock signal, and a second clock signal.
Figure 36:
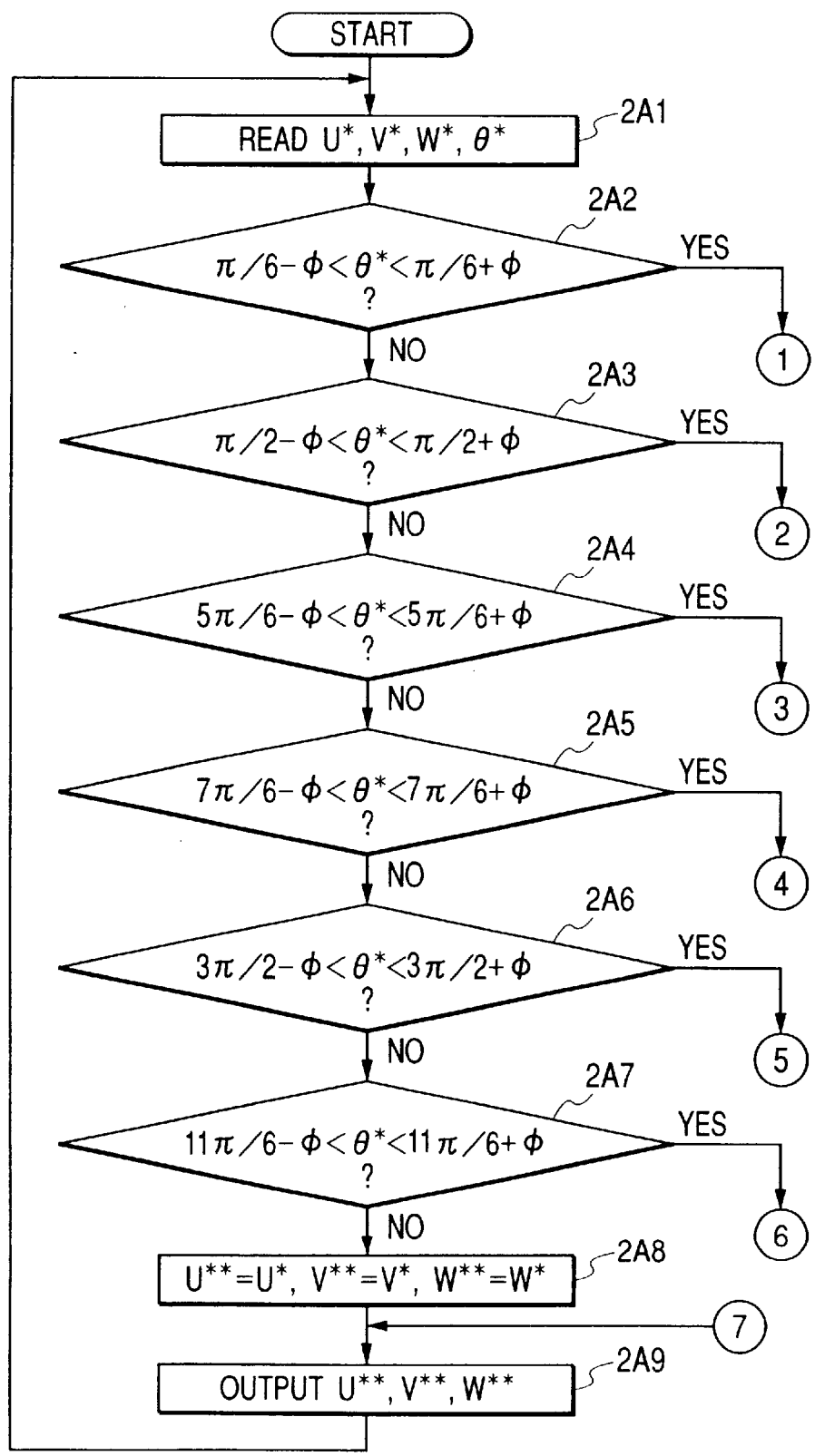
FIGS. 36, 37, 38, 39, 40, 41, and 42 are flowcharts of portions of a program for a command value converter in FIG. 34.
Figure 37:
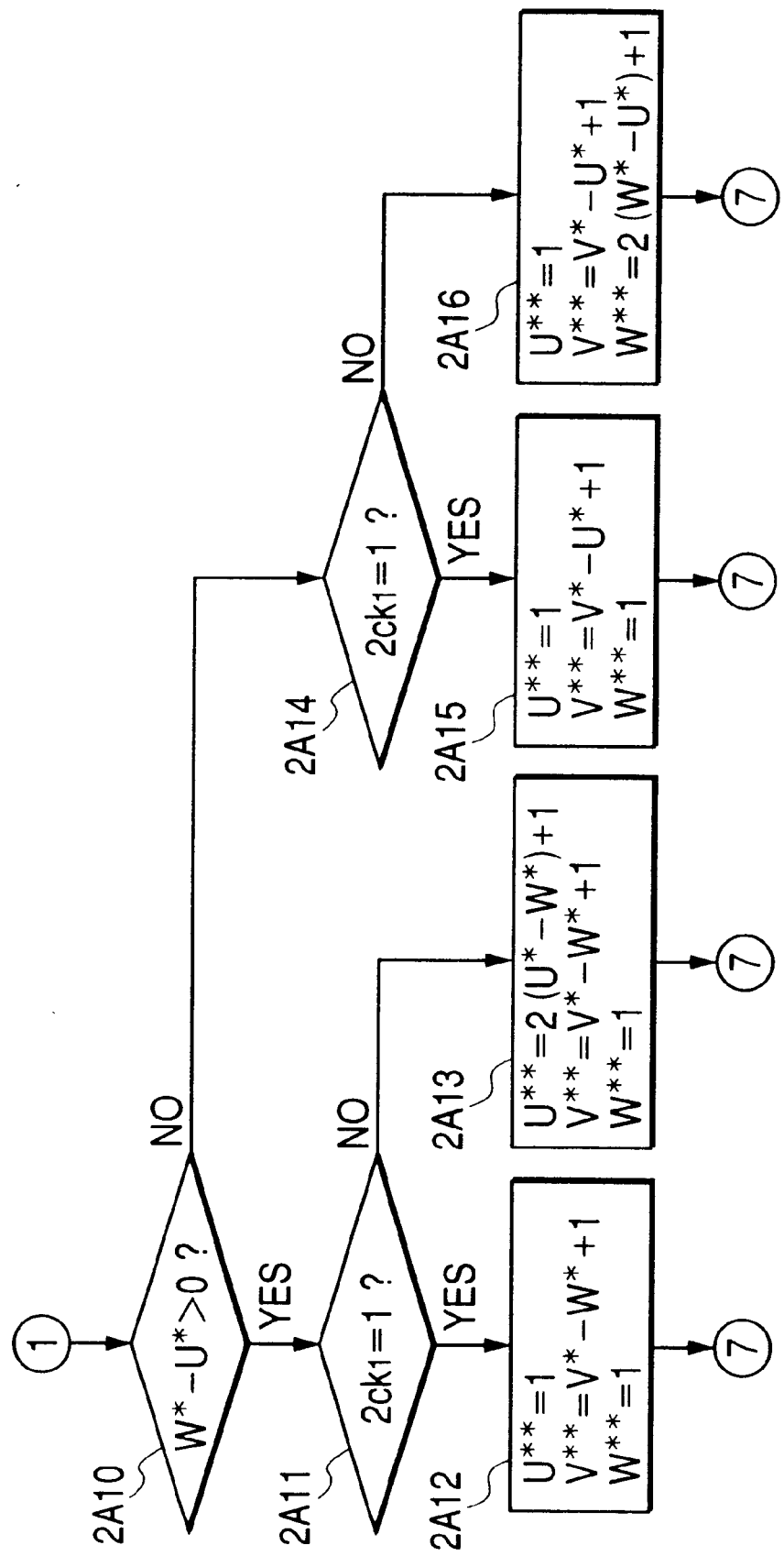
Figure 38:
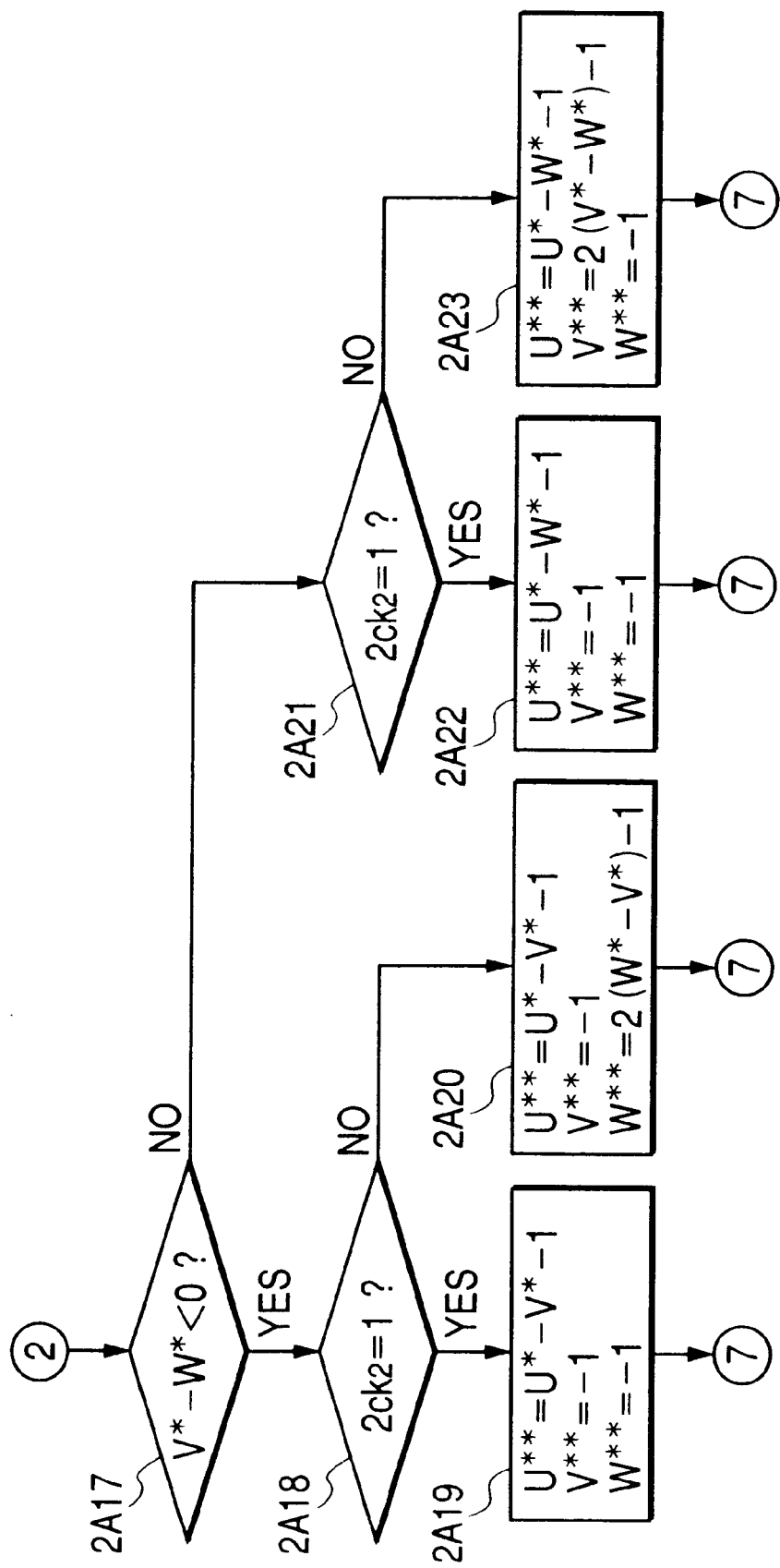
Figure 39:
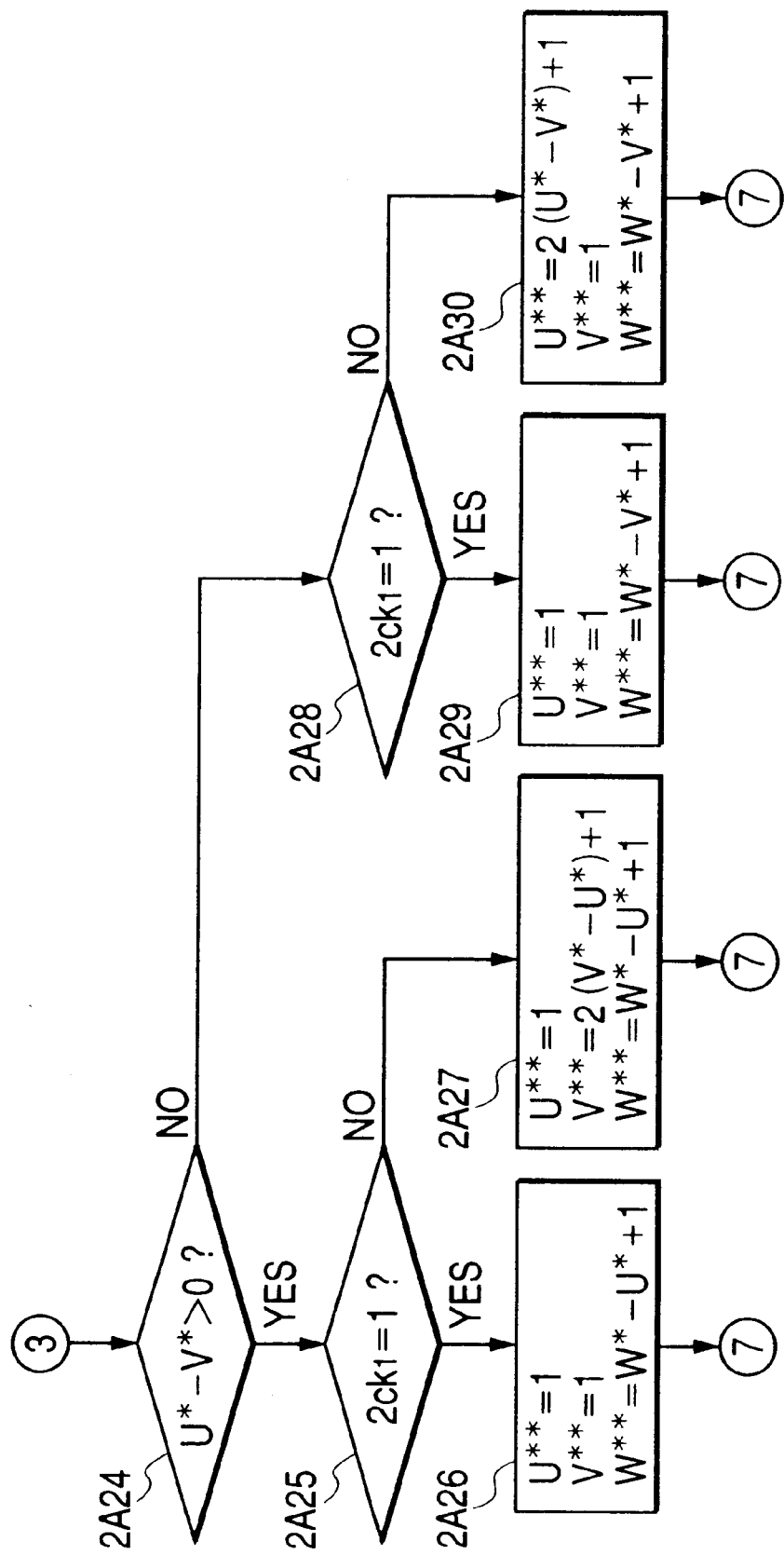
Figure 40:
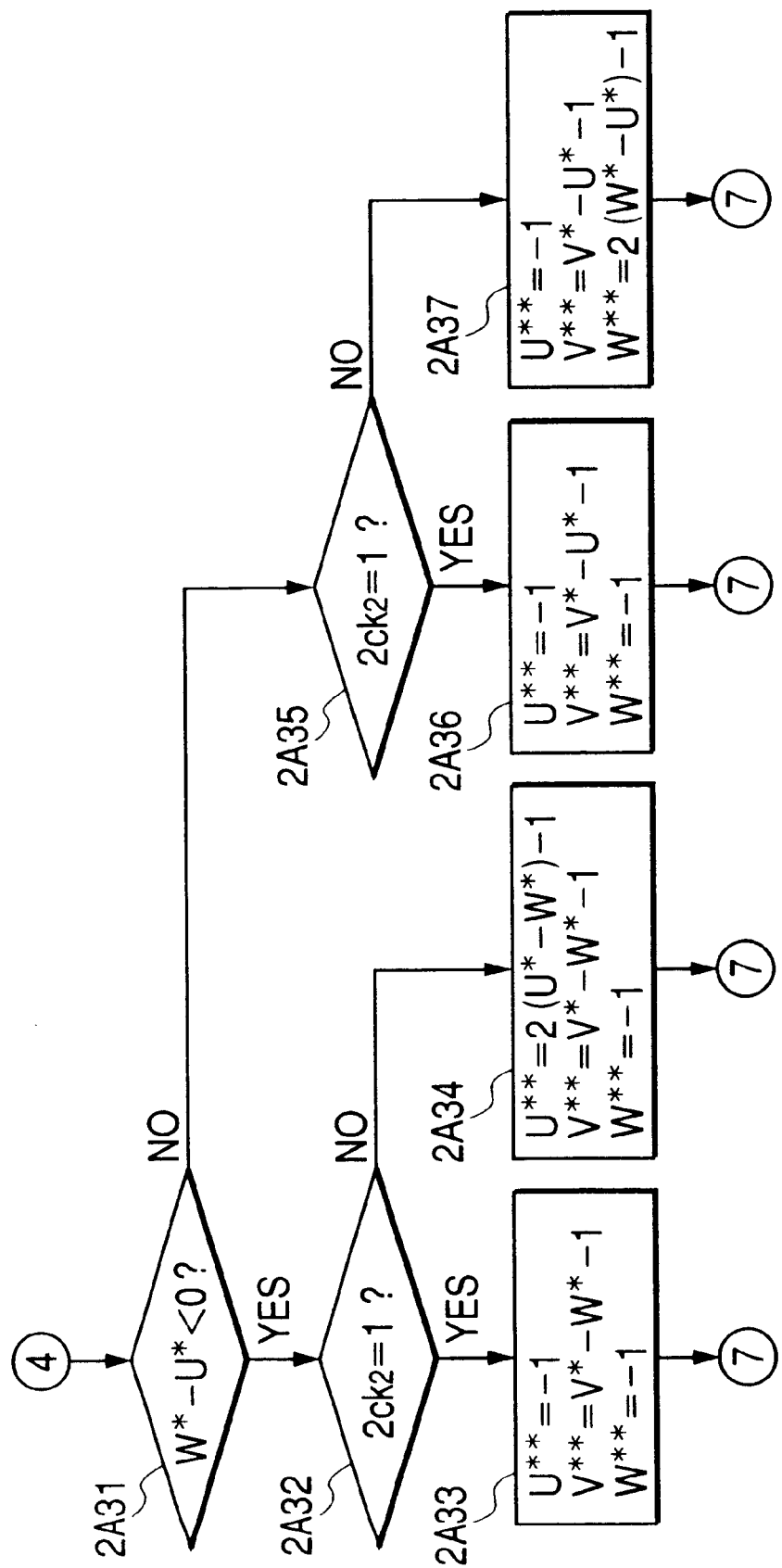
Figure 41:
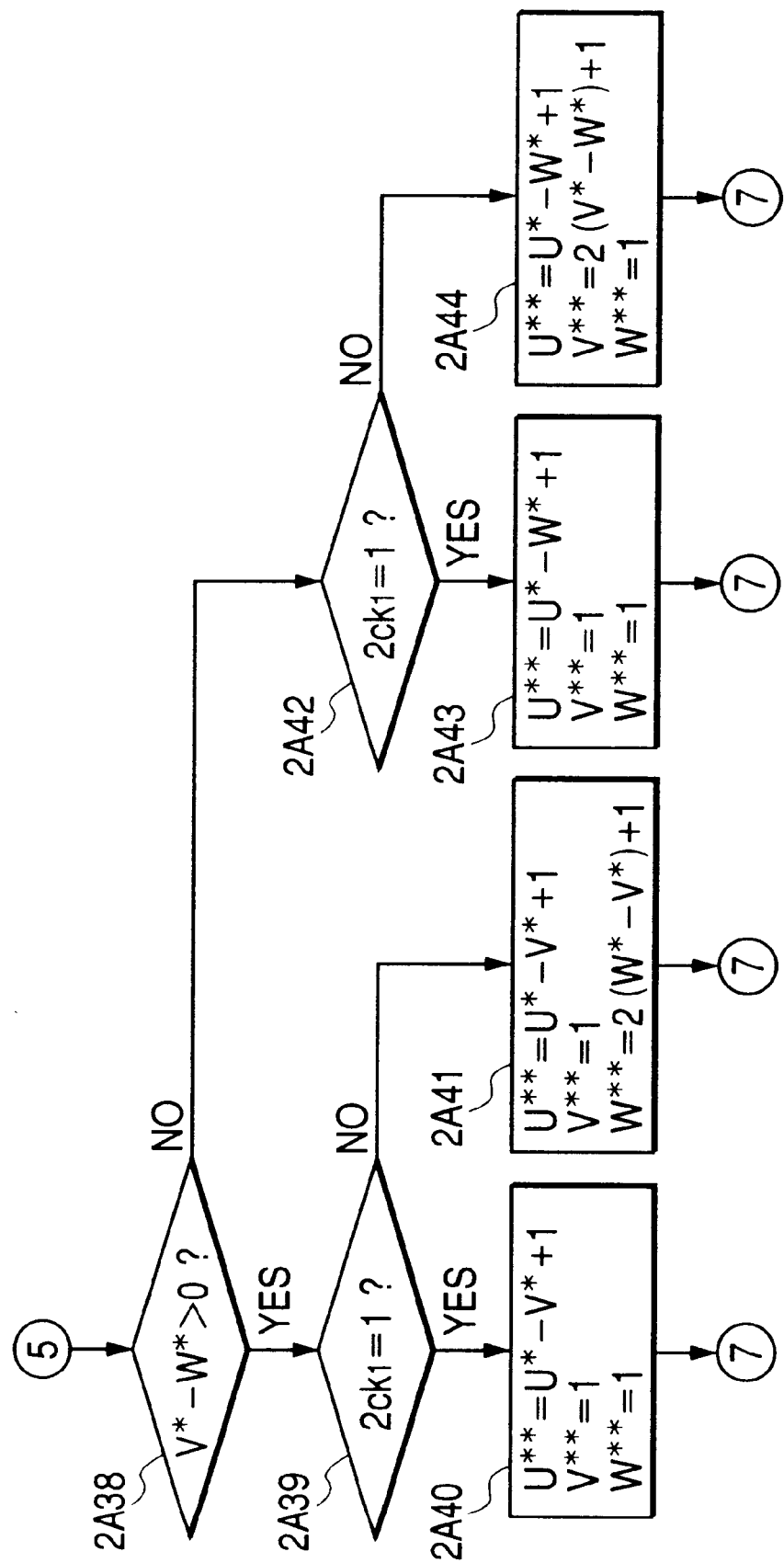
Figure 42:
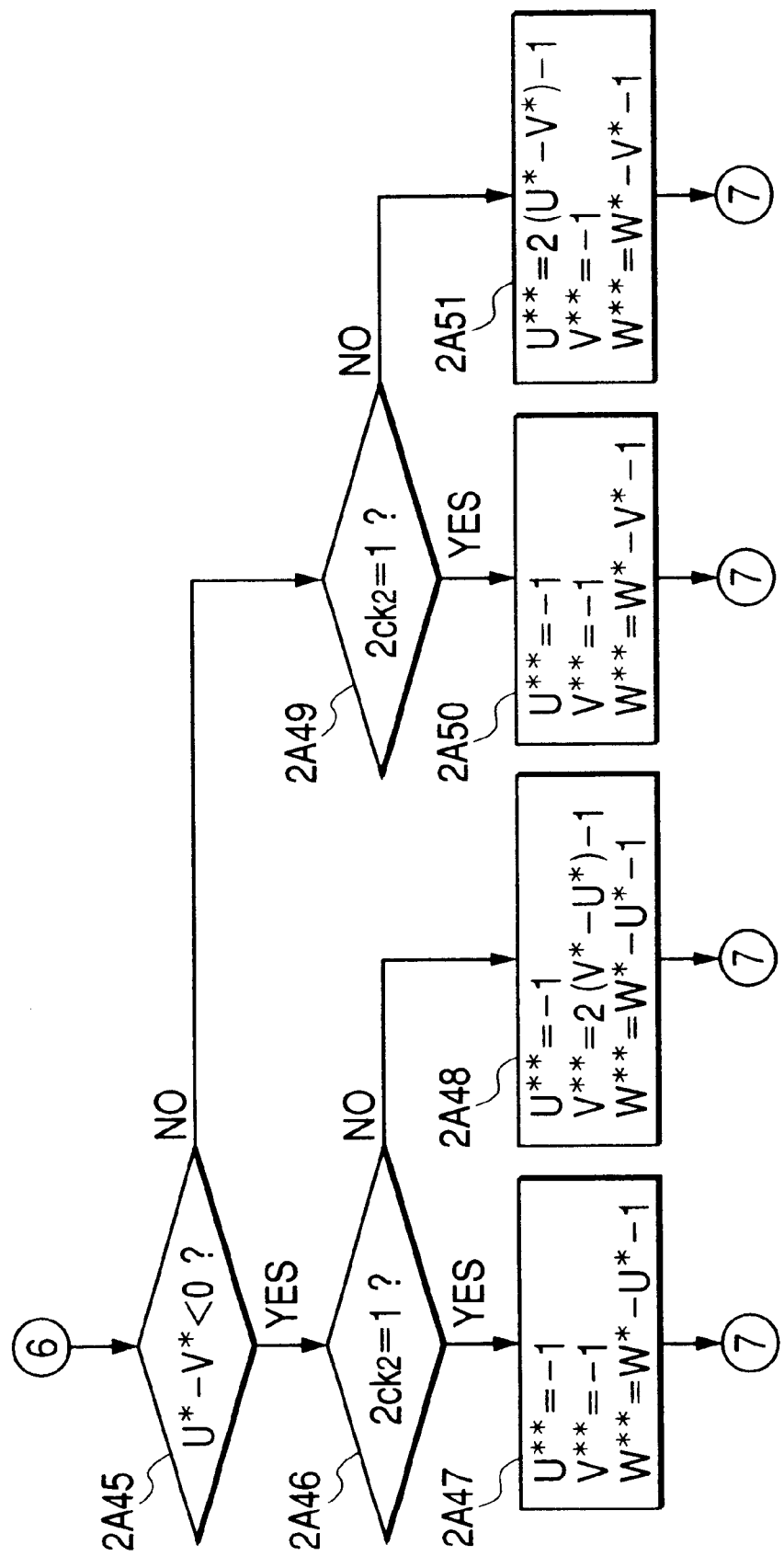

The PWM waveform generator 121 is similar to the PWM waveform generator 22 in FIGS. 12 and 13. The PWM waveform generator 121 feeds first and second clock signals 2ck1 and 2ck2 to the command value converter 122. As shown in FIG. 35, the period of the first clock signal 2ck1 is equal to twice the period of a triangular carrier wave produced in the PWM waveform generator 121. The logic state of the first clock signal 2ck1 changes every time the carrier wave bottoms to −1 (the minimum). The second clock signal 2ck2 has a 90° phase delay from the first clock signal 2ck1.

The command value converter 122 is formed by, for example, a DSP or a similar device which operates in accordance with a program stored in its internal ROM. The program is designed to enable the command value converter 122 to implement processes mentioned later. The command value converter 122 generates a final voltage command value U for the U phase, a final voltage command value V for the V phase, and a final voltage command value W** for the W phase in response to the basic voltage command values U*, V*, and W* and the phase command value θ*. The command value converter 122 informs the PWM waveform generator 121 of the final voltage command values U, V, and W**.

The PWM waveform generator 121 produces basic gate signals G1', G2', G3', G4', G5', and G6' in response to the final voltage command values U, V, and W**. The PWM waveform generator 121 outputs the basic gate signals G1'-G6' to the driver 115.

The driver 115 includes photocouplers for generating final gate signals G1, G2, G3, G4, G5, and G6 in response to the basic gate signals G1', G2', G3', G4', G5', and G6'. The driver 115 feeds the final gate signals G1, G2, G3, G4, G5, and G6 to the gates of the IGBT's 101, 102, 103, 104, 105, and 106, respectively.

The basic relation among the final voltage command value U, the states of the IGBT's 101 and 102, and the related voltage fed to the three-phase AC motor 109 is as follows. The U-phase arm in the inverter main circuit 107 has the IGBT's 101 and 102. When the final voltage command value U is higher than the level of the carrier wave, the IGBT 101 is in its on state and the IGBT 102 is in its off state so that the positive-side voltage of the battery 108 is transmitted to the U-phase winding of the three-phase AC motor 109. On the other hand, when the final voltage command value U is lower than the level of the carrier wave, the IGBT 101 is in its off state and the IGBT 102 is in its on state so that the negative-side voltage of the battery 108 is transmitted to the U-phase winding of the three-phase AC motor 109. Accordingly, during every period of the carrier wave, the positive-side voltage of the battery 108 continues to be transmitted to the U-phase winding of the three 1 phase AC motor 109 only for a time interval proportional to the final voltage command value U.

The basic relation among the final voltage command value V, the states of the IGBT's 103 and 104, and the related voltage fed to the three-phase AC motor 109 is similar to the above-indicated basic relation for the U phase. In addition, the basic relation among the final voltage command value W, the states of the IGBT's 105 and 106, and the related voltage fed to the three-phase AC motor 109 is similar to the above-indicated basic relation for the U phase.

Therefore, the positive-side voltage of the battery 108 and the negative-side voltage thereof are selectively transmitted to the V-phase and W-phase windings of the three-phase AC motor 109 in response to the final voltage command values V and W.

Each of the basic voltage command values U*, V*, and W* and the final voltage command values U, V, and W** is a variable between −1 and +1. In the case where each of the voltage command values U*, V*, W*, U, V, and W** is represented by an 8-bit data piece, 256 equally-spaced voltage values are set in the range between −1 and +1. The 256 different states of the 8-bit data piece, that is, the 256 different numbers (0–255) which can be represented by the 8-bit data piece, are assigned to the respective 256 voltage values in a regular order. The 8-bit number "0" corresponds to the voltage value "−1". The 8-bit number "255" corresponds to the voltage value "+1". The 8-bit number "127" corresponds to the voltage value "0".

When the final voltage command value U is equal to −1, the modulation percentage of the U-phase PWM signal is 0% and also the duty cycle thereof is 0%. Thus, in this case, the IGBT's 101 and 102 for the U phase do not implement switching. When the final voltage command value U is equal to +1, the modulation percentage of the U-phase PWM signal is 100% and also the duty cycle thereof is 100%. Thus, in this case, the IGBT's 101 and 102 for the U phase do not implement switching.

When the final voltage command value V is equal to −1, the modulation percentage of the V-phase PWM signal is 0% and also the duty cycle thereof is 0%. Thus, in this case, the IGBT's 103 and 104 for the V phase do not implement switching. When the final voltage command value V is equal to +1, the modulation percentage of the V-phase PWM signal is 100% and also the duty cycle thereof is 100%. Thus, in this case, the IGBT's 103 and 104 for the V phase do not implement switching.

When the final voltage command value W is equal to −1, the modulation percentage of the W-phase PWM signal is 0% and also the duty cycle thereof is 0%. Thus, in this case, the IGBT's 105 and 106 for the W phase do not implement switching. When the final voltage command value W is equal to +1, the modulation percentage of the W-phase PWM signal is 100% and also the duty cycle thereof is 100%. Thus, in this case, the IGBT's 105 and 106 for the W phase do not implement switching.

FIG. 36–42 is a flowchart of a program for the command value converter 122. With reference to FIGS. 36–42, a first step 2A1 of the program gets or reads the basic voltage command values U*, V*, and W*, and the phase command value $\theta^*$.

A step 2A2 following the step 2A1 determines whether or not the phase command value $\theta^*$ is between an electric angle "$\pi/6-\phi$" and electrical angle "$\pi/6+\phi$". In other words, the step 2A2 determines whether or not the phase command value $\theta^*$ is in a predetermined electrical angle range $\pm\phi$ centered at $\pi/6$. Here, "$\phi$" denotes a predetermined reference phase value. When the phase command value $\theta^*$ is between the electric angle "$\pi/6-\phi$" and the electrical angle "$\pi/6+\phi$", the program advances from the step 2A2 to a step 2A10. Otherwise, the program advances from the step 2A2 to a step 2A3.

The step 2A3 determines whether or not the phase command value $\theta^*$ is between an electric angle "$\pi/2-\phi$" and an electrical angle "$\pi/2+\phi$". In other words, the step 2A3 determines whether or not the phase command value $\theta^*$ is in a predetermined electrical angle range $\pm\phi$ centered at $\pi/2$ ($3\pi/6$). When the phase command value $\theta^*$ is between the electric angle "$\pi/2-\phi$" and the electrical angle "$\pi/2+\phi$", the program advances from the step 2A3 to a step 2A17. Otherwise, the program advances from the step 2A3 to a step 2A4.

The step 2A4 determines whether or not the phase command value $\theta^*$ is between an electric angle "$5\pi/6-\phi$" and an electrical angle "$5\pi/6+\phi$". In other words, the step 2A4 determines whether or not the phase command value $\theta^*$ is in a predetermined electrical angle range $\pm\phi$ centered at $5\pi/6$. When the phase command value $\theta^*$ is between the electric angle "$5\pi/6-\phi$" and the electrical angle "$5\pi/6+\phi$", the program advances from the step 2A4 to a step 2A24. Otherwise, the program advances from the step 2A4 to a step 2A5.

The step 2A5 determines whether or not the phase command value $\theta^*$ is between an electric angle "$7\pi/6-\phi$" and an electrical angle "$7\pi/6+\phi$". In other words, the step 2A5 determines whether or not the phase command value $\theta^*$ is in a predetermined electrical angle range $\pm\phi$ centered at $7\pi/6$. When the phase command value $\theta^*$ is between the electric angle "$7\pi/6-\phi$" and the electrical angle "$7\pi/6+\phi$", the program advances from the step 2A5 to a step 2A31. Otherwise, the program advances from the step 2A5 to a step 2A6.

The step 2A6 determines whether or not the phase command value $\theta^*$ is between an electric angle "$7\pi/2-\phi$" and an electrical angle "$7\pi/2+\phi$". In other words, the step 2A6 determines whether or not the phase command value $\theta^*$ is in a predetermined electrical angle range +1) centered at $3\pi/2$ ($9\pi/6$). When the phase command value $\theta^*$ is between the electric angle "$3\pi/2-\phi$" and the electrical angle "$3\pi/2+\phi$", the program advances from the step 2A6 to a step 2A38. Otherwise, the program advances from the step 2A6 to a step 2A7.

The step 2A7 determines whether or not the phase command value $\theta^*$ is between an electric angle "$11\pi/6-\phi$" and an electrical angle "$11\pi/6+\phi$". In other words, the step 2A7 determines whether or not the phase command value $\theta^*$ is in a predetermined electrical angle range $\pm\phi$ centered at $11\pi/6$. When the phase command value $\theta^*$ is between the electric angle "$11\pi/6-\phi$" and the electrical angle "$11\pi/6+\phi$", the program advances from the step 2A7 to a step 2A45. Otherwise, the program advances from the step 2A7 to a step 2A8.

The step 2A8 sets the final voltage command values U, V, and W** equal to the basic voltage command values U*, V*, and W*, respectively. After the step 2A8, the program advances to a step 2A9.

The step 2A10 subtracts the basic voltage command value U* from the basic voltage command value W*. The step 2A10 determines whether or not the subtraction result is positive, that is, whether or not W*−U*>0. When the subtraction result is positive, the program advances from the step 2A10 to a step 2A11. Otherwise, the program advances from the step 2A10 to a step 2A14.

The step 2A11 determines whether or not the first clock signal 2ck1 is "1" (the high-level state). When the first clock signal 2ck1 is "1", the program advances from the step 2A11 to a step 2A12. Otherwise, the program advances from the step 2A11 to a step 2A13.

The step 2A12 sets the final voltage command values U and W to +1. The step 2A12 calculates the final voltage command value V** from the basic voltage command values V* and W* according to the following equation.

$$V^{**}=V^*-W^*+1$$

After the step 2A12, the program advances to the step 2A9.

The step 2A13 sets the final voltage command value W to +1. The step 2A13 calculates the final voltage command value U from the basic voltage command values U* and W* according to the following equation.

$$U^{**}=2(U^*-W^*)+1$$

The step 2A13 calculates the final voltage command value V** from the basic voltage command values V* and W* according to the following equation.

$$V^{**}=V^*-W^*+1$$

After the step 2A13, the program advances to the step 2A9.

The step 2A14 determines whether or not the first clock signal 2ck1 is "1" (the high-level state). When the first clock signal 2ck1 is "1", the program advances from the step 2A14 to a step 2A15. Otherwise, the program advances from the step 2A14 to a step 2A16.

The step 2A15 sets the final voltage command values U and W to +1. The step 2A15 calculates the final voltage command value V** from the basic voltage command values V* and U* according to the following equation.

$$V^{**}=V^*-U+1$$

After the step 2A15, the program advances to the step 2A9.

The step 2A16 sets the final voltage command value U to +1. The step 2A16 calculates the final voltage command value V from the basic voltage command values V* and U* according to the following equation.

$$V^{**}=V^*-U^*+1$$

The step 2A16 calculates the final voltage command value W** from the basic voltage command values W* and U* according to the following equation.

$$W^{**}=2(W^*-U^*)+1$$

After the step 2A16, the program advances to the step 2A9.

The step 2A17 subtracts the basic voltage command value W* from the basic voltage command value V*. The step 2A17 determines whether or not the subtraction result is negative, that is, whether or not V*−W*<0. When the subtraction result is negative, the program advances from the step 2A17 to a step 2A18. Otherwise, the program advances from the step 2A17 to a step 2A21.

The step 2A18 determines whether or not the second clock signal 2ck2 is "1" (the high-level state). When the second clock signal 2ck2 is "1", the program advances from the step 2A18 to a step 2A19. Otherwise, the program advances from the step 2A18 to a step 2A20.

The step 2A19 sets the final voltage command values V and W to −1. The step 2A19 calculates the final voltage command value U** from the basic voltage command values U* and V* according to the following equation.

$$U^{**}=U^*-V^*-1$$

After the step 2A19, the program advances to the step 2A9.

The step 2Asets the final voltage command value V to −1. The step 2A20 calculates the final voltage command value U from the basic voltage command values U* and V* according to the following equation.

$$U^{}=U^{}-V^*-1$$

The step 2A20 calculates the final voltage command value W** from the basic voltage command values V* and W* according to the following equation.

$$W^{**}=2(W^*-V^*)-1$$

After the step 2A20, the program advances to the step 2A9.

The step 2A21 determines whether or not the second clock signal 2ck2 is "1" (the high-level state). When the second clock signal 2ck2 is "1", the program advances from the step 2A21 to a step 2A22. Otherwise, the program advances from the step 2A21 to a step 2A23.

The step 2A22 sets the final voltage command values V and W to −1. The step 2A22 calculates the final voltage command value U** from the basic voltage command values U* and W* according to the following equation.

$$U^{**}=U^*-W^*-1$$

After the step 2A22, the program advances to the step 2A9.

The step 2A23 sets the final voltage command value W to −1. The step 2A23 calculates the final voltage command value U from the basic voltage command values U* and W* according to the following equation.

$$U^{**}=U^*-W^*-1$$

The step 2A23 calculates the final voltage command value V** from the basic voltage command values V* and W* according to the following equation.

$$V^{**}=2(V^*-W^*)-1$$

After the step 2A23, the program advances to the step 2A9.

The step 2A24 subtracts the basic voltage command value V* from the basic voltage command value U*. The step 2A24 determines whether or not the subtraction result is positive, that is, whether or not U*−V*>0. When the subtraction result is positive, the program advances from the step 2A24 to a step 2A25. Otherwise, the program advances from the step 2A24 to a step 2A28.

The step 2A25 determines whether or not the first clock signal 2ck1 is "1" (the high-level state). When the first clock signal 2ck1 is "1", the program advances from the step 2A25 to a step 2A26. Otherwise, the program advances from the step 2A25 to a step 2A27.

The step 2A26 sets the final voltage command values U and V to +1. The step 2A26 calculates the final voltage command value W** from the basic voltage command values U* and W* according to the following equation.

$$W^{**}=W^*-U^*+1$$

After the step 2A26, the program advances to the step 2A9.

The step 2A27 sets the final voltage command value U to +1. The step 2A27 calculates the final voltage command value V from the basic voltage command values U* and V* according to the following equation.

$$V^{**}=2(V^*-U^*)+1$$

The step 2A27 calculates the final voltage command value W** from the basic voltage command values U* and W* according to the following equation.

$$W^{**}\ W^*-U^*+1$$

After the step 2A27, the program advances to the step 2A9.

The step 2A28 determines whether or not the first clock signal 2ck1 is "1" (the high-level state). When the first clock signal 2ck1 is "1", the program advances from the step 2A28 to a step 2A29. Otherwise, the program advances from the step 2A28 to a step 2A30.

The step 2A29 sets the final voltage command values U and V to +1. The step 2A29 calculates the final voltage command value W** from the basic voltage command values V* and W* according to the following equation.

$$W^{**}=W^*-V^*+1$$

After the step 2A29, the program advances to the step 2A9.

The step 2A30 sets the final voltage command value V to +1. The step 2A30 calculates the final voltage command value U from the basic voltage command values U* and V* according to the following equation.

$$U^{**}=2(U^*-V^*)+1$$

The step 2A30 calculates the final voltage command value W** from the basic voltage command values W* and V* according to the following equation.

$$W^{**}=W^*-V^*+1$$

After the step 2A30, the program advances to the step 2A9.

The step 2A31 subtracts the basic voltage command value U* from the basic voltage command value W*. The step 2A31 determines whether or not the subtraction result is negative, that is, whether or not W*−U*<0. When the subtraction result is negative, the program advances from the step 2A31 to a step 2A32. Otherwise, the program advances from the step 2A31 to a step 2A35.

The step 2A32 determines whether or not the second clock signal 2ck2 is "1" (the high-level state). When the second clock signal 2ck2 is "1", the program advances from the step 2A32 to a step 2A33. Otherwise, the program advances from the step 2A32 to a step 2A34.

The step 2A33 sets the final voltage command values U and W to −1. The step 2A33 calculates the final voltage command value V** from the basic voltage command values V* and W* according to the following equation.

$$V^{**}=V^*-W^*-1$$

After the step 2A33, the program advances to the step 2A9.

The step 2A34 sets the final voltage command value W to −1. The step 2A34 calculates the final voltage command value U from the basic voltage command values U* and W* according to the following equation.

$$U^{**}=2(U^*-W^*)-1$$

The step 2A34 calculates the final voltage command value V** from the basic voltage command values V* and W* according to the following equation.

$$V^{**}=V^*-W^*-1$$

After the step 2A34, the program advances to the step 2A9.

The step 2A35 determines whether or not the second clock signal 2ck2 is "1" (the high-level state). When the second clock signal 2ck2 is "1", the program advances from the step 2A35 to a step 2A36. Otherwise, the program advances from the step 2A35 to a step 2A37.

The step 2A36 sets the final voltage command values U and W to −1. The step 2A36 calculates the final voltage command value V** from the basic voltage command values U* and V* according to the following equation.

$$V^{**}=V^*-U^*-1$$

After the step 2A36, the program advances to the step 2A9.

The step 2A37 sets the final voltage command value U to −1. The step 2A37 calculates the final voltage command value V from the basic voltage command values U* and V* according to the following equation.

$$V^{**}=V^*-U^*-1$$

The step 2A37 calculates the final voltage command value W** from the basic voltage command values U* and W* according to the following equation.

$$W^{**}=2(W^*-U^*)-1$$

After the step 2A37, the program advances to the step 2A9.

The step 2A38 subtracts the basic voltage command value W* from the basic voltage command value V*. The step 2A38 determines whether or not the subtraction result is positive, that is, whether or not V*−W*>0. When the subtraction result is positive, the program advances from the step 2A38 to a step 2A39. Otherwise, the program advances from the step 2A38 to a step 2A42.

The step 2A39 determines whether or not the first clock signal 2ck1 is "1" (the high-level state). When the first clock signal 2ck1 is "1", the program advances from the step 2A39 to a step 2A40. Otherwise, the program advances from the step 2A39 to a step 2A41.

The step 2A40 sets the final voltage command values V and W to +1. The step 2A40 calculates the final voltage command value U** from the basic voltage command values U* and V* according to the following equation.

$$U^{**}=U^*-V^*+1$$

After the step 2A40, the program advances to the step 2A9.

The step 2A41 sets the final voltage command value V to +1. The step 2A41 calculates the final voltage command value U from the basic voltage command values U* and V* according to the following equation.

$$U^{**}=U^*-V^*+1$$

The step 2A41 calculates the final voltage command value W** from the basic voltage command values V* and W* according to the following equation.

$$W^{**}=2(W^*-V^*)+1$$

After the step 2A41, the program advances to the step 2A9.

The step 2A42 determines whether or not the first clock signal 2ck1 is "1" (the high-level state). When the first clock signal 2ck1 is "1", the program advances from the step 2A42 to a step 2A43. Otherwise, the program advances from the step 2A42 to a step 2A44.

The step 2A43 sets the final voltage command values V and W to +1. The step 2A43 calculates the final voltage command value U** from the basic voltage command values U* and W* according to the following equation.

$$U^{**}=U^*-W^*+1$$

After the step 2A43, the program advances to the step 2A9.

The step 2A44 sets the final voltage command value W to +1. The step 2A44 calculates the final voltage command value U from the basic voltage command values U* and W* according to the following equation.

$$U^{**}=U^*-W^*+1$$

The step 2A44 calculates the final voltage command value V** from the basic voltage command values V* and W* according to the following equation.

$$V^{**}=2(V^*-W^*)+1$$

After the step 2A44, the program advances to the step 2A9.

The step 2A45 subtracts the basic voltage command value V* from the basic voltage command value U*. The step 2A45 determines whether or not the subtraction result is negative, that is, whether or not U*−V*<0. When the subtraction result is negative, the program advances from the step 2A45 to a step 2A46. Otherwise, the program advances from the step 2A45 to a step 2A49.

The step 2A46 determines whether or not the second clock signal 2ck2 is "1" (the high-level state). When the second clock signal 2ck2 is "1", the program advances from the step 2A46 to a step 2A47. Otherwise, the program advances from the step 2A46 to a step 2A48.

The step 2A47 sets the final voltage command values U and V to −1. The step 2A47 calculates the final voltage command value W** from the basic voltage command values U* and W* according to the following equation.

$$W^{**}=W^*-U^*-1$$

After the step 2A47, the program advances to the step 2A9.

The step 2A48 sets the final voltage command value U to −1. The step 2A48 calculates the final voltage command value V from the basic voltage command values U* and V* according to the following equation.

$$V^{**}=2(V^*-U^*)-1$$

The step 2A48 calculates the final voltage command value W** from the basic voltage command values U* and W* according to the following equation.

$$W^{**}=W^*-U^*-1$$

After the step 2A48, the program advances to the step 2A9.

The step 2A49 determines whether or not the second clock signal 2ck2 is "1" (the high-level state). When the second clock signal 2ck2 is "1", the program advances from the step 2A49 to a step 2A50. Otherwise, the program advances from the step 2A49 to a step 2A51.

The step 2A50 sets the final voltage command values U and V to −1. The step 2A50 calculates the final voltage command value W** from the basic voltage command values V* and W* according to the following equation.

$$W^{**}=W^*-V^*-1$$

After the step 2A50, the program advances to the step 2A9.

The step 2A51 sets the final voltage command value V to −1. The step 2A51 calculates the final voltage command value U from the basic voltage command values U* and V* according to the following equation.

$$U^{**}=2(U^*-V^*)-1$$

The step 2A51 calculates the final voltage command value W** from the basic voltage command values V* and W* according to the following equation.

$$W^{**}=W^*-V^*-1$$

After the step 2A51, the program advances to the step 2A9.

The step 2A9 outputs the final voltage command values U, V, and W to the PWM waveform generator 121. After the step 2A9, the program returns to the step 2A1**.

Figure 43:
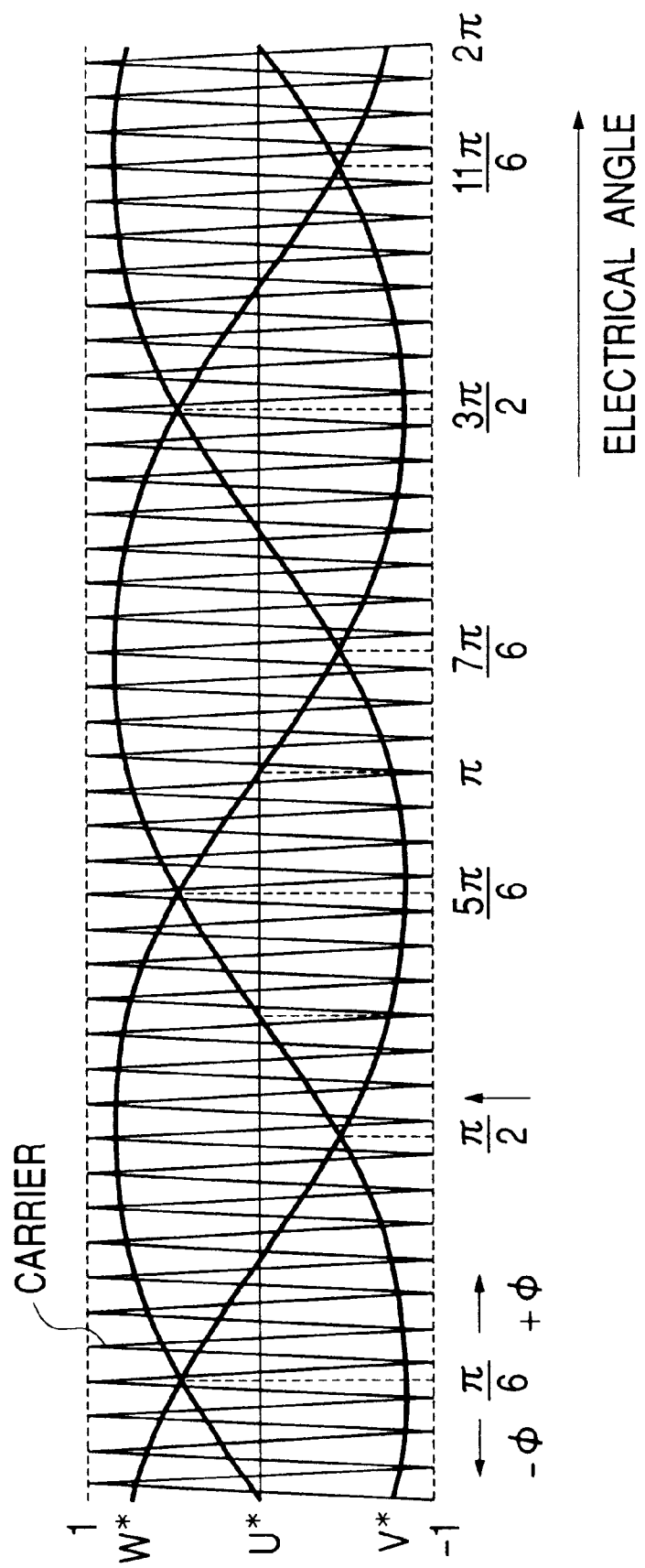
FIG. 43 is a time-domain diagram of basic voltage command values and a carrier wave.

The predetermined electrical angle ranges used by the steps 2A2, 2A3, 2A4, 2A5, 2A6, and 2A7 are centered at π/6, π/2 (3π/6), 5π/6, 7π/6, 3π/2 (9π/6), and 11π/6, respectively. As shown in FIG. 43, in these predetermined electrical angle ranges, two of the basic voltage command values U*, V*, and W* are approximately or substantially equal to each other. The width of the predetermined electrical angle ranges is determined by the predetermined reference phase value φ.

Figure 44:
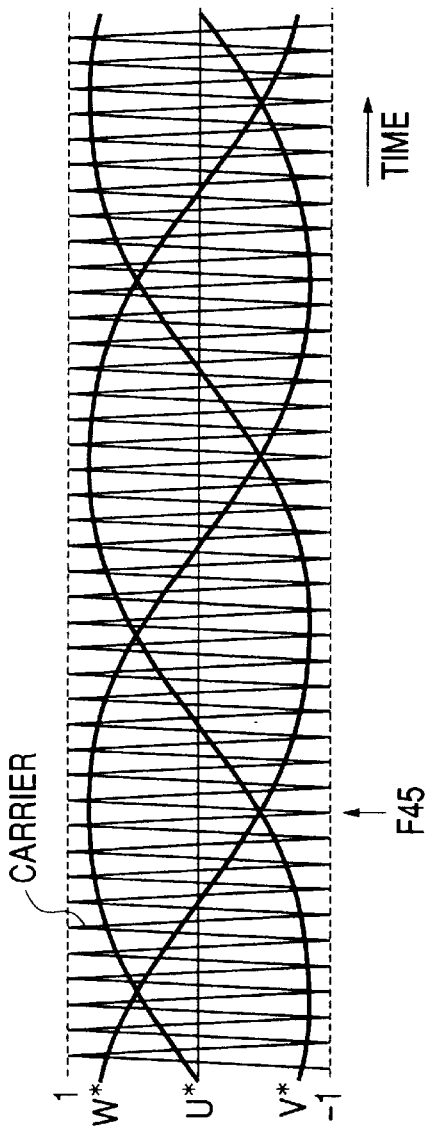
FIG. 44 is a time-domain diagram of basic voltage command values and a carrier wave.
Figure 46:
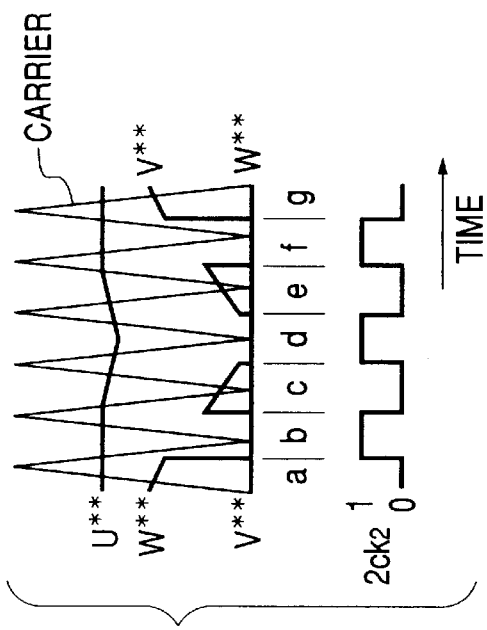
FIG. 46 is a time-domain diagram of final voltage command values, a carrier wave, and a second clock signal in a time region corresponding to that in FIG. 45.
Figure 45:
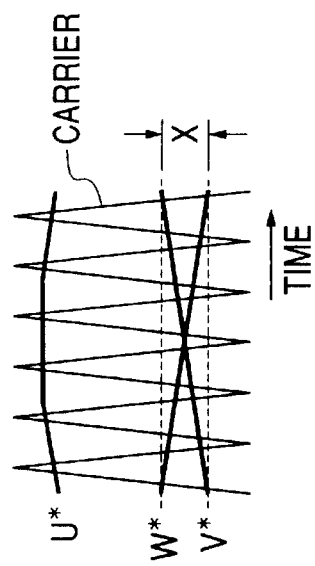
FIG. 45 is a time-domain diagram of a portion in FIG. 44.

FIG. 44 shows an example of time-domain conditions of the carrier wave and the basic voltage command values U*, V*, and W*. FIG. 45 shows a portion of FIG. 44 which is denoted by the arrow F45. FIG. 46 shows time-domain conditions of the carrier wave, the second clock signal 2ck2, and the final command values U, V, and W** generated from the basic voltage command values U*, V*, and W* in FIG. 45. For an easy understanding, the period of the illustrated carrier wave in FIGS. 44–46 is longer than actual one. During a time region at and near the intersection of two of the basic voltage command values U*, V* and W*, the two basic voltage command values are close to each other.

With reference to FIGS. 44–46, in a time region where the basic voltage command values V* and W* are close to each other and the basic voltage command value U* is positive, first conversion time intervals "b", "d", and "f" alternate with second conversion time intervals "a", "c", "e", and "g" (see FIG. 46). During the first conversion time intervals "b", "d", and "f" for which the second clock signal 2ck2 is "1", the final voltage command values V and W are fixed to −1 (the minimum) so that one-phase modulation is implemented in response to the final voltage command value U. During the second conversion time intervals "a" and "c" for which the second clock signal 2ck2 is "0", only the final voltage command value V is fixed to −1 (the minimum) so that two-phase modulation is implemented in response to the final voltage command values U and W. During the second time intervals "e" and "g" for which the second clock signal 2ck2 is "0", only the final voltage command value W is fixed to −1 (the minimum) so that two-phase modulation is implemented in response to the final voltage command values U and V**. Thus, one-phase modulation and two-phase modulation alternate at twice the period of the carrier wave.

During the time region shown in FIG. 45, the phase command value θ* is in the predetermined electrical angle range ±φ centered at π/2 (3π/6). Therefore, the program in FIGS. 36–42 advances from the step 2A3 to the step 2A17. When the step 2A17 determines that V*−W*<0, the program advances to the step 2A18. When the step 2A18 determines that the second clock signal 2ck2 is "1", the program advances to the step 2A19.

The step 2A19 sets the final voltage command values U, V, and W** as follows.

$$U^{**}=U^*-V^*-1 \tag{101}$$

$$V^{}=W^{}=-1 \text{ (corresponding to the 8-bit number "0")} \tag{102}$$

As a result, the modulation percentage of the V-phase and W-phase PWM signals is equalized to 0% and also the duty cycle thereof is equalized to 0%. Thus, the IGBT's 103, 104, 105, and 106 for the V phase and the W phase do not implement switching. The final voltage command value U** is enabled by the equation (101) to maintain the inter-line voltage difference between the U phase and the V phase. Accordingly, there occurs a first conversion time interval for which one-phase modulation subjecting only the U phase to switching is implemented.

When the step 2A18 determines that the second clock signal 2ck2 is not "1", the program advances to the step 2A20. The step 2A20 sets the final voltage command values U, V, and W** as follows.

$$U^{**}=U^*-V^*-1 \tag{103}$$

$$V^{**}=-1 \tag{104}$$

$$W^{**}=2(W^*-V^*)-1 \tag{105}$$

As a result, the U and W phases undergo switching while the V phase remains unswitched. Accordingly, there occurs a second conversion time interval for which two-phase modulation subjecting the U and W phases to switching is implemented. Specifically, the final voltage command value W corresponds to twice the inter-line voltage difference between the W phase and the V phase. This setting of the final voltage command value W is to compensate for fixing the value W** to −1 during the immediately-preceding period with respect to the carrier wave.

When the step 2A17 determines that V*−W*≧0, the program advances to the step 2A21. When the step 2A21 determines that the second clock signal 2ck2 is "1", the program advances to the step 2A22. The step 2A22 sets the final voltage command values U, V, and W** as follows.

$$U^{**} U^*-W^*-1 \tag{106}$$

$$V^{}=W^{}=-1 \tag{106}$$

When the step 2A21 determines that the second clock signal 2ck2 is not "1", the program advances to the step 2A23. The step 2A23 sets the final voltage command values U, V, and W** as follows.

$$U^{**}=U^*-W^*-1 \tag{107}$$

$$V^{**}=2(V^*-W^*)-1 \tag{108}$$

$$W^{**}=-1 \tag{109}$$

The final voltage command values U, V, and W** generated in the above-mentioned processes are shown in FIG. 46. In the time interval "d", the basic voltage command values V* and W* intersect with each other (see FIG. 45). Thus, during the time intervals "a"–"c" and the former portion of the time interval "d", there occurs a condition as V*<W*. During the latter portion of the time interval "d" and the time intervals "e"–"g", there occurs a condition as V*>W*. During the time intervals (the first conversion time intervals) "b", "d", and "f" for which the second clock signal 2ck2 is "1", the final voltage command values V and W are fixed to −1 (the minimum) so that one-phase modulation is implemented in response to the final voltage command value U. During the second conversion time intervals "a" and "c" for which the second clock signal 2ck2 is "0", only the final voltage command value V is fixed to −1 (the minimum) so that two-phase modulation is implemented in response to the final voltage command values U and W. During the second time intervals "e" and "g" for which the second clock signal 2ck2 is "0", only the final voltage command value W is fixed to −1 (the minimum) so that two-phase modulation is implemented in response to the final voltage command values U and V**. Thus, one-phase modulation and two-phase modulation alternate at twice the period of the carrier wave.

A time region, where the basic voltage command values V* and W* are close to each other and the basic voltage command value U* is negative, corresponds to the predetermined electrical angle range ±φ centered at 3π/2 (9π/6). Therefore, during this time region, the program in FIGS. 36–42 advances from the step 2A6 to the step 2A38. When the step 2A38 determines that V*−W*>0, the program advances to the step 2A39. When the step 2A39 determines that the first clock signal 2ck1 is "1", the program advances to the step 2A40.

The step 2A40 sets the final voltage command values U, V, and W** as follows.

$$U^{**}=U^*-V^*-1 \tag{110}$$

$$V^{} W^{}=+1 \text{ (corresponding to the 8-bit number "255")} \tag{111}$$

As a result, the modulation percentage of the V-phase and W-phase PWM signals is equalized to 100% and also the duty cycle thereof is equalized to 100%. Thus, the IGBT's 103, 104, 105, and 106 for the V phase and the W phase do not implement switching. The final voltage command value U** is enabled by the equation (110) to maintain the inter-line voltage difference between the U phase and the V phase. Accordingly, there occurs a first conversion time interval for which one-phase modulation subjecting only the U phase to switching is implemented.

When the step 2A39 determines that the first clock signal 2ck1 is not "1", the program advances to the step 2A41. The step 2A41 sets the final voltage command values U, V, and W** as follows.

$$U^*=U^*-V^*+1 \tag{112}$$

$$V^{**}=+1 \tag{113}$$

$$W^{**}=2(W^*-V^*)+1 \tag{114}$$

As a result, the U and W phases undergo switching while the V phase remains unswitched. Accordingly, there occurs a second conversion time interval for which two-phase modulation subjecting the U and W phases to switching is implemented. Specifically, the final voltage command value W** corresponds to twice the inter-line voltage difference between the W phase and the V phase.

The positive results of the determinations by the steps 2A2–2A7 relate to the basic voltage command values U*, V*, and W* as follows.

2A2: U=W, V<0

2A3: V=W, U>0

2A4: U=V, W<0

2A5: U=W, V>0

2A6: V=W, U<0

2A7: U=V, W>0 where "=" means "approximately or substantially equal".

In the case where the determination by the step 2A2 provides a positive result and W*>U*, the program in FIGS. 36–42 advances to the step 2A12 or the step 2A13. The step 2A12 (the first conversion time interval) sets the final voltage command values U, V, and W** as follows.

$$U^{**}=+1 \tag{115}$$

$$V^{**}=V^*-W^*+1 \tag{116}$$

$$W^{**}=+1 \tag{117}$$

On the other hand, the step 2A13 (the second conversion time interval) sets the final voltage command values U, V, and W** as follows.

$$U^{**}=2(U^*-W^*)+1 \tag{118}$$

$$V^{**}=V^*-W^*+1 \tag{119}$$

$$W^{**}=+1 \tag{120}$$

In the case where the determination by the step 2A2 provides a positive result and W*<U*, the program in FIGS. 36–42 advances to the step 2A15 or the step 2A16. The step 2A15 (the first conversion time interval) sets the final voltage command values U, V, and W** as follows.

$$U^{**}=+1 \tag{121}$$

$$V^{**}=V^*-U^*+1 \tag{122}$$

$$W^{**}=+1 \tag{123}$$

On the other hand, the step 2A16 (the second conversion time interval) sets the final voltage command values U, V, and W** as follows.

$$U^*=+1 \tag{124}$$

$$V^{**}=V^*-U^*+1 \tag{125}$$

$$W^{**}=2(W^*-U^*)+1 \tag{126}$$

In the case where the determination by the step 2A5 provides a positive result and W*<U*, the program in FIGS. 36–42 advances to the step 2A33 or the step 2A34. The step 2A33 (the first conversion time interval) sets the final voltage command values U, V, and W** as follows.

$$U^{**}=-1 \tag{127}$$

$$V^{**}=V^*-W^*-1 \tag{128}$$

$$W^{**}=-1 \tag{129}$$

On the other hand, the step 2A34 (the second conversion time interval) sets the final voltage command values U, V, and W** as follows.

$$U^{**}=2(U^*-W^*)-1 \tag{130}$$

$$V^{**}=V^*-W^*-1 \tag{131}$$

$$W^{**}=-1 \tag{132}$$

In the case where the determination by the step 2A5 provides a positive result and W*>U*, the program in FIGS. 36–42 advances to the step 2A36 or the step 2A37. The step 2A36 (the first conversion time interval) sets the final voltage command values U, V, and W** as follows.

$$U^{**}=-1 \tag{133}$$

$$V^{**}\ V^*-U^*-1 \tag{134}$$

$$W^{**}=-1 \tag{135}$$

On the other hand, the step 2A37 (the second conversion time interval) sets the final voltage command values U, V, and W** as follows.

$$U^{**}=-1 \tag{136}$$

$$V^{**}=V^*-U^*-1 \tag{137}$$

$$W^{**}=2(W^*-U^*)-1 \tag{138}$$

In the case where the determination by the step 2A4 provides a positive result and U*>V*, the program in FIGS. 36–42 advances to the step 2A26 or the step 2A27. The step 2A26 (the first conversion time interval) sets the final voltage command values U, V, and W** as follows.

$$U^{**}=+1 \tag{139}$$

$$V^{**}=+1 \tag{140}$$

$$W^{**}=W^*-U^*+1 \tag{141}$$

On the other hand, the step 2A27 (the second conversion time interval) sets the final voltage command values U, V, and W** as follows.

$$U^{**}=+1 \tag{142}$$

$$V^{**}=2(V^*-U^*)+1 \tag{143}$$

$$W^{**}=W^*-U^*+1 \tag{144}$$

In the case where the determination by the step 2A4 provides a positive result and U*≦V*, the program in FIGS. 36–42 advances to the step 2A29 or the step 2A30. The step 2A29 (the first conversion time interval) sets the final voltage command values U, V, and W** as follows.

$$U^{**}=+1 \tag{145}$$

$$V^{**}=+1 \tag{146}$$

$$W^{**}=W^*-V^*+1 \tag{147}$$

On the other hand, the step 2A30 (the second conversion time interval) sets the final voltage command values U, V, and W** as follows.

$$U^{**}=2(U^*-V^*)+1 \tag{148}$$

$$V^*=+1 \tag{149}$$

$$W^{**}=W^*-V^*+1 \tag{150}$$

In the case where the determination by the step 2A7 provides a positive result and U*<V*, the program in FIGS. 36–42 advances to the step 2A47 or the step 2A48. The step 2A47 (the first conversion time interval) sets the final voltage command values U, V, and W** as follows.

$$U^{**}=-1 \tag{151}$$

$$V^{**}=-1 \tag{152}$$

$$W^{**}=W^{*}-U^{*}-1 \tag{153}$$

On the other hand, the step 2A48 (the second conversion time interval) sets the final voltage command values U, V, and W** as follows.

$$U^{**}=-1 \tag{154}$$

$$V^{**}=2(V^{*}-U^{*})-1 \tag{155}$$

$$W^{**}\ W^{*}-U^{*}-1 \tag{156}$$

In the case where the determination by the step 2A7 provides a positive result and U*≧V*, the program in FIGS. 36–42 advances to the step 2A50 or the step 2A51. The step 2A50 (the first conversion time interval) sets the final voltage command values U, V, and W** as follows.

$$U^{**}=-1 \tag{157}$$

$$V^{**}=-1 \tag{158}$$

$$W^{**}=W^{*}-V^{*}-1 \tag{159}$$

On the other hand, the step 2A51 (the second conversion time interval) sets the final voltage command values U, V, and W** as follows.

$$U^{**}=2(U^{*}-V^{*})-1 \tag{160}$$

$$V^{*}\ -1 \tag{161}$$

$$W^{**}=W^{*}-V^{*}-1 \tag{162}$$

In the case where all the determinations by the steps 2A2–2A7 provide negative results, the program in FIGS. 36–42 advances to the step 2A8. The step 2A8 sets the final voltage command values U, V, and W** to the basic voltage command values U*, V*, and W*, respectively. After the step 2A8, the program advances to the step 2A9. The step 2A9 outputs the final voltage command values U, V, and W** to the PWM waveform generator 121.

Figure 47:
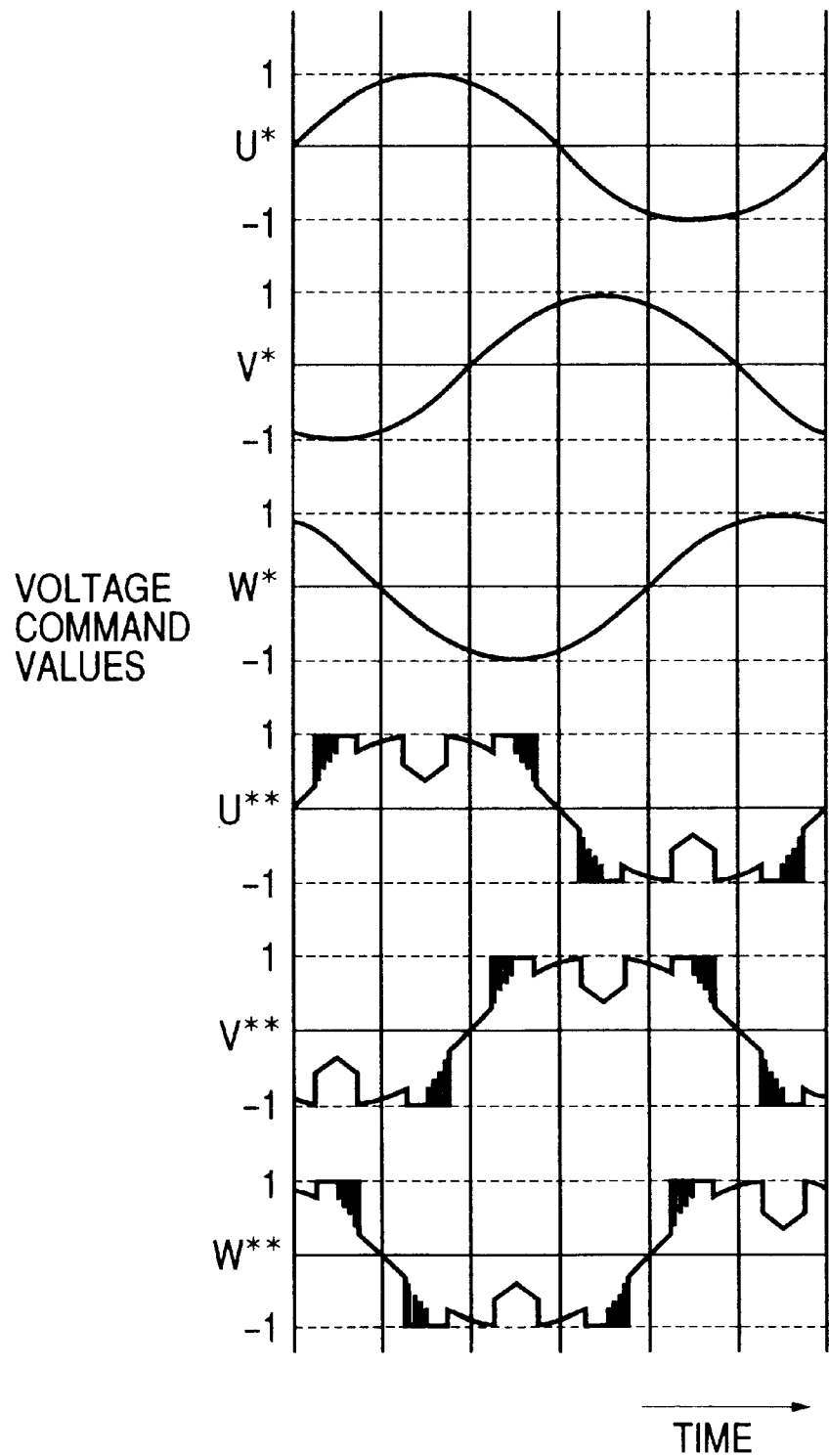
FIG. 47 is a time-domain diagram of basic voltage command values and final voltage command values.

FIG. 47 shows an example of time-domain conditions of the voltage command values U*, V*, W*, U, V, and W**. With reference to FIG. 47, the basic voltage command values U*, V*, and W* vary in smooth sinusoids while the final voltage command values U, V, and W** vary along jagged waveforms whose base lines reflect the sinusoids of the basic voltage command values U*, V*, and W*.

According to the twenty-sixth embodiment of this invention, when two of the basic voltage command values U*, V*, and W* are close to each other, the command value converter 122 enables one-phase modulation and two-phase modulation to alternate. The one-phase modulation is assigned to the first conversion time intervals while the two-phase modulation is assigned to the second conversion time intervals. The one-phase modulation is implemented by fixing two of the final voltage command values U, V, and W to +1 (the maximum) or −1 (the minimum). The two-phase modulation is implemented by fixing one of the final voltage command values U, V, and W to +1 (the maximum) or −1 (the minimum). Preferably, the first conversion time intervals and the second conversion time intervals are equal in length. Thus, the time occupancy ratio or the time length ratio between the first conversion time intervals and the second conversion time intervals is equal to "1:1".

An example of processes in the first conversion time intervals and the second conversion time intervals is as follows. During every first conversion time interval, the final voltage command values V and W are fixed to the maximum or the minimum while the final voltage command value U is set to maintain the inter-line voltage difference between the U phase and the V phase. During every second conversion time interval, the final voltage command value V is fixed to the maximum or the minimum while the final voltage command value U is set to maintain the inter-line voltage difference between the U phase and the V phase. In addition, the final voltage command value W is set to twice the inter-line voltage difference between the W phase and the V phase.

Accordingly, the twenty-sixth embodiment of this invention can reduce the frequency of the switching of the IGBT's 101-106 as compared with a prior-art design. In each of the second conversion time intervals, one of the final voltage command values U, V, and W** is set to compensate for a waveform distortion (a shortage of an inter-line voltage difference) which would be caused by fixing at least one of the other final voltage command values. Thus, the waveforms of phase currents fed to the three-phase AC motor 109 have smaller distortions. Therefore, the three-phase AC motor 109 can be driven at a lower vibration level and a lower noise level.

Twenty-seventh Embodiment

Figure 48:
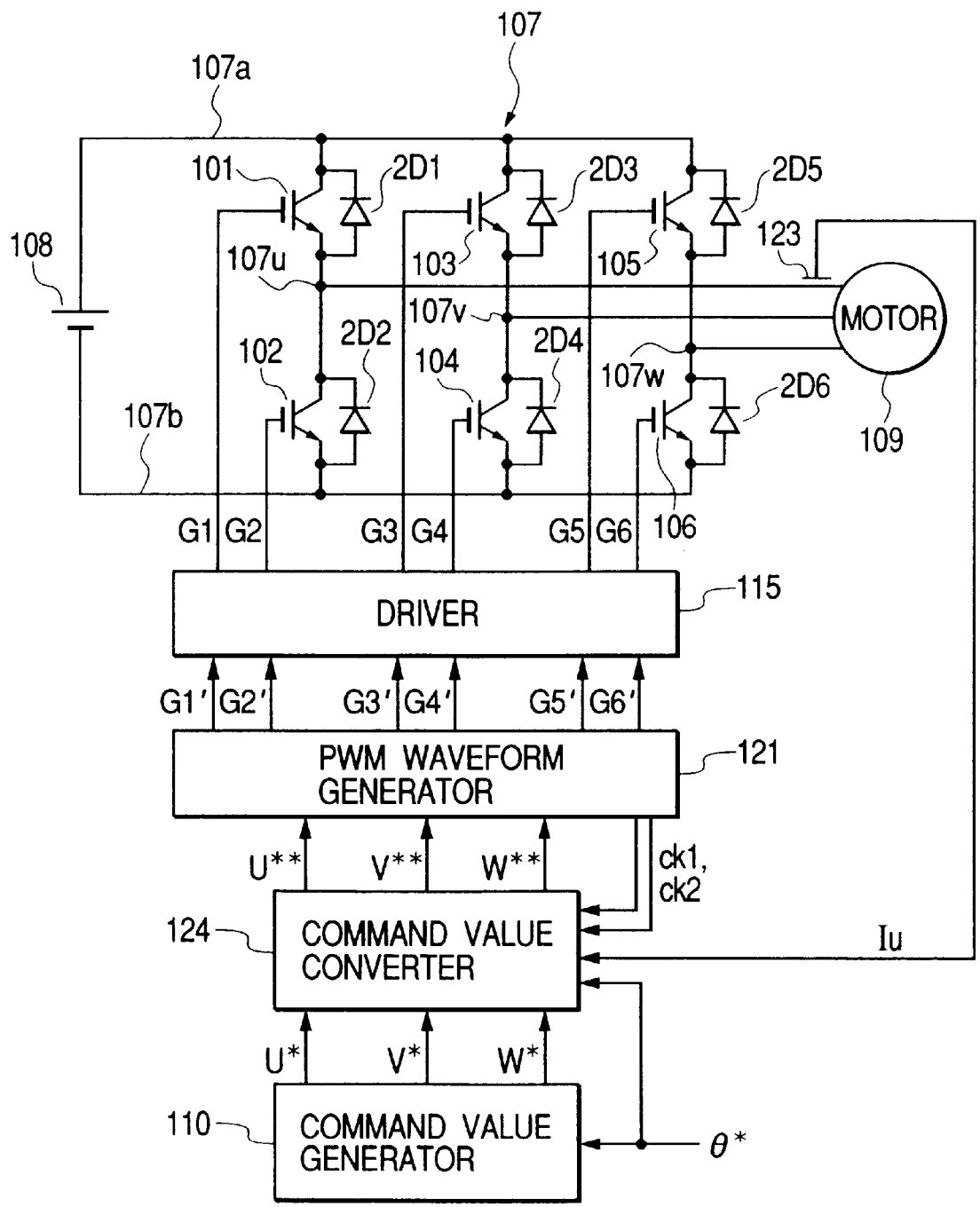
FIG. 48 is a diagram of a power converter apparatus according to a twenty-seventh embodiment of this invention.

FIG. 48 shows a power converter apparatus (an inverter apparatus) according to a twenty-seventh embodiment of this invention. The power converter apparatus of FIG. 48 is similar to the power converter of FIG. 34 except for design changes mentioned later.

The power converter apparatus of FIG. 48 includes a current sensor 123 and a command value converter 124. The current sensor 123 is associated with the connection line between the output terminal 107u of the inverter main circuit 107 and the U-phase winding of the three-phase AC motor 109. The current sensor 123 detects the U-phase current Iu flowing from the inverter main circuit 107 into the three-phase AC motor 109. The current sensor 123 informs the command value converter 124 of the value Iu of the detected U-phase current. The command value converter 124 replaces the command value converter 122 (see FIG. 34).

The command value converter 124 is formed by, for example, a DSP or a similar device which operates in accordance with a program stored in its internal ROM. The program is designed to enable the command value converter 124 to implement processes mentioned later. The command value converter 124 generates a final voltage command value U for the U phase, a final voltage command value V for the V phase, and a final voltage command value W** for the W phase in response to the basic voltage command values U*, V*, and W*, the phase command value θ*, and the U-phase current value Iu. The command value converter 124 informs the PWM waveform generator 121 of the final voltage command values U, V, and W**.

Figure 49:
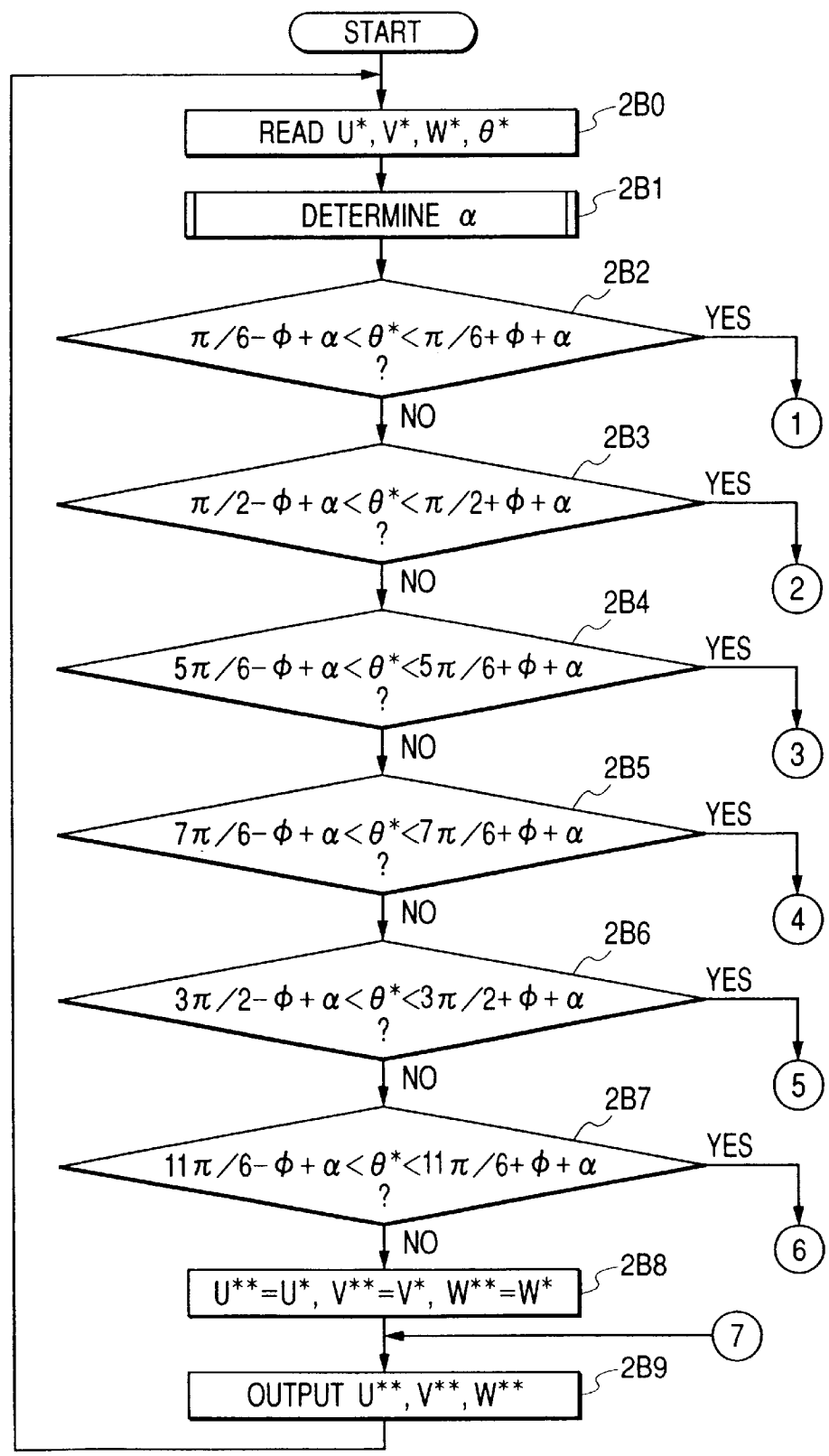
FIG. 49 is a flowchart of a portion of a program for a command value converter in FIG. 48.

FIG. 49 is a flowchart of a portion of a program for the command value converter 124. With reference to FIGS. 49, a first step 2B0 of the program gets or reads the basic voltage command values U*, V*, and W*, and the phase command value θ*.

A block 2B1 following the step 2B0 gets or reads the U-phase current value Iu. The block 2B1 determines a change phase quantity "α" on the basis of the U-phase current value Iu. After the block 2B1, the program advances to a step 2B2.

The step 2B2 determines whether or not the phase command value θ* is between an electric angle "π/6−φ+α" and an electrical angle "π/6+φ+α". In other words, the step 2B2 determines whether or not the phase command value θ* is in a predetermined electrical angle range ±φ centered at π/6+α. Here, "φ" denotes a predetermined reference phase value. When the phase command value θ* is between the electric angle "π/6−φ+α" and the electrical angle "π/6+φ+α", the program advances from the step 2B2 to a stage similar to the program portion in FIG. 37. The stage is followed by a step 2B9. When the phase command value θ* is not between the electric angle "π/6−φ+α" and the electrical angle "π/6+φ+α", the program advances from the step 2B2 to a step 2B3.

The step 2B3 determines whether or not the phase command value θ* is between an electric angle "π/2−φ+α" and an electrical angle "π/2+φ+α". In other words, the step 2B3 determines whether or not the phase command value θ* is in a predetermined electrical angle range ±φ centered at π/2+α(3π/6+α). When the phase command value θ* is between the electric angle "π/2−φ+α" and the electrical angle "π/2+φ+α", the program advances from the step 2B3 to a stage similar to the program portion in FIG. 38. The stage is followed by the step 2B9. When the phase command value θ* is not between the electric angle "π/2−φ+α" and the electrical angle "π/2+φ+α", the program advances from the step 2B3 to a step 2B4.

The step 2B4 determines whether or not the phase command value θ* is between an electric angle "5π/6−φ+α" and an electrical angle "5π/6+φ+α". In other words, the step 2B4 determines whether or not the phase command value θ* is in a predetermined electrical angle range ±φ centered at 5π/6+α. When the phase command value θ* is between the electric angle "5π/6−φ+α" and the electrical angle "5π/6+φ+α", the program advances from the step 2B4 to a stage similar to the program portion in FIG. 39. The stage is followed by the step 2B9. When the phase command value θ* is not between the electric angle "5π/6−φ+α" and the electrical angle "5π/6+φ+α", the program advances from the step 2B4 to a step 2B5.

The step 2B5 determines whether or not the phase command value θ* is between an electric angle "7π/6−φ+α" and an electrical angle "7π/6+φ+α". In other words, the step 2B5 determines whether or not the phase command value θ* is in a predetermined electrical angle range ±φ centered at 7π/6+α. When the phase command value θ* is between the electric angle "7π/6−φ+α" and the electrical angle "7π/6+φ+α", the program advances from the step 2B5 to a stage similar to the program portion in FIG. 40. The stage is followed by the step 2B9. When the phase command value θ* is not between the electric angle "7π/6−φ+α" and the electrical angle "7π/6+φ+α", the program advances from the step 2B5 to a step 2B6.

The step 2B6 determines whether or not the phase command value θ* is between an electric angle "3π/2−φ+α" and an electrical angle "3π/2+φ+α". In other words, the step 2B6 determines whether or not the phase command value θ* is in a predetermined electrical angle range ±φ centered at 3π/2+α(9π/6+α). When the phase command value θ* is between the electric angle "3π/2−φ+α" and the electrical angle "3π/2+φ+α", the program advances from the step 2B6 to a stage similar to the program portion in FIG. 41. The stage is followed by the step 2B9. When the phase command value θ* is not between the electric angle "3π/2−φ+α" and the electrical angle "3π/2+φ+α", the program advances from the step 2B6 to a step 2B7.

The step 2B7 determines whether or not the phase command value θ* is between an electric angle "11π/6−φ+α" and an electrical angle "11π/6+φ+α". In other words, the step 2B7 determines whether or not the phase command value θ* is in a predetermined electrical angle range ±φ centered at 11π/6+α. When the phase command value θ* is between the electric angle "11π/6−φ+α" and the electrical angle "11π/6+φ+α", the program advances from the step 2B7 to a stage similar to the program portion in FIG. 42. The stage is followed by the step 2B9. When the phase command value θ* is not between the electric angle "11π/6−φ+α" and the electrical angle "11π/6+φ+α", the program advances from the step 2B7 to a step 2B8.

The step 2B8 sets the final voltage command values U, V, and W** equal to the basic voltage command values U*, V*, and W*, respectively. After the step 2B8, the program advances to the step 2B9.

The step 2B9 outputs the final voltage command values U, V, and W** to the PWM waveform generator 121. After the step 2B9, the program returns to the step 2B0.

Figure 50:
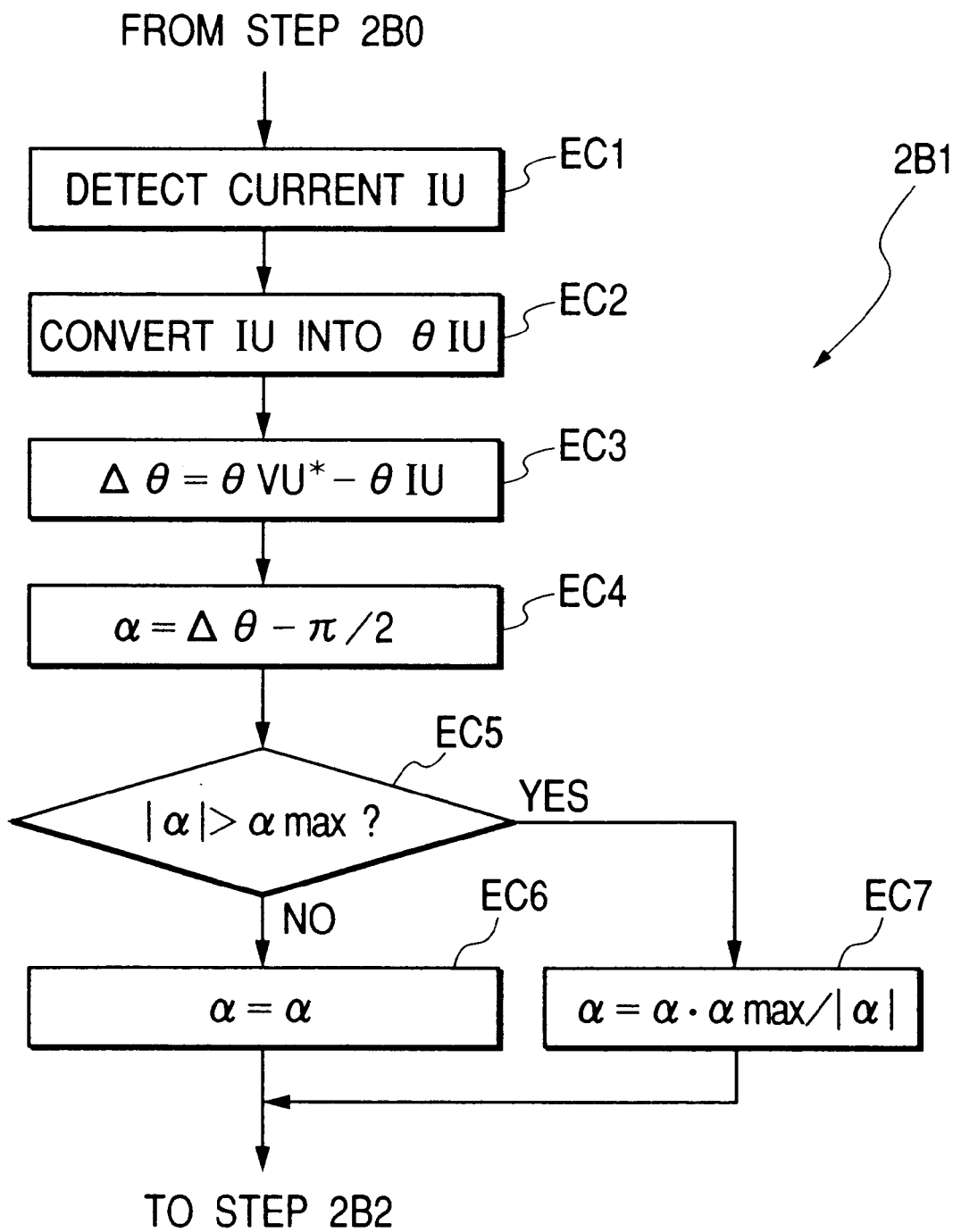
FIG. 50 is a flowchart of a block in FIG. 49.

As shown in FIG. 50, the block 2B1 has steps EC1, EC2, EC3, EC4, EC5, EC6, and EC7. The step EC1 follows the step 2B0 in FIG. 49. The step EC1 gets or reads the U-phase current value Iu.

The step EC2 following the step EC1 converts the U-phase current value Iu into an output current phase θIU. An example of the details of the step EC2 is as follows. The U-phase current value Iu exhibits an approximately sinusoidal waveform. The step EC2 memorizes the peak of the U-phase current value Iu (the maximum amplitude of the U-phase current) as a reference value. The step EC2 calculates the ratio of the present U-phase current value Iu to the reference value. The step EC2 converts the U-phase current value Iu into the output current phase θIU in accordance with the calculated ratio.

The step EC3 subsequent to the step EC2 sets a voltage phase θVU* to the phase command value θ*. The step EC3 calculates the voltage-current phase difference ΔΘ between the voltage phase θVU* and the current phase θIU according to the following equation.

$$\Delta\theta = \theta VU^* - \theta IU \tag{163}$$

The step EC4 following the step EC3 calculates the change phase quantity "α" from the voltage-current phase difference Δθ according to the following equation.

$$\alpha = \Delta\theta - \pi/2 \tag{164}$$

The step EC5 subsequent to the step EC4 calculates the absolute value |α| of the change phase quantity "α". The step EC5 compares the absolute value |α| with an upper limit αmax. When the absolute value |α| is greater than the upper limit αmax, the program advances from the step EC5 to a step EC7. Otherwise, the program advances from the step EC5 to a step EC6.

The step EC6 uses the change phase quantity "α" as it is. Specifically, the step EC6 executes the statement as "α=α". After the step EC6, the program advances to the step 2B2 in FIG. 49.

The step EC7 limits the change phase quantity "α" to the upper limit αmax according to the following statement.

$$\alpha = \alpha \cdot \max / |\alpha| \tag{165}$$

where the factor "α/|α|" gives the sign to the final change phase quantity "α". After the step EC7, the program advances to the step 2B2 in FIG. 49.

Figure 51:
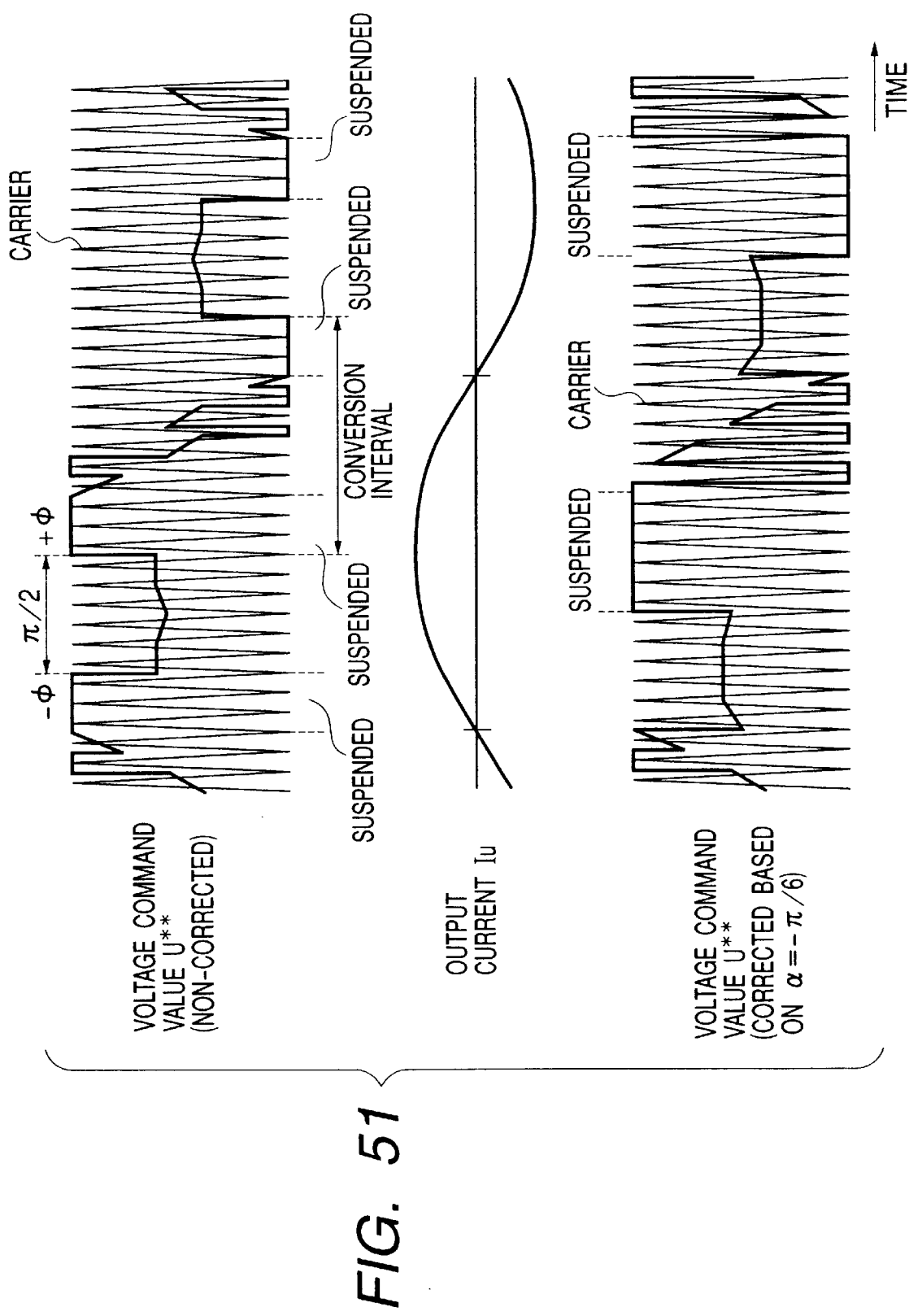
FIG. 51 is a time-domain diagram of a final voltage command value U generated in the absence of correction responsive to a change phase quantity "α", an output U-phase current Iu, a final voltage command value U generated in the presence of correction responsive to a change phase quantity "α" equal to −π/6, and carrier waves.

FIG. 51 shows an example of time-domain conditions of a final voltage command value U generated in the absence of correction responsive to the change phase quantity "α", an output U-phase current Iu, and a final voltage command value U generated in the presence of correction responsive to the change phase quantity "α" equal to −π/6. Generally, the phase of a motor voltage tends to advance relative to that of a motor current. In FIG. 51, the non-corrected voltage command value U has a phase advance of π/6 relative to the output current Iu. On the other hand, the corrected voltage command value U is substantially in phase with the output current Iu.

In FIG. 51, there is a composite conversion time interval formed by the alternation of the first conversion time intervals and the second conversion time intervals. During the composite conversion time interval, switching in the inverter main circuit 107 is suppressed. In the predetermined electrical angle range +ϕ centered at π/2 for the final voltage command value U**, a former half (the −ϕ side) is assigned to one-phase modulation for the U phase and two-phase modulation for the U and W phases while a latter half (the +ϕ side) is assigned to one-phase modulation for the U phase and two-phase modulation for the U and V phases. Thus, during the predetermined electrical angle range +ϕ centered at π/2, the U phase remains subjected to switching. On the other hand, during time intervals neighboring the predetermined electrical angle range +ϕ centered at π/2, the U phase continues to be unswitched.

With reference to FIG. 51, in the case of the non-corrected voltage command value U, a time region for which the U-phase remains subjected to switching reaches a time point at or around the time position of a peak of the output current Iu. On the other hand, in the case of the corrected voltage command value U, the center of a time region for which the U-phase remains subjected to switching is closer to a zero-cross point of the output current Iu. In addition, the center of a time region for which the U-phase remains unswitched is closer to the time position of a peak of the output current Iu. Accordingly, the corrected voltage command value U** provides reduced switching losses.

Preferably, the center of a time region for which the U-phase remains subjected to switching is coincident with a zero-cross point of the output current Iu from the standpoint of the minimization of switching losses. Accordingly, the command value converter 124 calculates the voltage-current phase difference Δθ, and sets the change phase quantity "α" in response to the calculated difference Δθ so that the center of a U-phase switching time region will have an advance of π/2 relative to the output current Iu. This setting enables the center of the U-phase switching time region to be coincident with a zero-cross point of the output current Iu.

The upper limit αmax used by the step EC5 in FIG. 50 is determined as follows. During conversion time intervals (the first conversion time intervals and the second conversion time intervals), some of the final voltage command values U, V, and W result from level shifts for compensating inter-line voltages. For example, at the step A13 in FIG. 37, the final voltage command value U results from a level shift as "U**=2(U*−W*)+1". When the change phase quantity "α" is large, the difference between the basic voltage command values U* and W* is great. If the change phase quantity "α" is excessively large, the final voltage command value U** would move from an allowable range into an overmodulation range.

Figure 52:
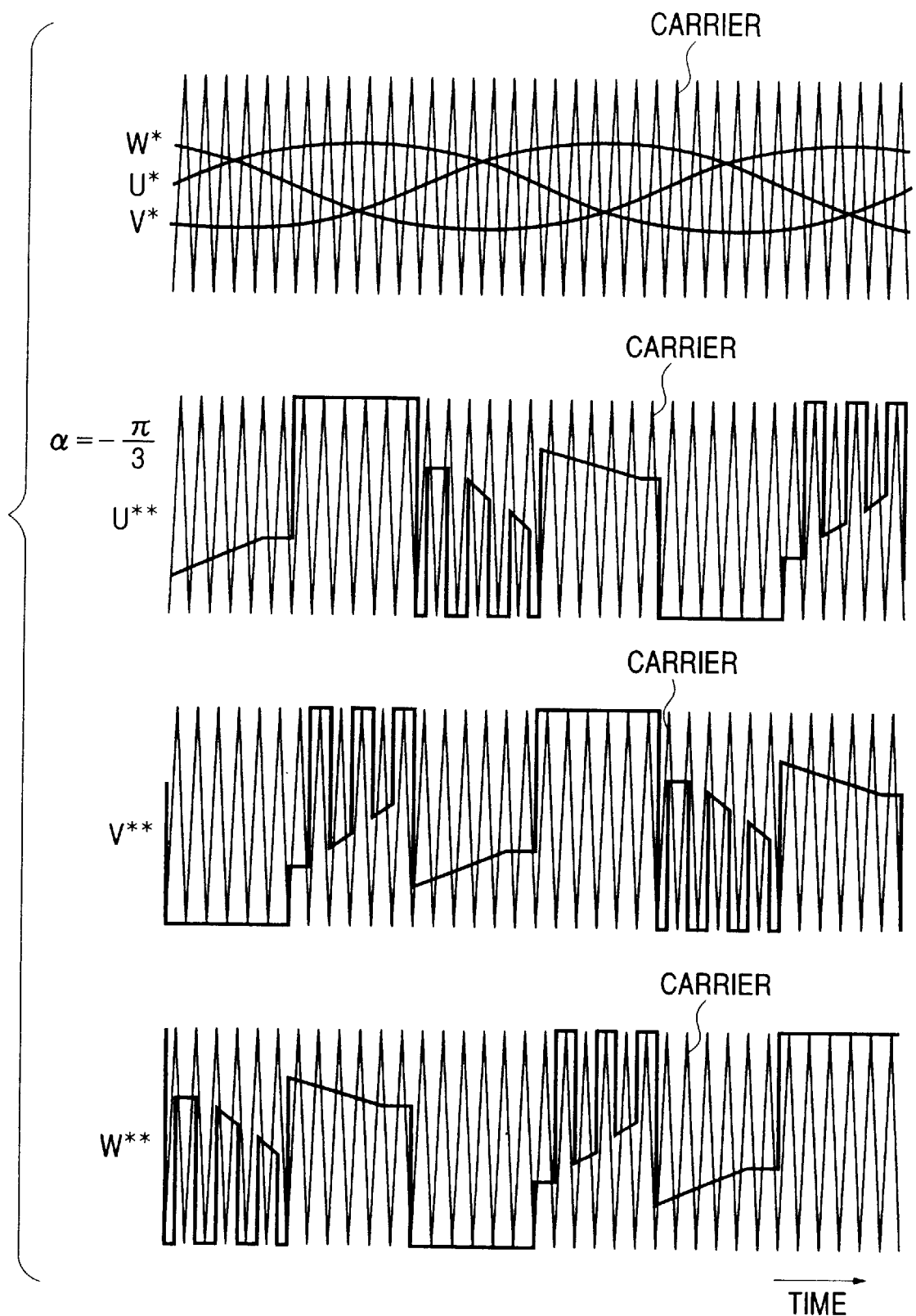
FIG. 52 is a time-domain diagram of basic voltage command values, final voltage command values, and carrier waves.
Figure 53:
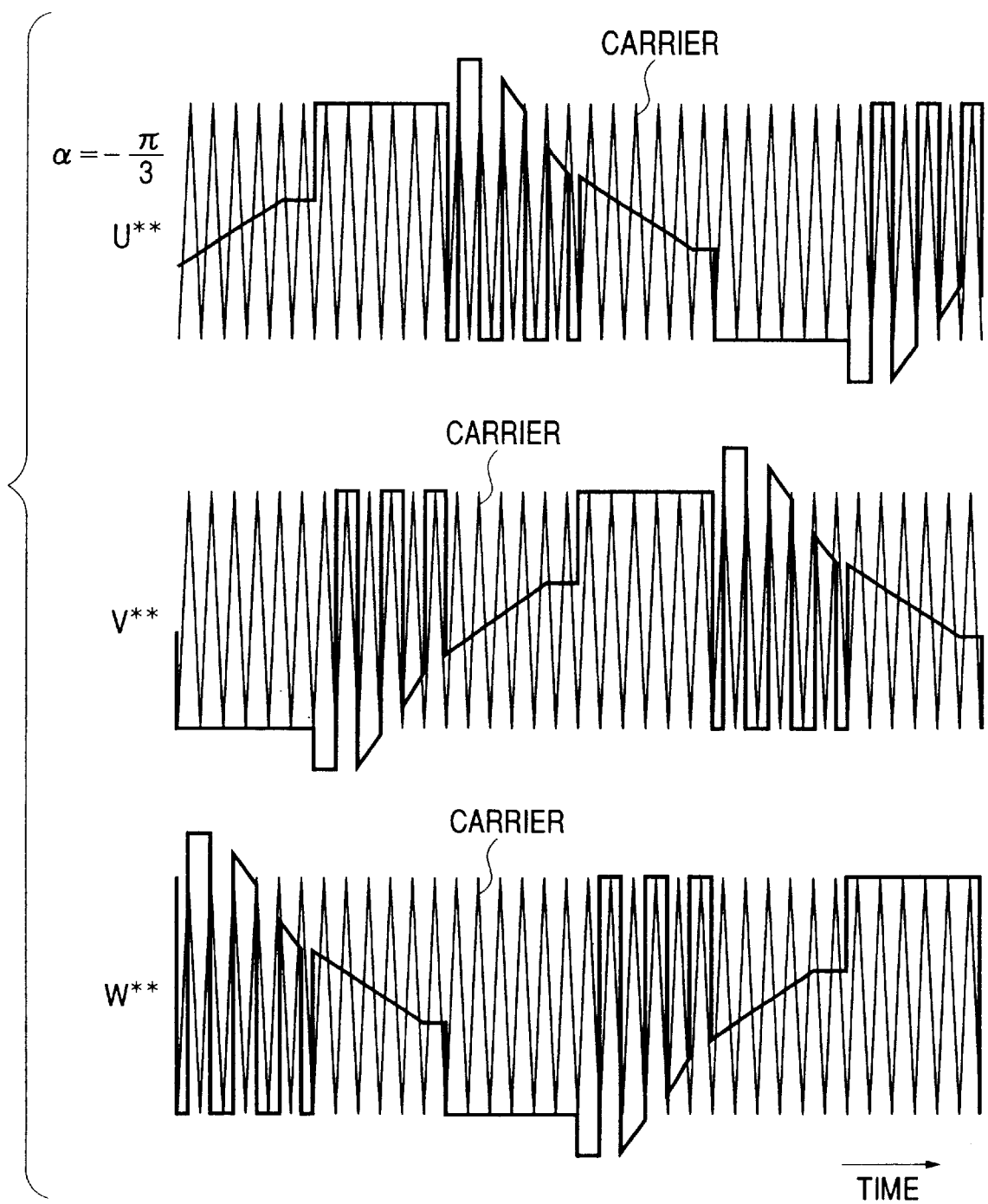
FIG. 53 is a time-domain diagram of final voltage command values and carrier waves.

FIG. 52 shows an example of time-domain conditions of the basic voltage command values U*, V*, and W*, and the final voltage command values U, V, and W with relatively small amplitudes which are generated in the case where ϕ=π/6 and α=π/3. In FIG. 52, the final voltage command values U, V, and W remain in allowable ranges. FIG. 53 shows an example of time-domain conditions of the final voltage command values U, V, and W with relatively great amplitudes which are generated in the case where ϕ=π/6 and α=π/3, and a limiting process using the value αmax is absent. In FIG. 53, during conversion time intervals, the final voltage command values U, V, and W move from the allowable ranges into overmodulation ranges.

The upper limit αmax is chosen to prevent the occurrence of such overmodulation. Specifically, the upper limit αmax is determined according to the following equation.

$$\alpha \max = \sin^{-1}\{1/(\sqrt{3} \cdot Va)\} - \phi \tag{166}$$

Since the difference between the basic voltage command values U* and V* is equal to the inter-line voltage for balanced three-phase AC, the difference is given as follows.

$$U^* - V^* = \sqrt{3} \cdot Va \cdot \sin\theta \tag{167}$$

where θ denotes a phase corresponding to 0 (radian) at an intersection of the basic voltage command values U* and V*, and Va denotes a parameter for determining a voltage-command-value amplitude level. The level-shift correction for the final voltage command value U in a conversion time interval is responsive to twice the difference as indicated by "U=2(U*−W*)+1". Thus, the correction result is designed to not exceed a relative sinusoid amplitude value of 2 (−1 to +1). Therefore, the following relation is given.

$$2\sqrt{3} \cdot Va \cdot \sin(\phi + \alpha \max) = 2 \tag{168}$$

The relation (168) provides the equation (166).

According to the twenty-seventh embodiment of this invention, when two of the basic voltage command values U*, V*, and W* are close to each other, the command value converter 124 enables one-phase modulation and two-phase modulation to alternate. The one-phase modulation is assigned to the first conversion time intervals while the two-phase modulation is assigned to the second conversion time intervals. The one-phase modulation is implemented by fixing two of the final voltage command values U, V, and W to +1 (the maximum) or −1 (the minimum). The two-phase modulation is implemented by fixing one of the final voltage command values U, V, and W to +1 (the maximum) or −1 (the minimum). Preferably, the first conversion time intervals and the second conversion time intervals are equal in length. Thus, the time occupancy ratio or the time length ratio between the first conversion time intervals and the second conversion time intervals is equal to "1:1". Every group of the first conversion time intervals and the second conversion time intervals constitutes a composite conversion time interval. The phase of the composite conversion time interval is controlled and corrected in response to the change phase quantity "α". The carrier wave is subjected to pulse-width modulation responsive to the final voltage command values U, V, and W** which result from the correction depending on the change phase quantity "α". The pulse-width modulation provides switching control signals fed to the inverter main circuit 107.

According to the twenty-seventh embodiment of this invention, the phase of a time interval for which the execution of switching by the IGBT's 101-106 in the inverter main circuit 107 is suppressed is controlled in response to the change phase quantity "α". Preferably, the time-interval phase is adjusted to minimize switching losses caused by the IGBT's 101–106.

In the twenty-seventh embodiment of this invention, the command value converter 124 calculates the voltage-current phase difference Δθ. The command value converter 124 sets the phase of composite conversion time intervals in response to the voltage-current phase difference Δθ so that the time positions at which the final voltage command is neither maximized nor minimized will coincide with zero-cross points of the output current Iu. During the predetermined electrical angle ranges ±φ containing the time positions of voltage command peaks, the IGBT's 101–106 undergo switching. Therefore, the IGBT's 101–106 undergo switching in limited time regions where the output current Iu is equal or close to zero. This is advantageous in reducing switching losses caused by the IGBT's 101–106. The composite conversion time intervals overlap time regions where the output current Iu is great. Since switching is suppressed in the composite conversion time intervals, it is possible to further reduce switching losses caused by the IGBT's 101–106.

An example of processes in the first conversion time intervals and the second conversion time intervals is as follows. During every first conversion time interval, the final voltage command values V and W are fixed to the maximum or the minimum while the final voltage command value U is set to maintain the inter-line voltage difference between the U phase and the V phase. During every second conversion time interval, the final voltage command value V is fixed to the maximum or the minimum while the final voltage command value U is set to maintain the inter-line voltage difference between the U phase and the V phase. In addition, the final voltage command value W is set to twice the inter-line voltage difference between the W phase and the V phase.

Accordingly, the twenty-seventh embodiment of this invention can reduce the frequency of the switching of the IGBT's 101–106 as compared with a prior-art design. In each of the second conversion time intervals, one of the final voltage command values U, V, and W is set to compensate for a waveform distortion (a shortage of an inter-line voltage difference) which would be caused by fixing at least one of the other final voltage command values. Thus, the waveforms of phase currents fed to the three-phase AC motor 109 have smaller distortions. Therefore, the three-phase AC motor 109** can be driven at a lower vibration level and a lower noise level.

Since the command value converter 124 sets the conversion period to twice the carrier wave period, the conversion processing can easily be executed at a timing synchronized with the carrier wave.

The command value converter 124 sets the change phase quantity "α" so that the final voltage command values U, V, and W** will not move out of the allowable ranges during the second conversion time intervals. Accordingly, it is possible to prevent the occurrence of overmodulation.

Twenty-eighth Embodiment

Figure 54:
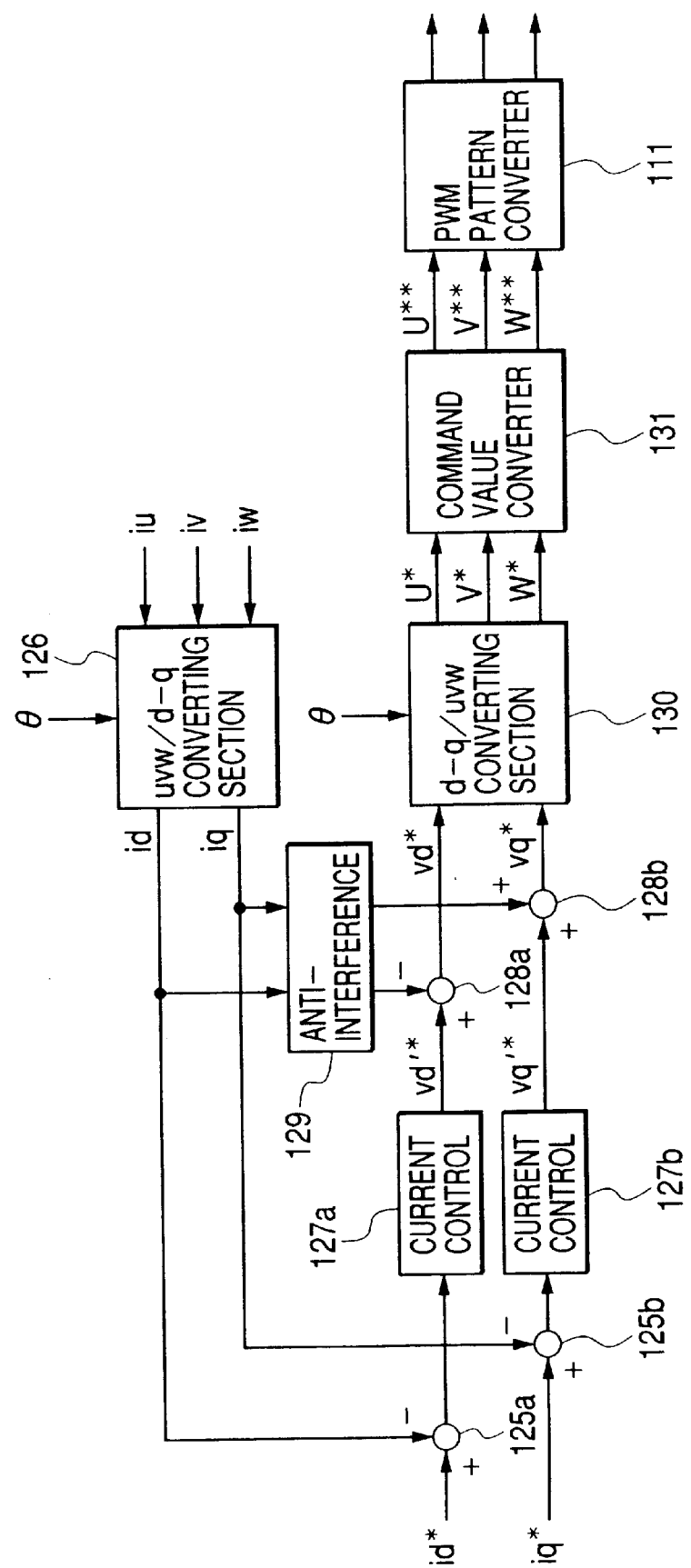
FIG. 54 is a block diagram of an apparatus according to a twenty-eighth embodiment of this invention.

FIG. 54 shows an apparatus according to a twenty-eighth embodiment of this invention. The apparatus of FIG. 54 is designed to control the drive of a brushless motor (a polyphase AC motor) for powering, for example, an electric vehicle.

With reference to FIG. 54, a current command value iq* means a torque command value which is fed from an ECU (electronic control unit) in response to a throttle opening degree signal or a motor rotational speed signal. A current command value id* means a magnetic flux command value which is read out from a table in response to the current command value iq*.

The current command values id* and iq* are fed to subtracters 125a and 125b as minuends, respectively. Current detection values "iu", "iv", and "iw" are provided by current sensors for detecting output currents from an inverter main circuit. The current detection values "iu", "iv", and "iw" are fed to a uvw/d-q converting section 126. The uvw/d-q converting section 126 converts the current detection values "iu", "iv", and "iw" into vector components in a d-q plane (a rotational coordinate system), that is, actual two-phase current values "id" and "iq", in response to a phase detection value (a detected rotor phase) θ. Thus, the uvw/d-q converting section 126 implements 3-phase/2-phase conversion. The uvw/d-q converting section 126 outputs the actual two-phase current values "id" and "iq" to the subtracters 125a and 125b as subtrahends, respectively.

The device 125a subtracts the actual current value "id" from the current command value id*. The subtracter 125a outputs the subtraction result to a current controlling section 127a. The current controlling section 127a converts the subtraction result into a voltage command value vd'*. The current controlling section 127a is designed to implement, for example, PI control. The current controlling section 127a feeds the voltage command value vd'* to a subtracter 128a as a minuend.

The device 125b subtracts the actual current value "iq" from the current command value iq*. The subtracter 125b outputs the subtraction result to a current controlling section 127b. The current controlling section 127b converts the subtraction result into a voltage command value vq'*. The current controlling section 127b is designed to implement, for example, PI control. The current controlling section 127b feeds the voltage command value vq'* to an adder 128b as a summand.

An anti-interference section 129 receives the actual two-phase current values "id" and "iq" from the uvw/d-q converting section 126. The anti-interference section 129 detects counterelectromotive forces in the brushless motor on the basis of the actual two-phase current values "id" and "iq". The anti-interference section 129 outputs values of the detected counterelectromotive forces to the subtracter 128a and the adder 128b as a sutrahend and an addend, respectively.

The device 128a subtracts the counterelectromotive force value from the voltage command value vd'*. The subtracter 128a outputs the subtraction result to a d-q/uvw converting section 130 as a voltage command value vd*.

The device 128b adds the counterelectromotive force value and the voltage command value vq'*. The adder 128b outputs the addition result to the d-q/uvw converting section 130 as a voltage command value vq*.

The d-q/uvw converting section 130 converts the voltage command values vd* and vq* into three-phase basic voltage command values U*, V*, and W* in response to the phase detection value (the detected rotor phase) θ. Thus, the d-q/uvw converting section 130 implements 2-phase/3-phase conversion. The d-q/uvw converting section 130 outputs the basic voltage command values U*, V*, and W* to a command value converter 131. The device 131 converts the basic voltage command values U*, V*, and W* into final voltage command values U, V, and W. The command value converter 131 outputs the final voltage command values U, V, and W to a PWM waveform generator (a PWM pattern converter) 111.

The command value converter 131 is the same as that in one of the twenty-sixth and twenty-seventh embodiments of this invention. The PWM waveform generator 111 and a following stage are similar to those in the twenty-sixth embodiment of this invention. The apparatus of FIG. 54 can be formed by a full hardware circuit or a hardware-plus-software circuit.

Twenty-ninth Embodiment

A twenty-ninth embodiment of this invention is similar to one of the twenty-seventh and twenty-eighth embodiments thereof except for the following design change. In the twenty-ninth embodiment of this invention, the change phase quantity "α" is set so that the composite conversion time intervals will advance by up to π/2.

Thirtieth Embodiment

A thirtieth embodiment of this invention is similar to one of the twenty-sixth to twenty-ninth embodiments thereof except that the basic voltage command values U*, V*, and W* are compared with each other, and the first and second conversion time intervals are set in accordance with the results of the comparison.

Thirty-first Embodiment

A thirty-first embodiment of this invention is similar to one of the twenty-sixth to thirtieth embodiments thereof except that the command value generator 110 and the command value converter 124 (or 122) are formed in a single body.

Thirty-second Embodiment

A thirty-second embodiment of this invention is similar to the twenty-eighth embodiment thereof except that the anti-interference section 129 is omitted.

Thirty-third Embodiment

A thirty-third embodiment of this invention is modified from the twenty-eighth embodiment thereof so as to be applied to speed control, position control, or other control in which final voltage command values are outputted.

Thirty-fourth Embodiment

A thirty-fourth embodiment of this invention is similar to one of the twenty-sixth to thirty-third embodiments thereof except that the triangular-wave-based PWM modulation is replaced by other modulation which changes a pulse width through switching for power conversion.

Thirty-fifth Embodiment

An thirty-fifth embodiment of this invention is similar to one of the twenty-sixth to thirty-fourth embodiments thereof except for design changes mentioned later. The thirty-fifth embodiment of this invention uses digital control. In the thirty-fifth embodiment of this invention, a memory is loaded with data representing a shortage of the inter-line voltage which is caused by fixing two of the final voltage command values U, V, and W to the maximum or the minimum. During a second conversion time interval for which only one of the final voltage command values U, V, and W is fixed, the shortage-representing data are read out from the memory and the shortage is superimposed upon the related final voltage command values on a real-time basis.

Thirty-sixth Embodiment

A thirty-sixth embodiment of this invention is similar to one of the twenty-sixth to thirty-fifth embodiments thereof except that the IGBT's 101–106 are replaced by power transistors or power MOSFET's.

Thirty-seventh Embodiment

A thirty-seventh embodiment of this invention is similar to one of the twenty-sixth to thirty-sixth embodiments thereof except that the rotor phase detector 190 is of a sensor-less type.

Specifically, the rotor phase detector 190 includes shunt resistors or comparators which detect induced voltages in the three-phase AC motor 109. The rotor phase detector 190 derives information of the position of the rotor in the three-phase AC motor 109 from the detected induced voltages.

Thirty-eighth Embodiment

A thirty-eighth embodiment of this invention is similar to one of the twenty-sixth to thirty-seventh embodiments thereof except that the change phase quantity "α" is determined on the basis of a voltage command value and a current command value fed from an external instead of the detected output current Iu.

Thirty-ninth Embodiment

A thirty-ninth embodiment of this invention is similar to one of the twenty-sixth to thirty-eighth embodiments thereof except that the ratio "n" in length between the first conversion time intervals and the second conversion time intervals is set to a positive real number different from "1".

Fortieth Embodiment

A fortieth embodiment of this invention is similar to one of the twenty-sixth to thirty-ninth embodiments thereof except that the command value converter includes a CPU rather than the DSP.

Forty-first Embodiment

A forty-first embodiment of this invention is changed from one of the twenty-sixth to fortieth embodiments thereof so as to be applied to the drive of a three-phase AC motor continuously subjected to two-phase modulation in which only one of control parameters for three phases is fixed, and the two other control parameters are used in the modulation. The forty-first embodiment of this invention implements one-phase modulation by fixing one of the two other control parameters. According to the forty-first embodiment of this invention, it is possible to further reduce the number of times of switching.

Forty-second Embodiment

A forty-second embodiment of this invention is modified from one of the twenty-sixth to forty-first embodiments thereof so as to be applied to the drive of a four-phase AC motor or a more-phase AC motor.

Forty-third Embodiment

A forty-third embodiment of this invention is modified from one of the twenty-sixth to forty-second embodiments thereof so as to be applied to a UPS (a uninterruptible power supply) or other equipments in which polyphase inter-line voltages are outputted.

What is claimed is:

1. A power converter apparatus comprising:
   an inverter main circuit including 1) switching elements responsive to switching control signals, and 2) means for applying phase voltages to a polyphase load via the switching elements;
   command value outputting means for outputting basic voltage command values for phases of the polyphase load respectively;
   command value converting means for converting the basic voltage command values outputted by the command value outputting means into final voltage command values respectively, wherein during a time interval for which at least two of the basic voltage command values are approximately equal to each other, the final voltage command values corresponding to said two of the basic voltage command values are equal to one of a maximum and a minimum; and
   control signal outputting means for subjecting a carrier wave to pulse-width modulation responsive to the final voltage command values generated by the command value converting means to produce the switching control signals, and for outputting the switching control signals to the switching elements in the inverter main circuit.

2. A power converter apparatus as recited in claim 1, wherein the command value converting means comprises means for equalizing at least one of the final voltage command values which is of a phase different from conversion object phases to a mean of inter-line voltages with the basic voltage command values of the conversion object phases.

3. A power converter apparatus as recited in claim 1, wherein the polyphase load comprises a polyphase AC motor.

4. A power converter apparatus as recited in claim 3, wherein the polyphase AC motor comprises a three-phase AC motor.

5. A power converter apparatus comprising:
   an inverter main circuit including 1) switching elements responsive to switching control signals, and 2) means for applying phase voltages to a polyphase load via the switching elements;
   command value outputting means for outputting basic voltage command values for phases of the polyphase load respectively;
   command value converting means for converting the basic voltage command values outputted by the command value outputting means into final voltage command values respectively, wherein a time interval for which at least two of the basic voltage command values are approximately equal to each other includes an alternation of first conversion time intervals and second conversion time intervals, wherein during each of the first conversion time intervals, the final voltage command values corresponding to said two of the basic voltage command values are equal to one of a maximum and a minimum, and wherein during each of the second conversion time intervals, only one of the final voltage command values corresponding to said two of the basic voltage command values is equal to one of the maximum and the minimum; and
   control signal outputting means for subjecting a carrier wave to pulse-width modulation responsive to the final voltage command values generated by the command value converting means to produce the switching control signals, and for outputting the switching control signals to the switching elements in the inverter main circuit.

6. A power converter apparatus as recited in claim 5, wherein the command value converting means comprises means for setting a period of the alternation of the first conversion time intervals and the second conversion time intervals to an integer times a period of the carrier wave.

7. A power converter apparatus as recited in claim 5, wherein during each of the second conversion time intervals, said only one of the final voltage command values corresponds to one of the basic voltage command values which is maximum in inter-line voltage with another of the basic voltage command value.

8. A power converter apparatus as recited in claim 5, wherein the command value converting means comprises:
   means for setting a length of the second conversion time intervals to a positive real number "n" times a length of the first conversion time intervals;
   means for, during each of the first conversion time intervals, subjecting at least one of the final voltage command values which is of a phase different from conversion object phases to level shift to maintain an inter-line voltage with the basic command voltage value of a conversion object phase in each of the second conversion time intervals; and
   means for, during each of the second conversion time intervals, subjecting one of the final voltage command values which is of a conversion object phase only for each of the first conversion time intervals to level shift to multiply an inter-line voltage with the basic voltage command value of a conversion object phase in each of the second conversion time intervals by $(1+1/n)$.

9. A power converter apparatus as recited in claim 8, wherein the command value converting means comprises means for setting the positive real number "n" to 1.

10. A power converter apparatus as recited in claim 5, wherein the command value converting means comprises means for increasing a length of the second conversion time intervals relative to the first conversion time intervals as a difference between the basic voltage command values of conversion object phases in the first conversion time intervals increases.

11. A power converter apparatus as recited in claim 5, wherein the polyphase load comprises a three-phase load.

12. A power converter apparatus comprising:
   an inverter main circuit including 1) switching elements responsive to switching control signals, and 2) means for applying phase voltages to a polyphase load via the switching elements;
   command value outputting means for outputting basic voltage command values for phases of the polyphase load respectively;
   command value converting means for comparing the basic voltage command values outputted by the command value outputting means, and for converting the basic voltage command values into final voltage command values respectively in response to results of said comparing, wherein during a specified time interval containing a time point at which at least two of the basic voltage command values are equal, the final voltage command values corresponding to said two of the basic voltage command values are equal to one of a maximum and a minimum; and control signal outputting means for subjecting a carrier wave to pulse-width modulation responsive to the final voltage command values generated by the command value converting means to produce the switching control signals, and for outputting the switching control signals to the switching elements in the inverter main circuit.

13. A power converter apparatus as recited in claim 1, wherein the basic voltage command values are based on amplitude variations of sinusoidal waves.

14. A method of controlling drive of a polyphase load, comprising the steps of:

applying phase voltages to the polyphase load via switching elements in an inverter main circuit;

generating basic voltage command values for phases of the polyphase load respectively;

converting the basic voltage command values into final voltage command values respectively, wherein during a time interval for which at least two of the basic voltage command values are approximately equal to each other, the final voltage command values corresponding to said two of the basic voltage command values are equal to one of a maximum and a minimum;

subjecting a carrier wave to pulse-width modulation responsive to the final voltage command values to produce switching control signals; and outputting the switching control signals to the switching elements in the inverter main circuit.

15. A method as recited in claim 14, further comprising the step of equalizing at least one of the final voltage command values which is of a phase different from conversion object phases to a mean of inter-line voltages with the basic voltage command values of the conversion object phases.

16. A method as recited in claim 14, wherein the polyphase load comprises a polyphase AC motor.

17. A method as recited in claim 16, wherein the polyphase AC motor comprises a three-phase AC motor.

18. A method of controlling drive of a polyphase load, comprising the steps of:

applying phase voltages to the polyphase load via switching elements in an inverter main circuit;

generating basic voltage command values for phases of the polyphase load respectively;

converting the basic voltage command values into final voltage command values respectively, wherein a time interval for which at least two of the basic voltage command values are approximately equal to each other includes an alternation of first conversion time intervals and second conversion time intervals, wherein during each of the first conversion time intervals, the final voltage command values corresponding to said two of the basic voltage command values are equal to one of a maximum and a minimum, and wherein during each of the second conversion time intervals, only one of the final voltage command values corresponding to said two of the basic voltage command values is equal to one of the maximum and the minimum;

subjecting a carrier wave to pulse-width modulation responsive to the final voltage command values to produce switching control signals; and outputting the switching control signals to the switching elements in the inverter main circuit.

19. A method as recited in claim 18, further comprising the step of setting a period of the alternation of the first conversion time intervals and the second conversion time intervals to an integer times a period of the carrier wave.

20. A method as recited in claim 18, wherein during each of the second conversion time intervals, said only one of the final voltage command values corresponds to one of the basic voltage command values which is maximum in inter-line voltage with another of the basic voltage command value.

21. A method as recited in claim 18, further comprising the steps of:

setting a length of the second conversion time intervals to a positive real number "n" times a length of the first conversion time intervals;

during each of the first conversion time intervals, subjecting at least one of the final voltage command values which is of a phase different from conversion object phases to level shift to maintain an inter-line voltage with the basic command voltage value of a conversion object phase in each of the second conversion time intervals; and during each of the second conversion time intervals, subjecting one of the final voltage command values which is of a conversion object phase only for each of the first conversion time intervals to level shift to multiply an inter-line voltage with the basic voltage command value of a conversion object phase in each of the second conversion time intervals by (1+1/n).

22. A method as recited in claim 21, further comprising the step of setting the positive real number "n" to 1.

23. A method as recited in claim 18, further comprising the step of increasing a length of the second conversion time intervals relative to the first conversion time intervals as a difference between the basic voltage command values of conversion object phases in the first conversion time intervals increases.

24. A method as recited in claim 18, wherein the polyphase load comprises a three-phase load.

25. A method of controlling drive of a polyphase load, comprising the steps of:

applying phase voltages to the polyphase load via switching elements in an inverter main circuit;

generating basic voltage command values for phases of the polyphase load respectively;

comparing the basic voltage command values;

converting the basic voltage command values into final voltage command values respectively in response to results of said comparing, wherein during a specified time interval containing a time point at which at least two of the basic voltage command values are equal, the final voltage command values corresponding to said two of the basic voltage command values are equal to one of a maximum and a minimum;

subjecting a carrier wave to pulse-width modulation responsive to the final voltage command values to produce switching control signals; and outputting the switching control signals to the switching elements in the inverter main circuit.

26. A method as recited in claim 14, wherein the basic voltage command values are based on amplitude variations of sinusoidal waves.

27. A power converter apparatus comprising:

an inverter main circuit including 1) switching elements responsive to switching control signals, and 2) means for applying phase voltages to a polyphase load via the switching elements;

command value outputting means for outputting basic voltage command values for phases of the polyphase load respectively;

command value converting means for converting the basic voltage command values outputted by the command value outputting means into final voltage command values respectively, wherein a specified time interval for which at least two of the basic voltage command values are approximately equal to each other includes an alternation of first conversion time intervals and second conversion time intervals, wherein during each of the first conversion time intervals, the final voltage command values corresponding to said two of the basic voltage command values are equal to one of a maximum and a minimum, and wherein during each of the second conversion time intervals, only one of the final voltage command values corresponding to said two of the basic voltage command values is equal to one of the maximum and the minimum;

phase changing means for changing a phase of the specified time interval used by the command value converting means; and control signal outputting means for subjecting a carrier wave to pulse-width modulation responsive to the final voltage command values generated by the command value converting means to produce the switching control signals, and for outputting the switching control signals to the switching elements in the inverter main circuit.

28. A power converter apparatus as recited in claim 27, wherein the phase changing means comprises means for detecting a phase difference between a phase of one of the basic voltage command values and a phase of a corresponding output current flowing into the polyphase load from the inverter main circuit, and means for changing the phase of the specified time interval in response to the detected phase difference.

29. A power converter apparatus as recited in claim 28, wherein the phase changing means comprises means for changing the phase of the specified time interval so that a time position different from one of a maximum and a minimum of one of the final voltage command values coincides with a zero-cross point of a corresponding output current flowing into the polyphase load from the inverter main circuit.

30. A power converter apparatus as recited in claim 27, wherein the phase changing means comprises means for detecting a phase difference between a phase of one of the basic voltage command values and a phase of a current command value fed from an external, and means for changing the phase of the specified time interval in response to the detected phase difference.

31. A power converter apparatus as recited in claim 30, wherein the polyphase load comprises a three-phase load, and the phase changing means comprises means for changing the phase of the specified time interval so that a time position different from one of a maximum and a minimum of one of the final voltage command values coincides with a zero-cross point of a corresponding current command value.

32. A power converter apparatus as recited in claim 27, wherein the polyphase load comprises a polyphase AC motor.

33. A power converter apparatus as recited in claim 27, wherein the command value converting means comprises:

means for setting a length of the second conversion time intervals to a positive real number "n" times a length of the first conversion time intervals;

means for, during each of the first conversion time intervals, subjecting at least one of the final voltage command values which is of a phase different from conversion object phases to level shift to maintain an inter-line voltage with the basic command voltage value of a conversion object phase in each of the second conversion time intervals; and means for, during each of the second conversion time intervals, subjecting one of the final voltage command values which is of a conversion object phase only for each of the first conversion time intervals to level shift to multiply an inter-line voltage with the basic voltage command value of a conversion object phase in each of the second conversion time intervals by (1+1/n).

34. A power converter apparatus as recited in claim 33, wherein the phase changing means comprises means for changing the phase of the specified time interval so that the final voltage command values are limited to within a predetermined non-overmodulation range during the second conversion time intervals.

35. A method of controlling drive of a polyphase load, comprising the steps of:

applying phase voltages to the polyphase load via switching elements in an inverter main circuit;

generating basic voltage command values for phases of the polyphase load respectively;

converting the basic voltage command values into final voltage command values respectively, wherein a time interval for which at least two of the basic voltage command values are approximately equal to each other includes an alternation of first conversion time intervals and second conversion time intervals, wherein during each of the first conversion time intervals, the final voltage command values corresponding to said two of the basic voltage command values are equal to one of a maximum and a minimum, and wherein during each of the second conversion time intervals, only one of the final voltage command values corresponding to said two of the basic voltage command values is equal to one of the maximum and the minimum;

changing a phase of the specified time interval;

subjecting a carrier wave to pulse-width modulation responsive to the final voltage command values to produce switching control signals; and outputting the switching control signals to the switching elements in the inverter main circuit.

36. A method as recited in claim 35, wherein the phase changing step comprises detecting a phase difference between a phase of one of the basic voltage command values and a phase of a corresponding output current flowing into the polyphase load from the inverter main circuit, and changing the phase of the specified time interval in response to the detected phase difference.

37. A method as recited in claim 36, wherein the phase changing step comprises changing the phase of the specified time interval so that a time position different from one of a maximum and a minimum of one of the final voltage command values coincides with a zero-cross point of a corresponding output current flowing into the polyphase load from the inverter main circuit.

38. A method as recited in claim 35, wherein the phase changing step comprises detecting a phase difference between a phase of one of the basic voltage command values and a phase of a current command value fed from an external, and changing the phase of the specified time interval in response to the detected phase difference.

39. A method as recited in claim 38, wherein the phase changing step comprises changing the phase of the specified time interval so that a time position different from one of a maximum and a minimum of one of the final voltage command values coincides with a zero-cross point of a corresponding current command value.

40. A method as recited in claim 35, wherein the polyphase load comprises a polyphase AC motor.

41. A method as recited in claim 35, further comprising the steps of:

setting a length of the second conversion time intervals to a positive real number "n" times a length of the first conversion time intervals;

during each of the first conversion time intervals, subjecting at least one of the final voltage command values which is of a phase different from conversion object phases to level shift to maintain an inter-line voltage with the basic command voltage value of a conversion object phase in each of the second conversion time intervals; and during each of the second conversion time intervals, subjecting one of the final voltage command values which is of a conversion object phase only for each of the first conversion time intervals to level shift to multiply an inter-line voltage with the basic voltage command value of a conversion object phase in each of the second conversion time intervals by (1+1/n).

42. A method as recited in claim 41, wherein the phase changing step comprises changing the phase of the specified time interval so that the final voltage command values are limited to within a predetermined non-overmodulation range during the second conversion time intervals.

43. A power converter apparatus as recited in claim 5, wherein the command value converting means comprises means for changing a length of the second conversion time intervals relative to the first conversion time intervals.

* * * * *